Dec. 10, 1957 W. MÜLLER ET AL 2,816,167
TELEPHONOGRAPH SYSTEM AND APPARATUS AND METHOD
Filed Aug. 22, 1951 26 Sheets-Sheet 9

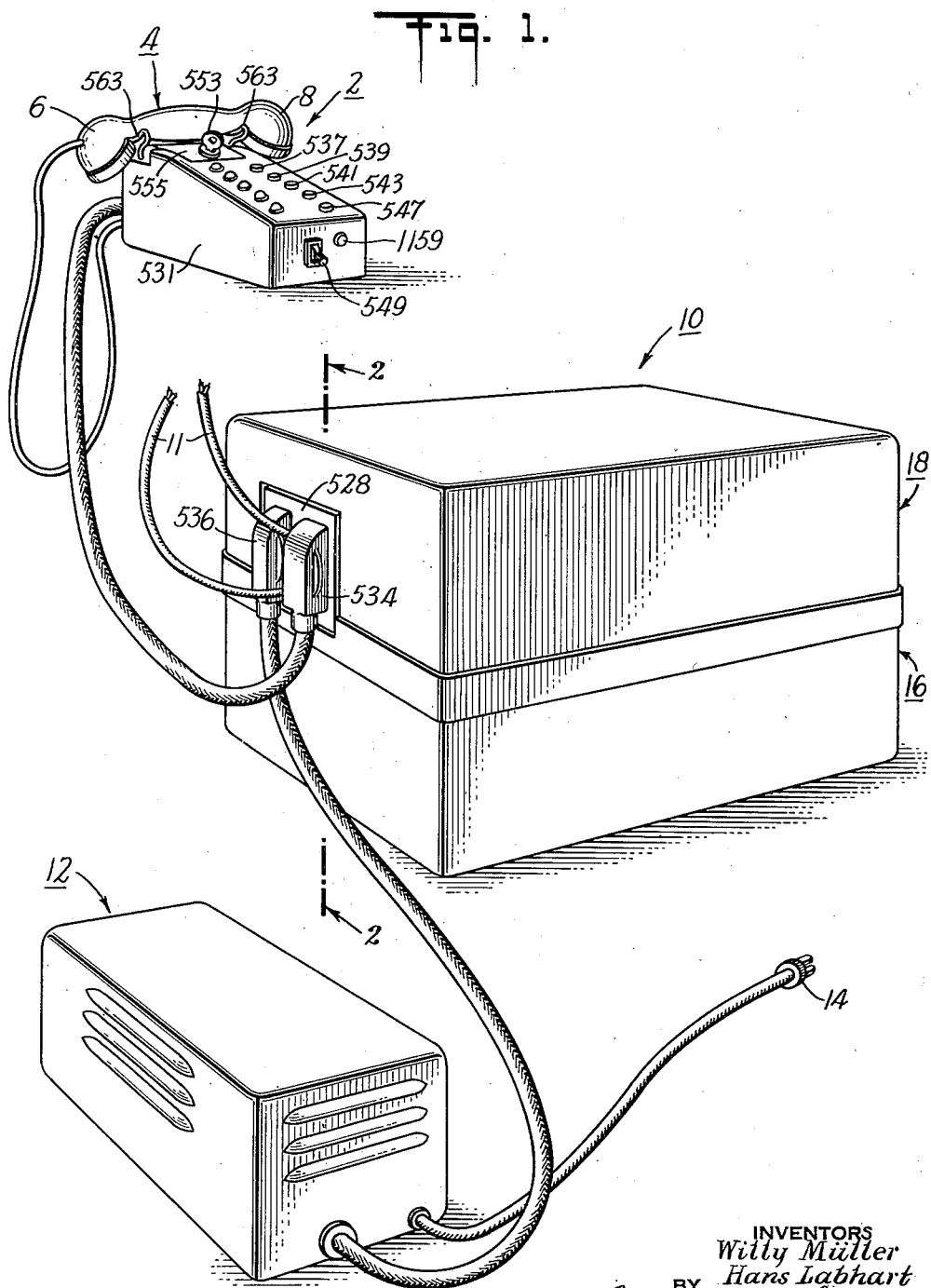

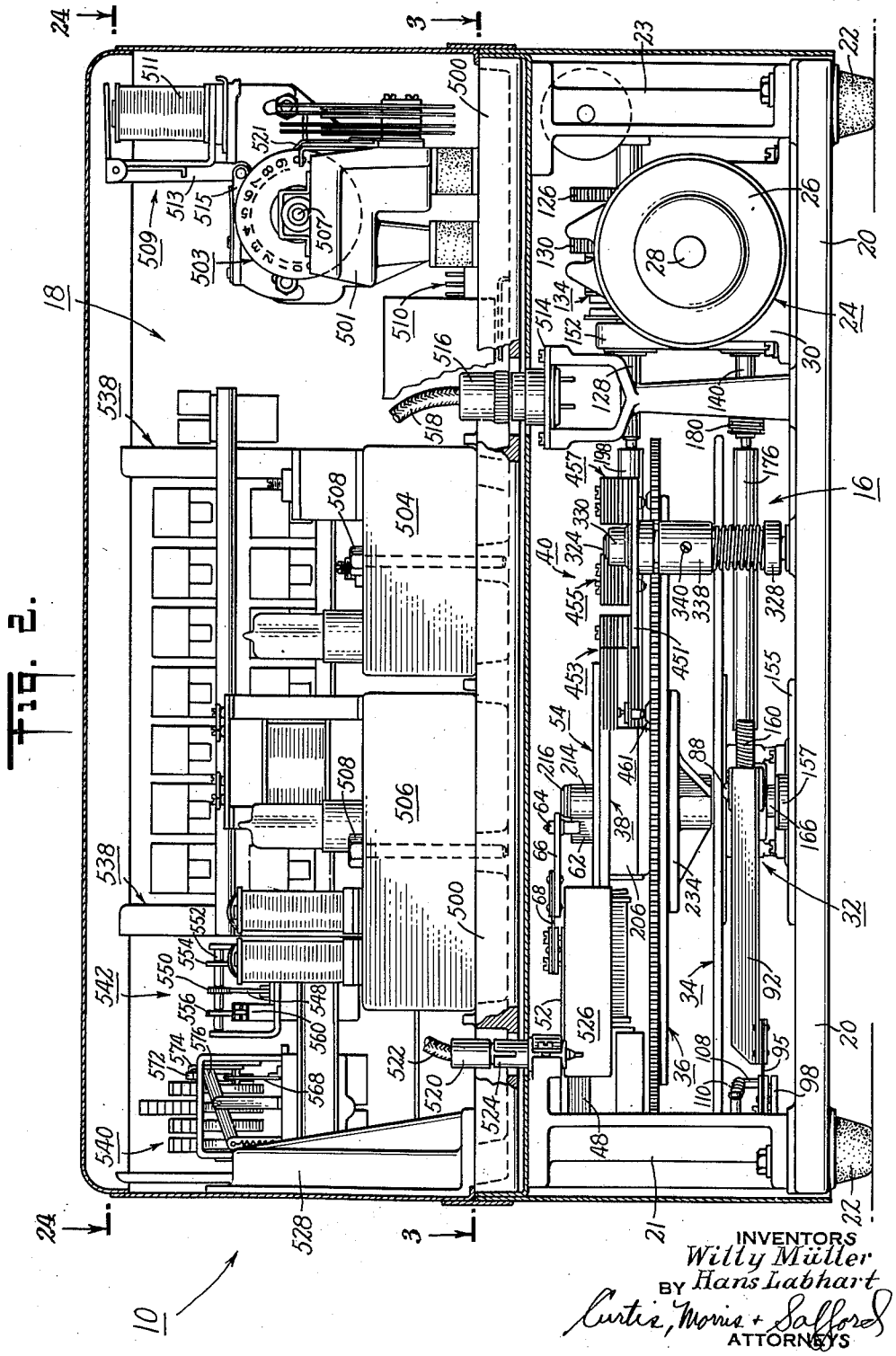

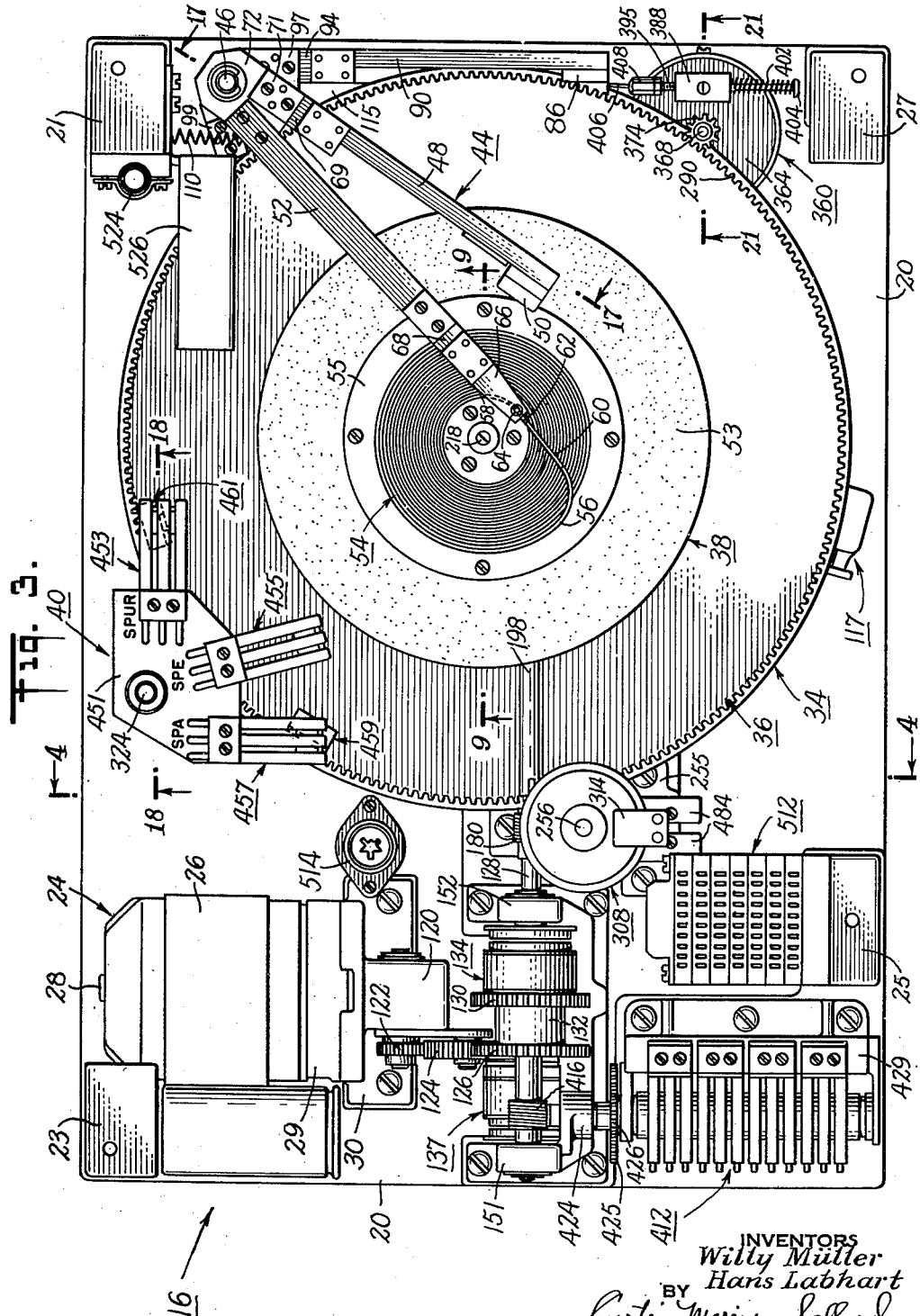

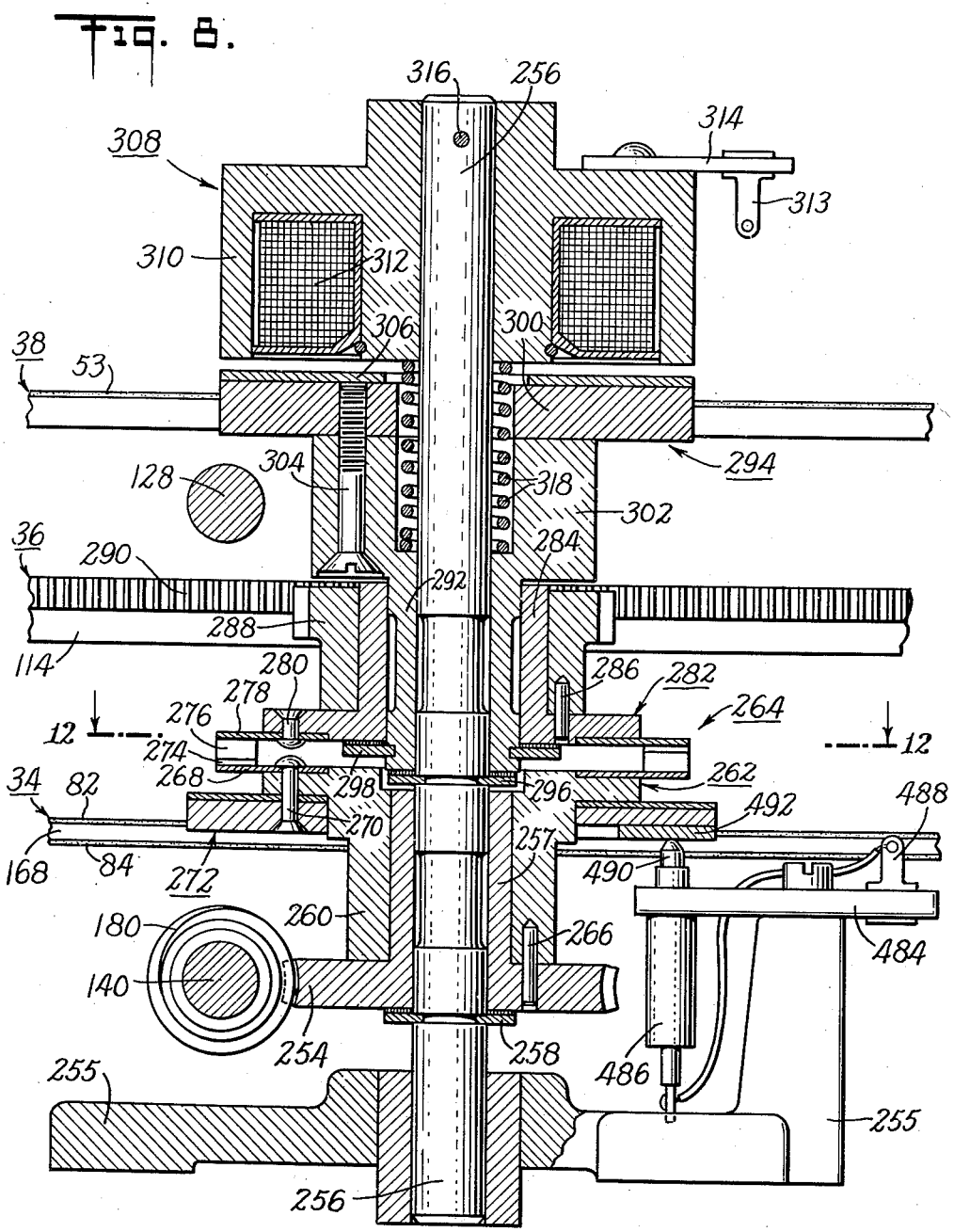

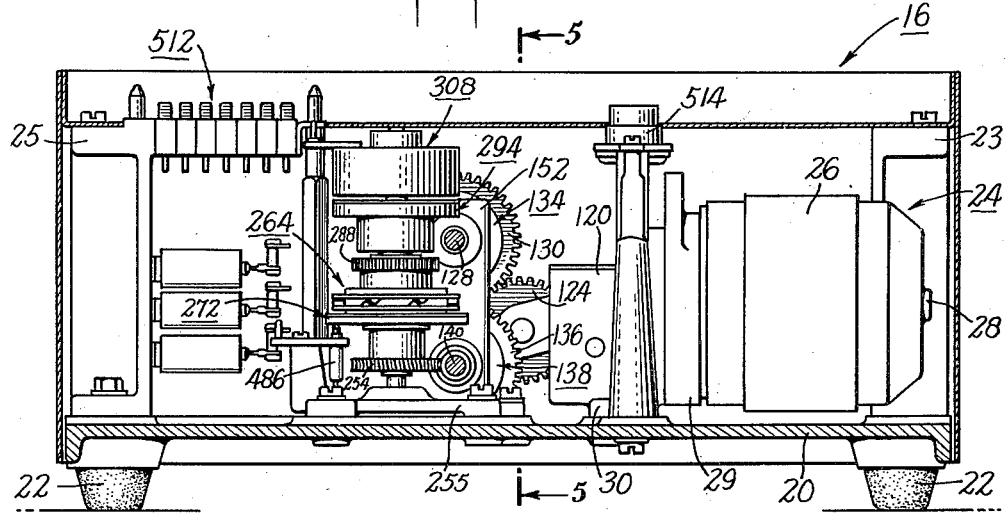
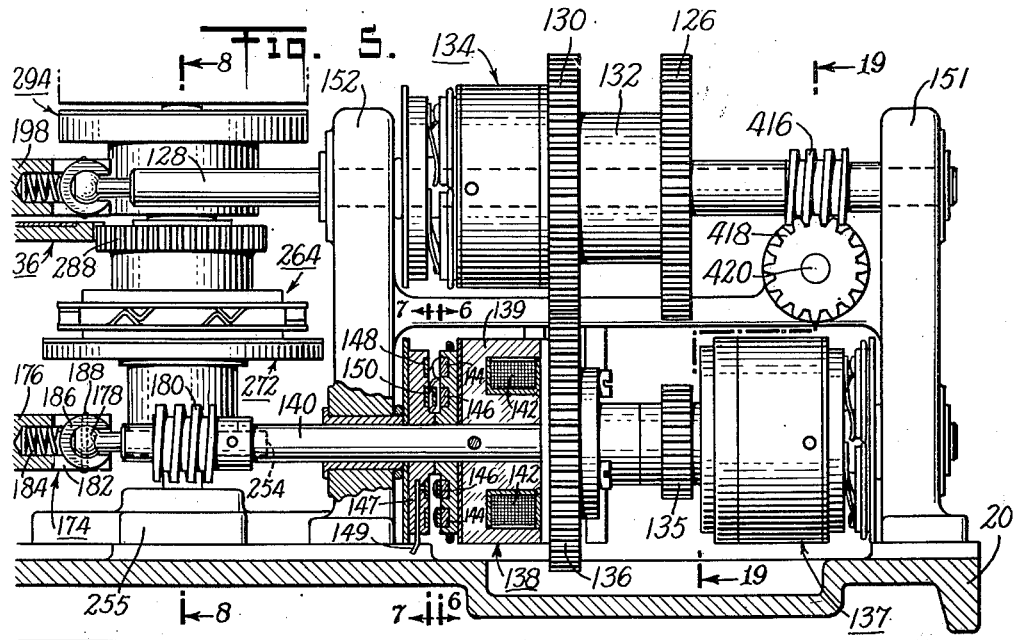
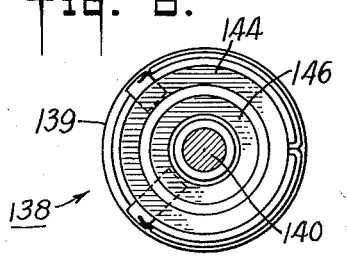
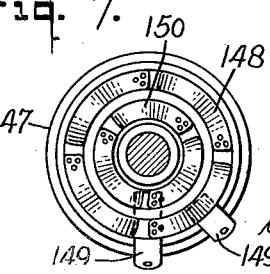

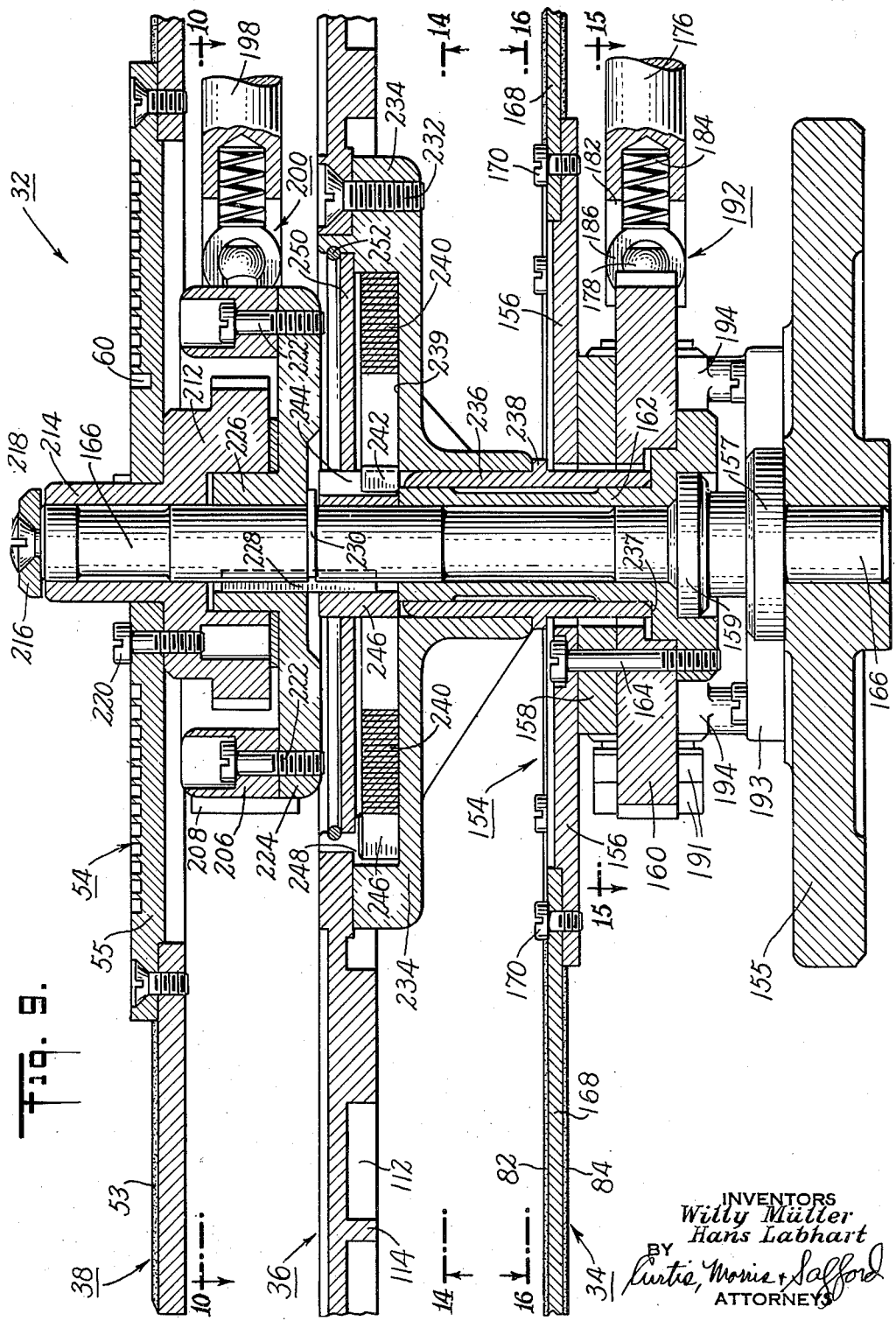

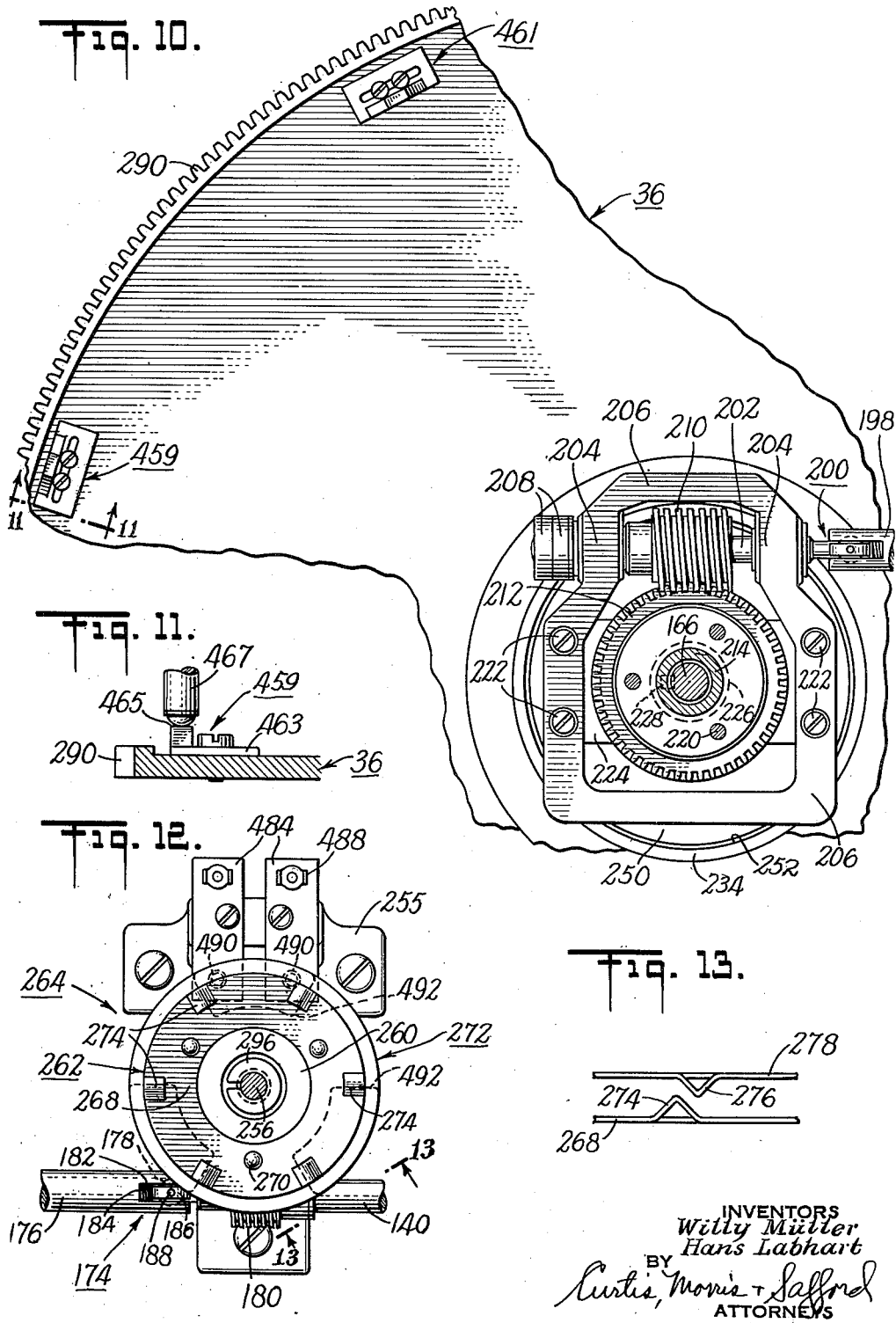

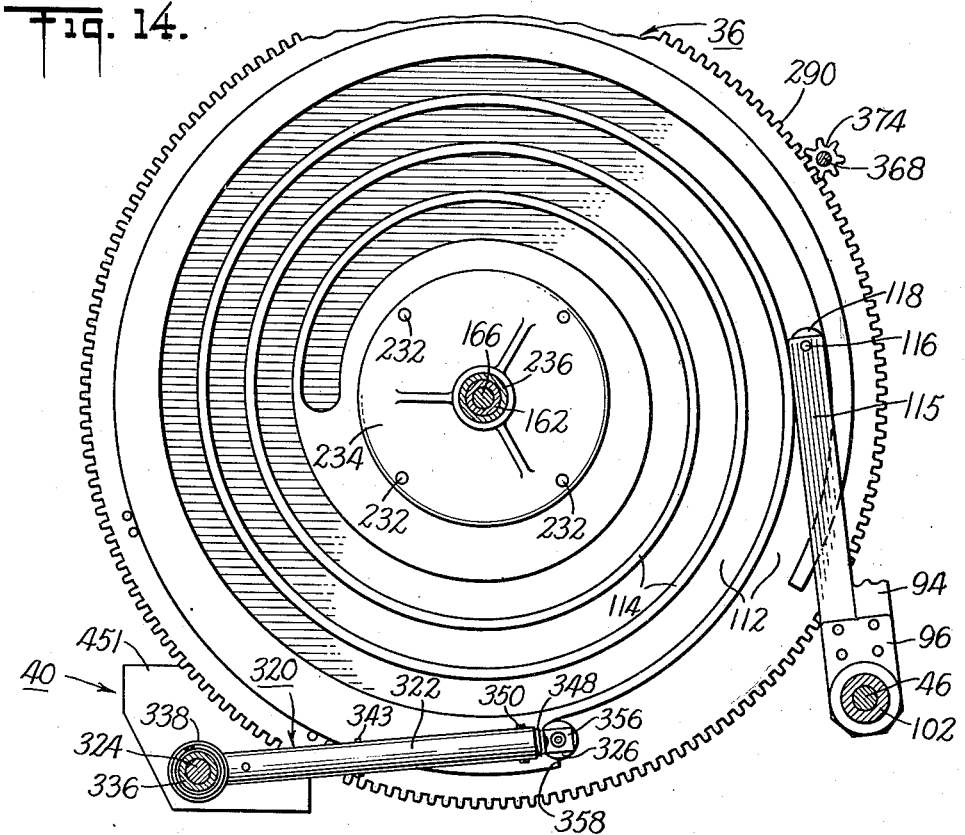
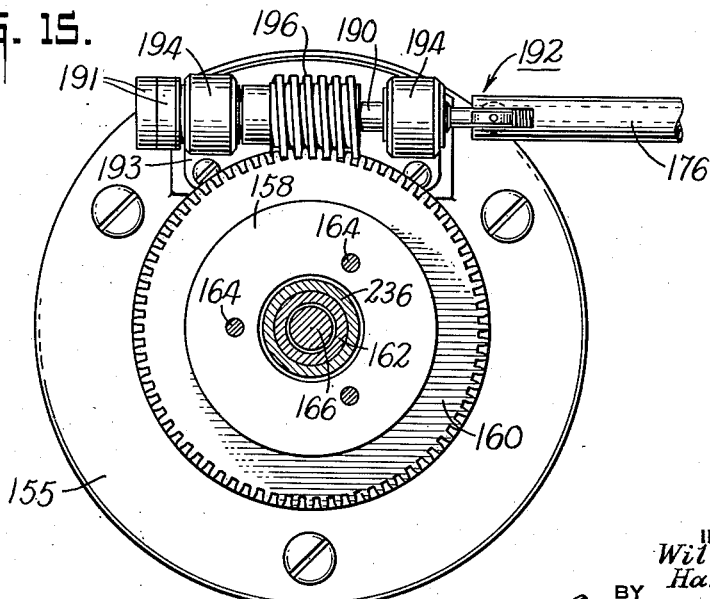

INVENTORS
Willy Müller
Hans Labhart
BY
Curtis, Morris + Safford
ATTORNEYS

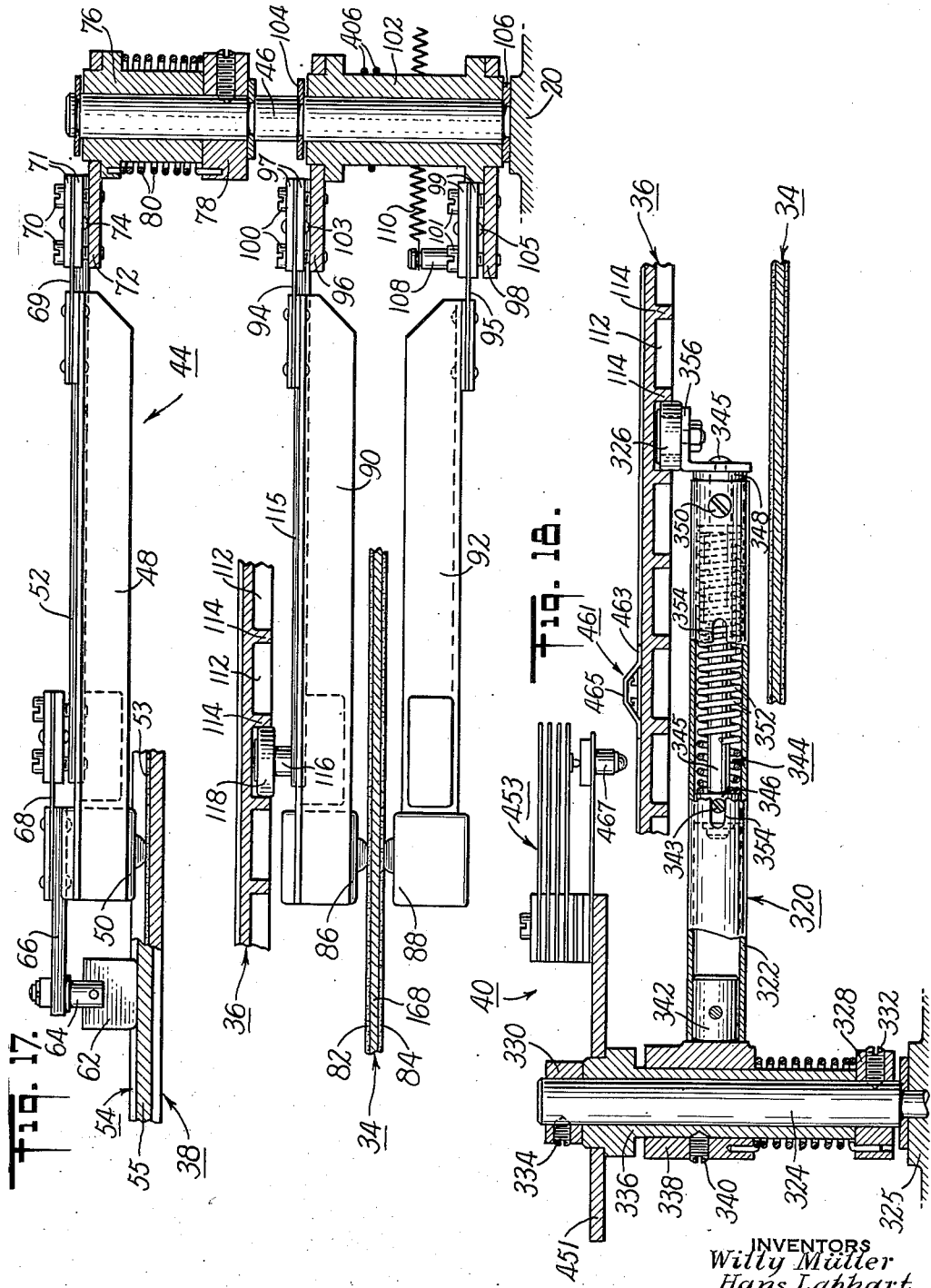

Dec. 10, 1957 W. MÜLLER ET AL 2,816,167
TELEPHONOGRAPH SYSTEM AND APPARATUS AND METHOD
Filed Aug. 22, 1951 26 Sheets-Sheet 11
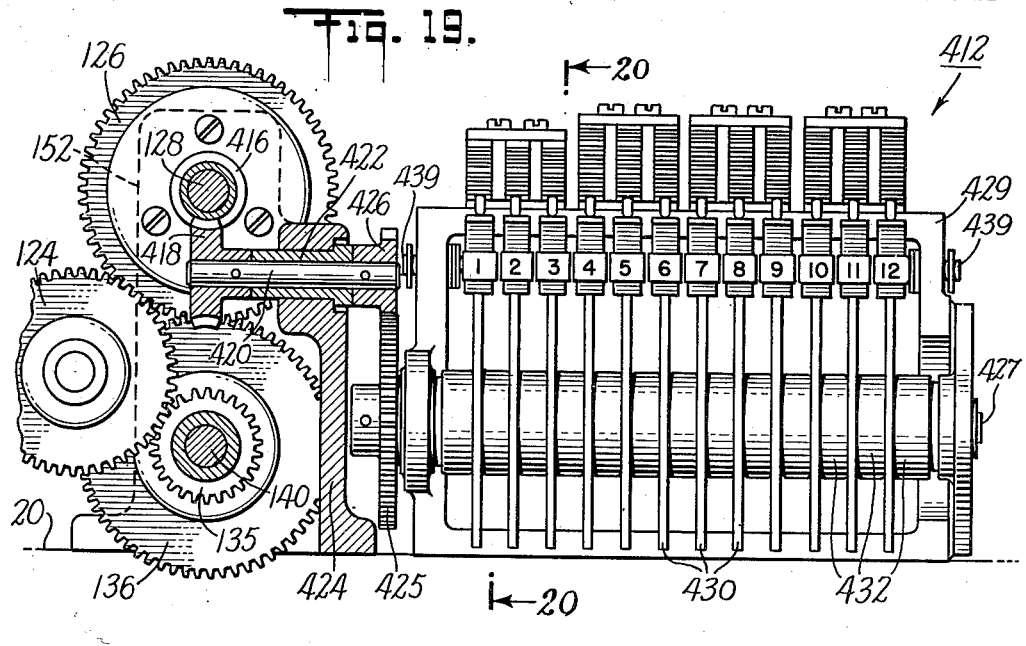
INVENTORS
Willy Müller
Hans Labhart
BY
Curtis, Morris & Safford
ATTORNEYS

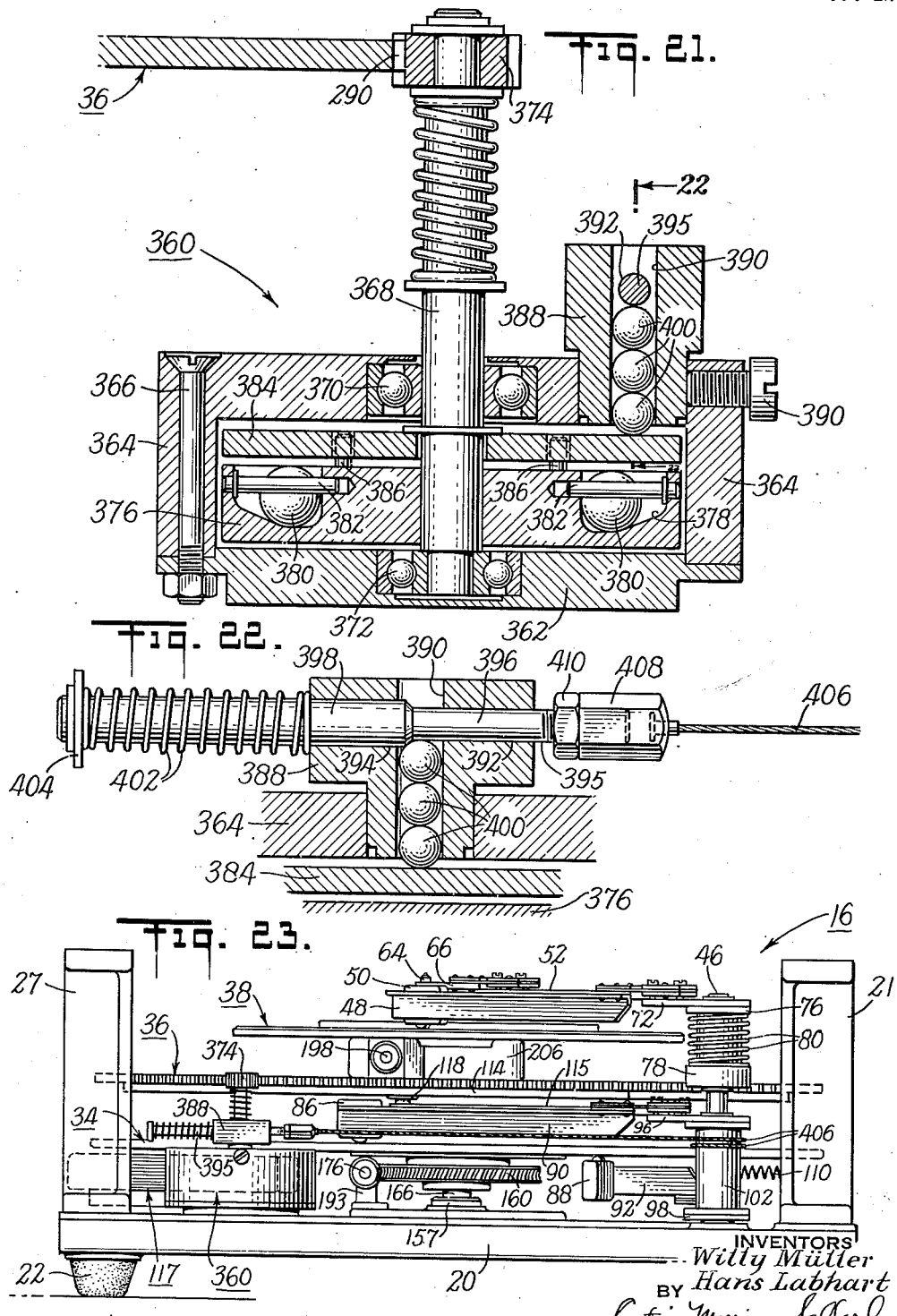

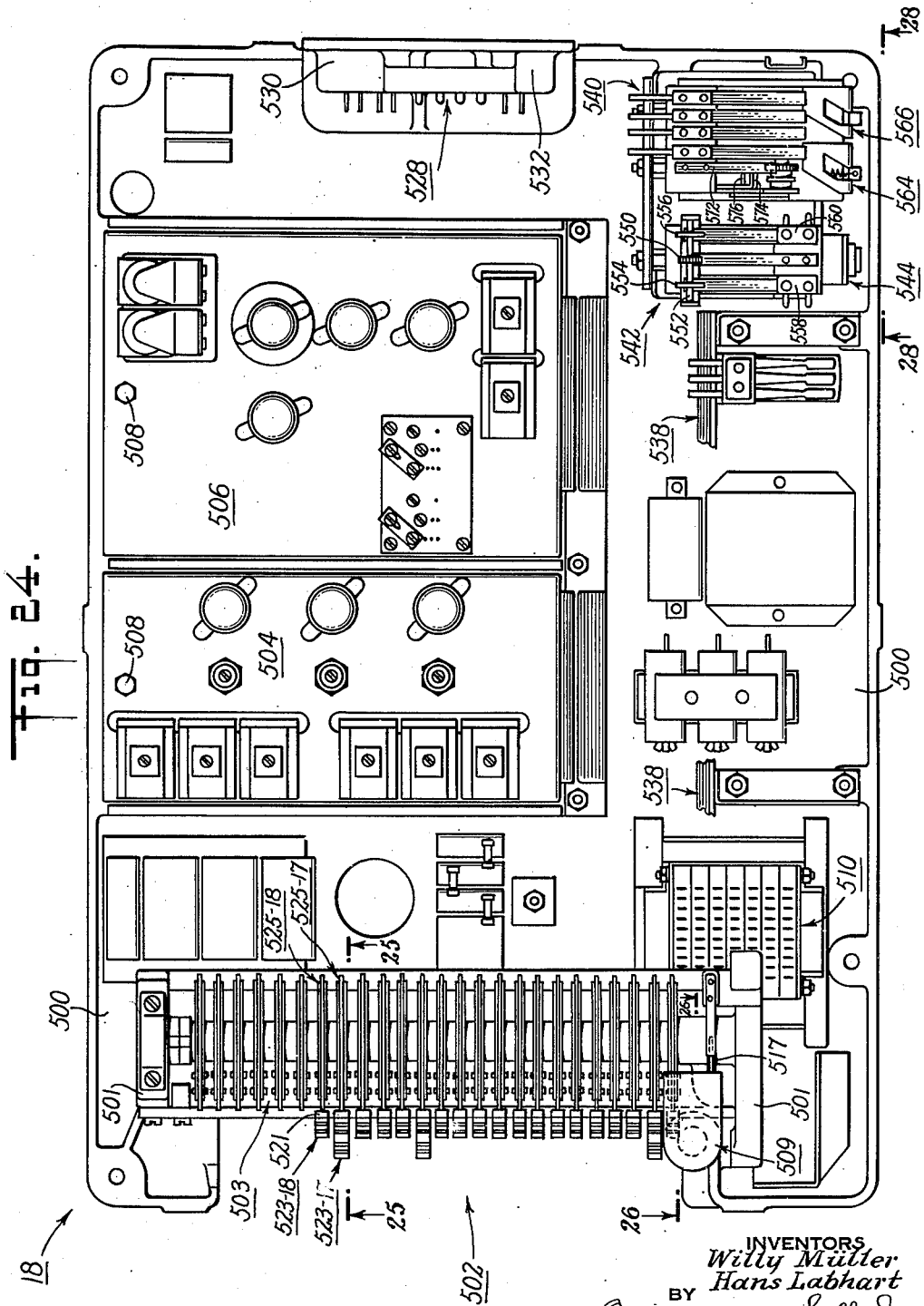

Dec. 10, 1957 W. MÜLLER ET AL 2,816,167
TELEPHONOGRAPH SYSTEM AND APPARATUS AND METHOD
Filed Aug. 22, 1951 26 Sheets-Sheet 14
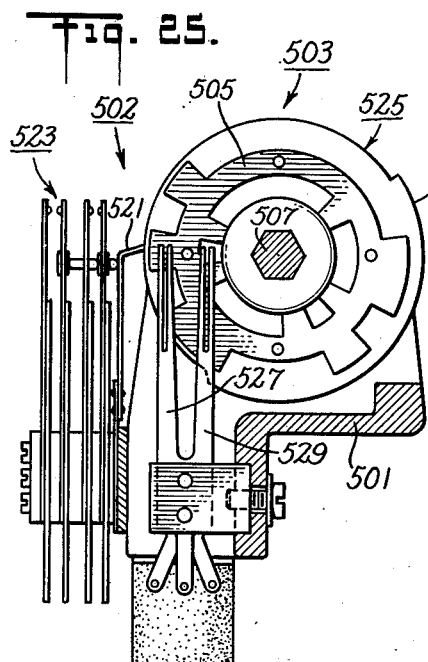
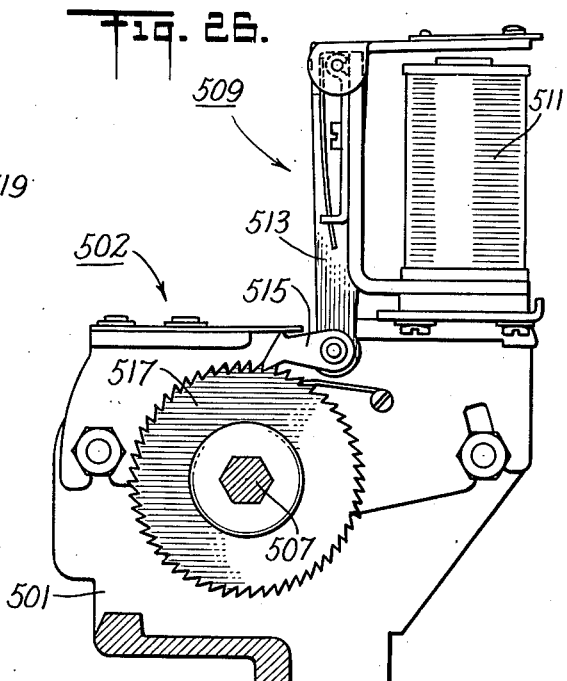
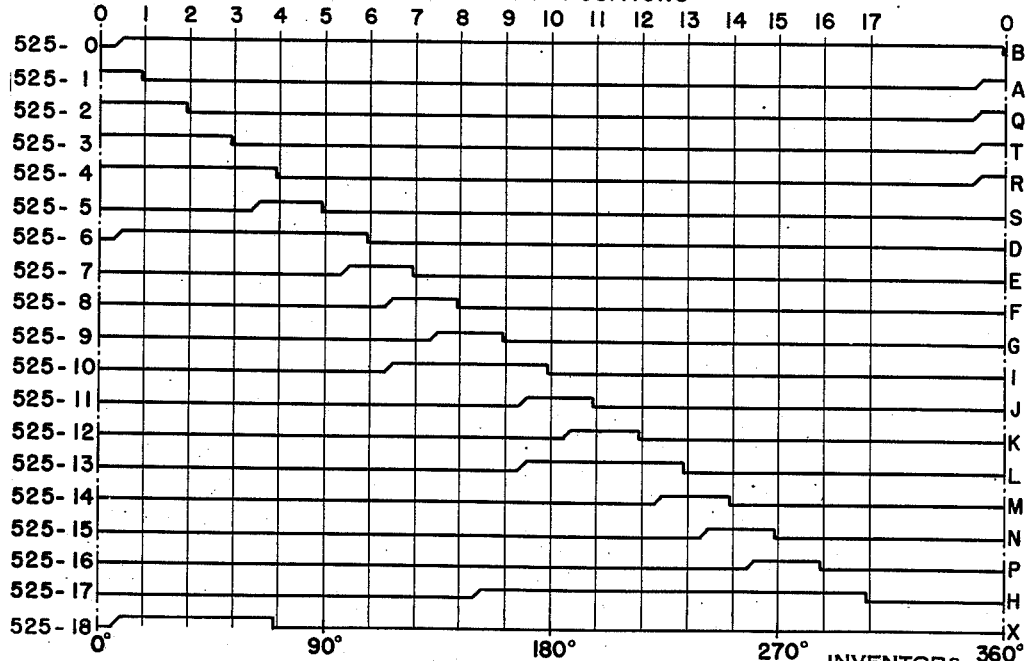
INVENTORS
Willy Müller
Hans Labhart
BY
Curtis, Morris + Safford
ATTORNEYS

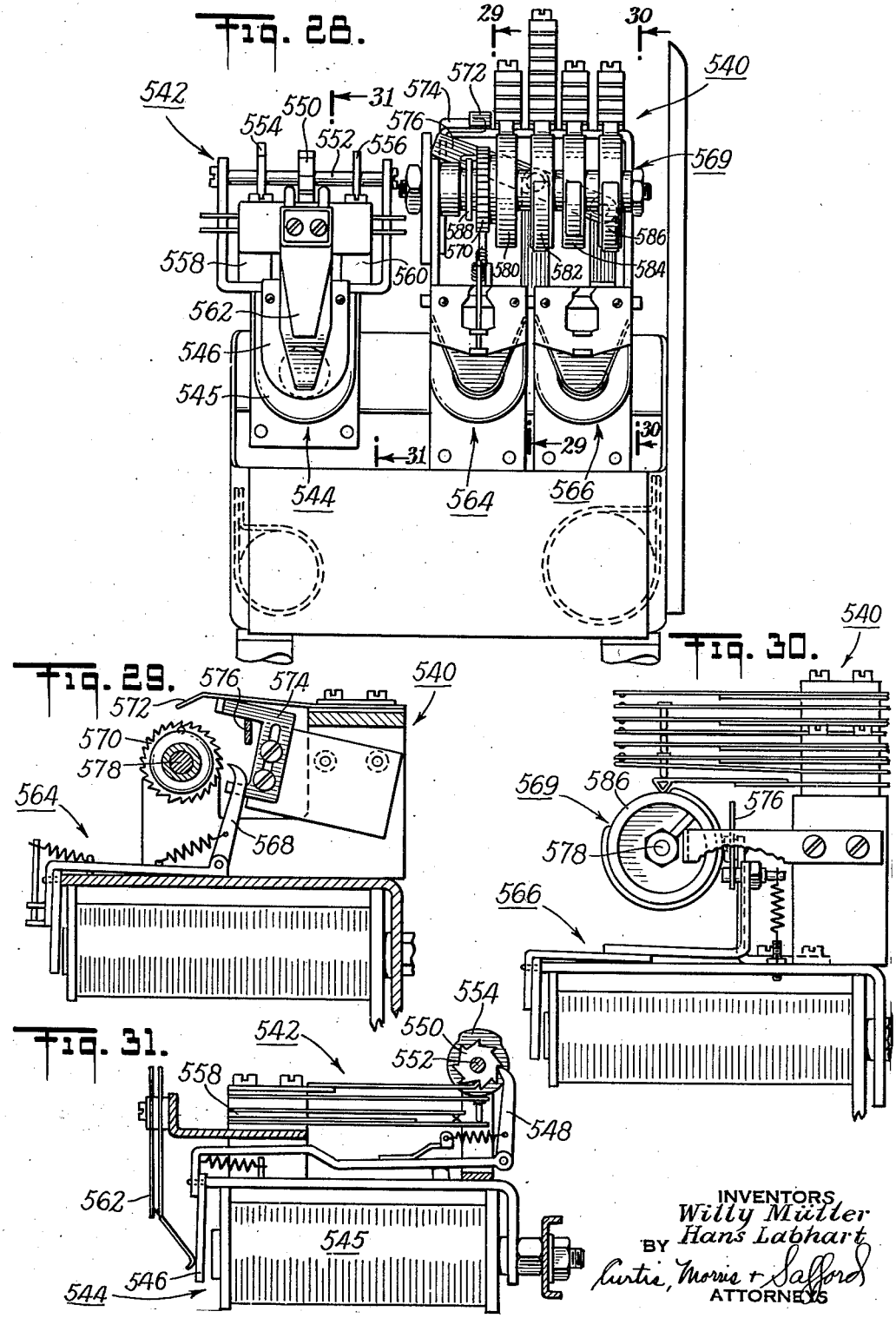

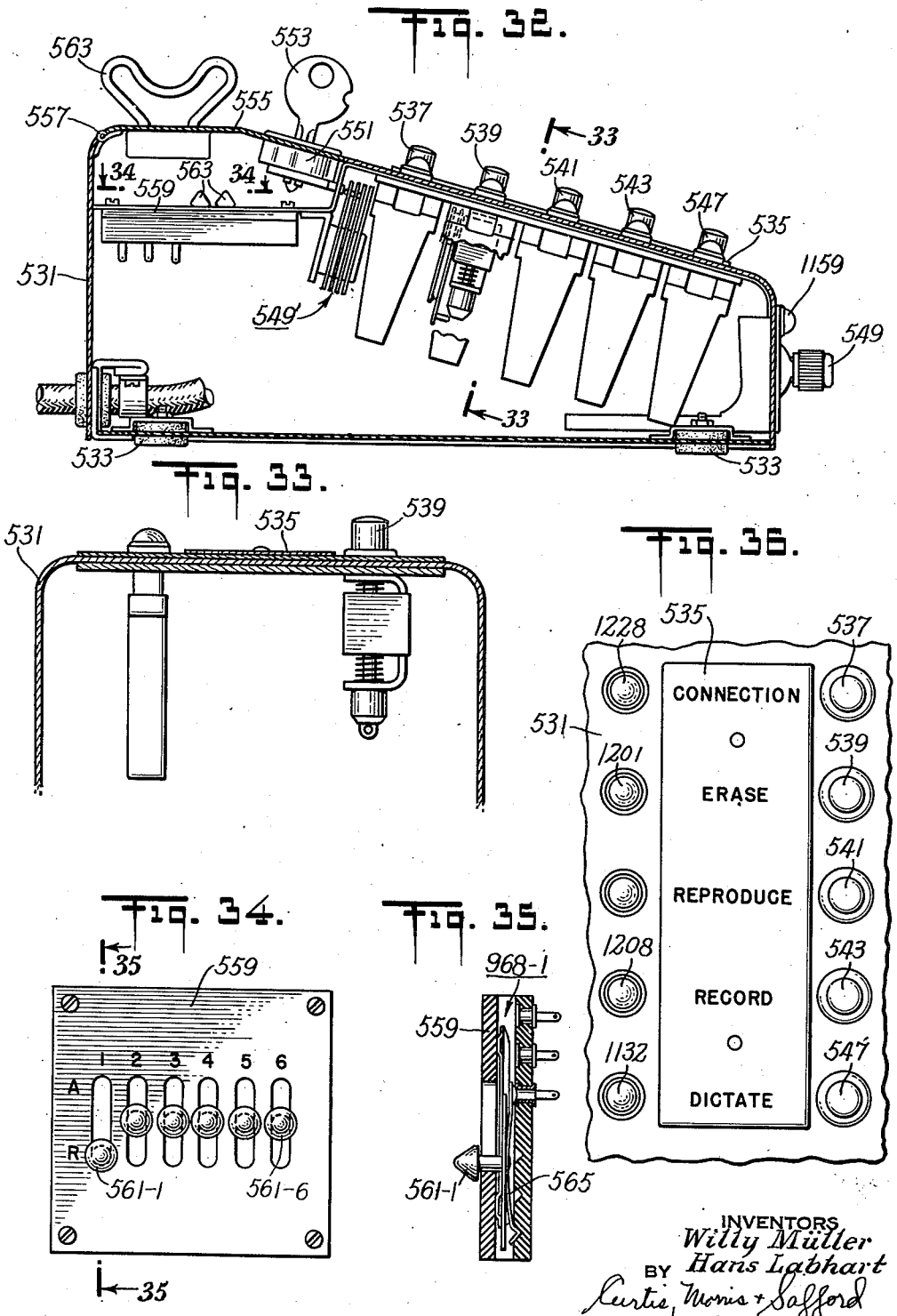

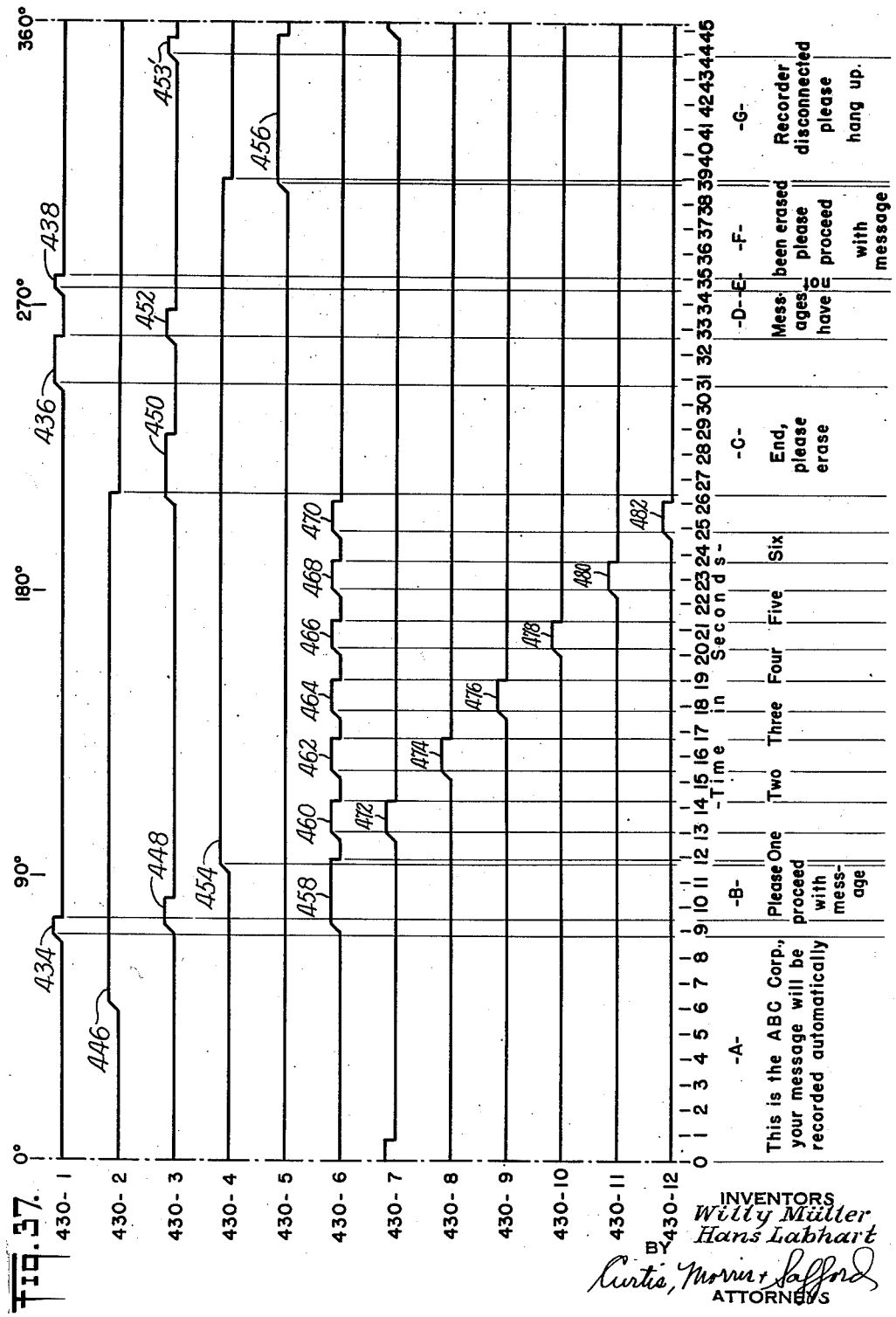

Dec. 10, 1957 W. MÜLLER ET AL 2,816,167
TELEPHONOGRAPH SYSTEM AND APPARATUS AND METHOD
Filed Aug. 22, 1951 26 Sheets-Sheet 18

INVENTORS
Willy Müller
BY Hans Labhart
Curtis, Morris & Safford
ATTORNEYS

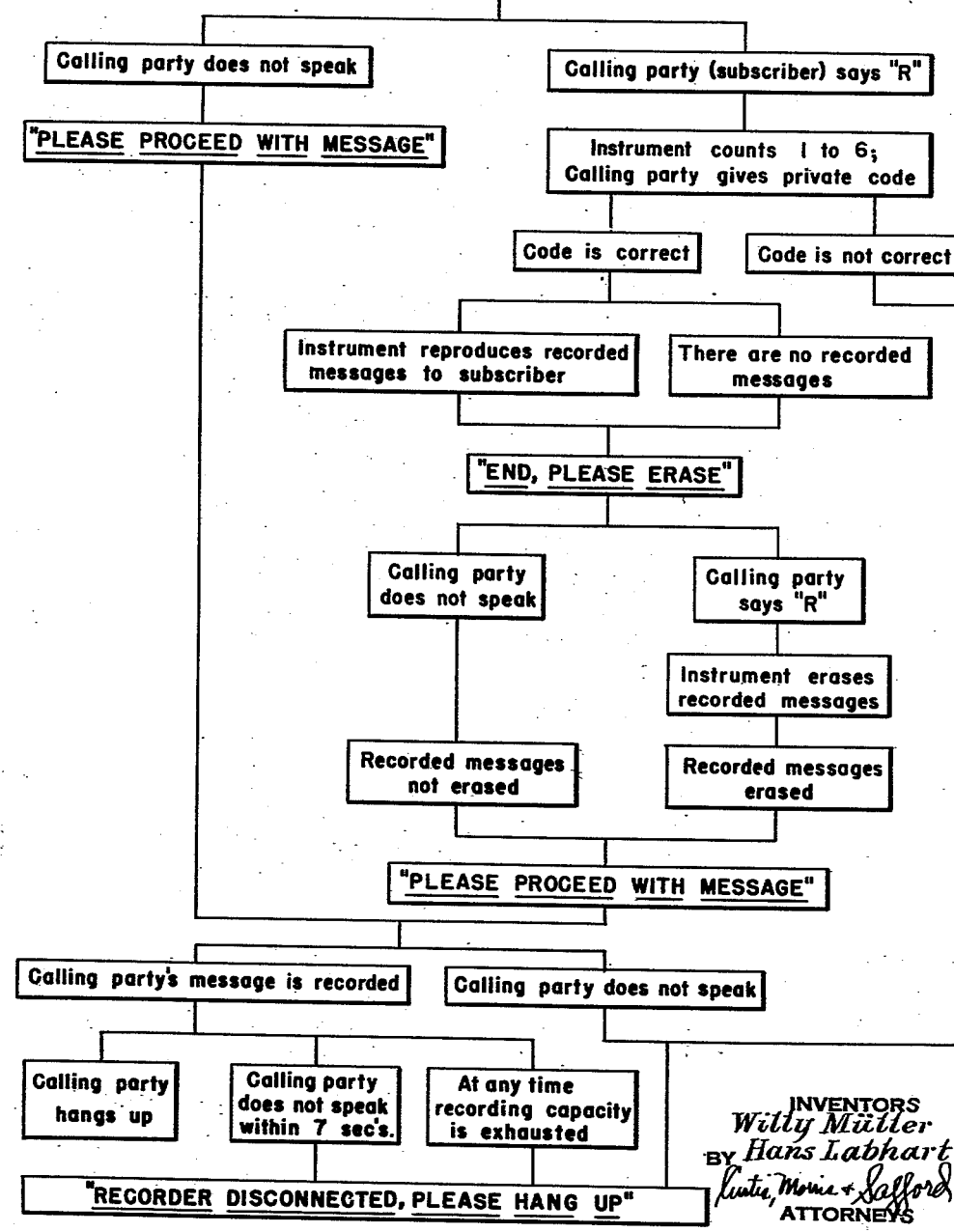

Dec. 10, 1957 W. MÜLLER ET AL 2,816,167
TELEPHONOGRAPH SYSTEM AND APPARATUS AND METHOD
Filed Aug. 22, 1951 26 Sheets-Sheet 20

INVENTORS
Willy Müller
Hans Labhart
BY
Curtis, Morris + Safford
ATTORNEYS

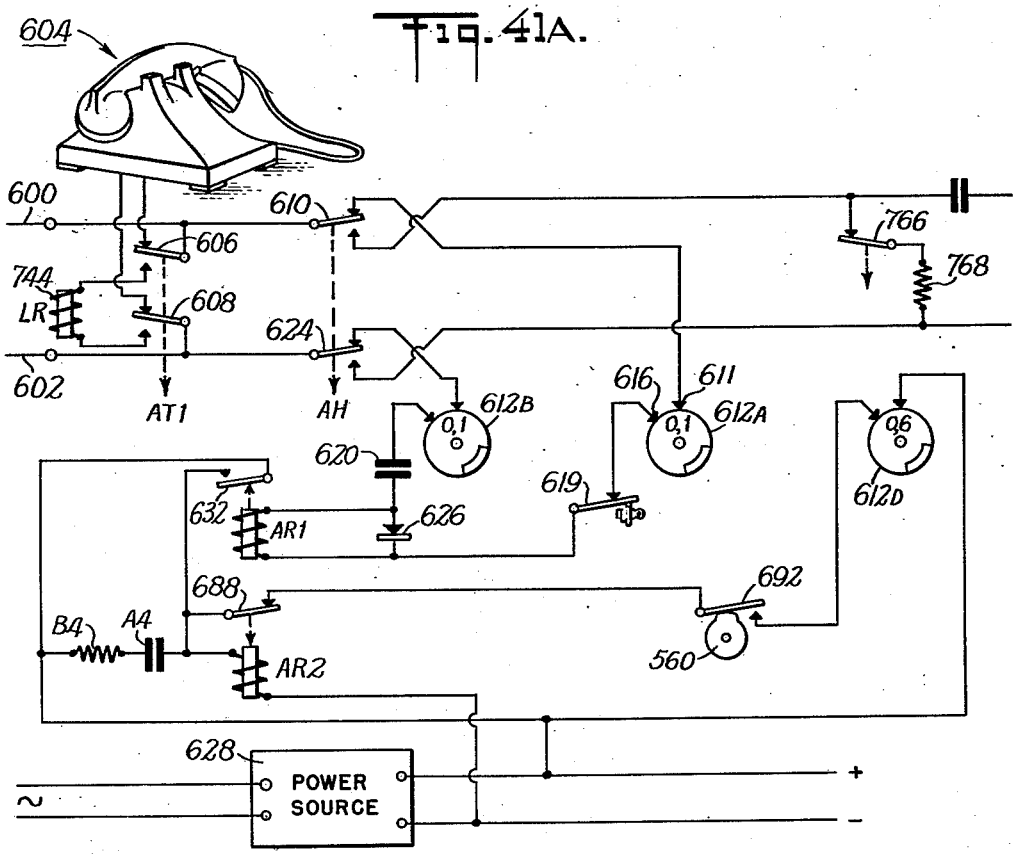
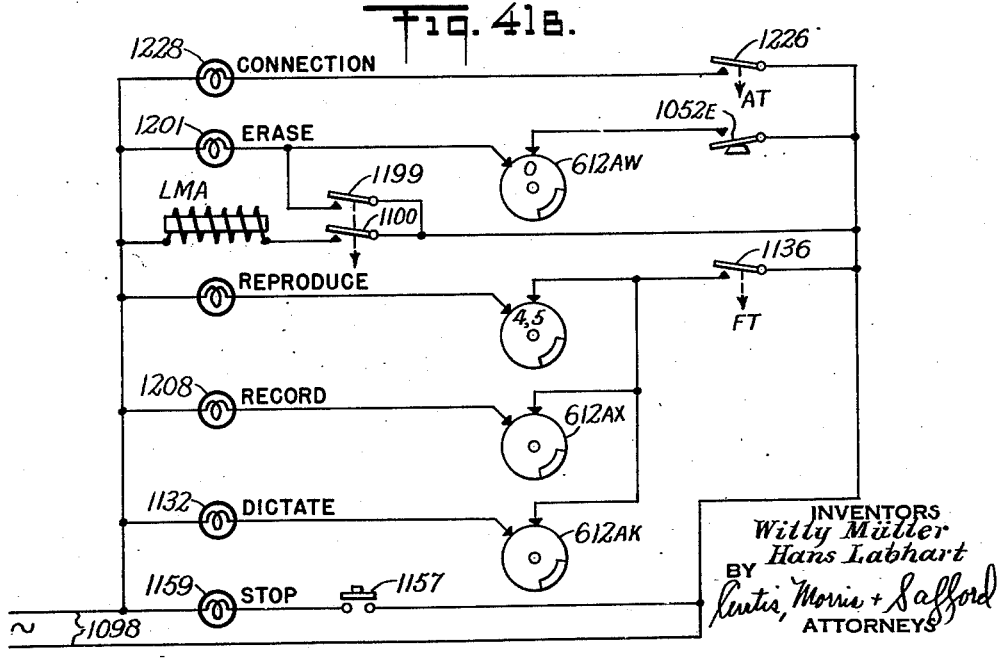

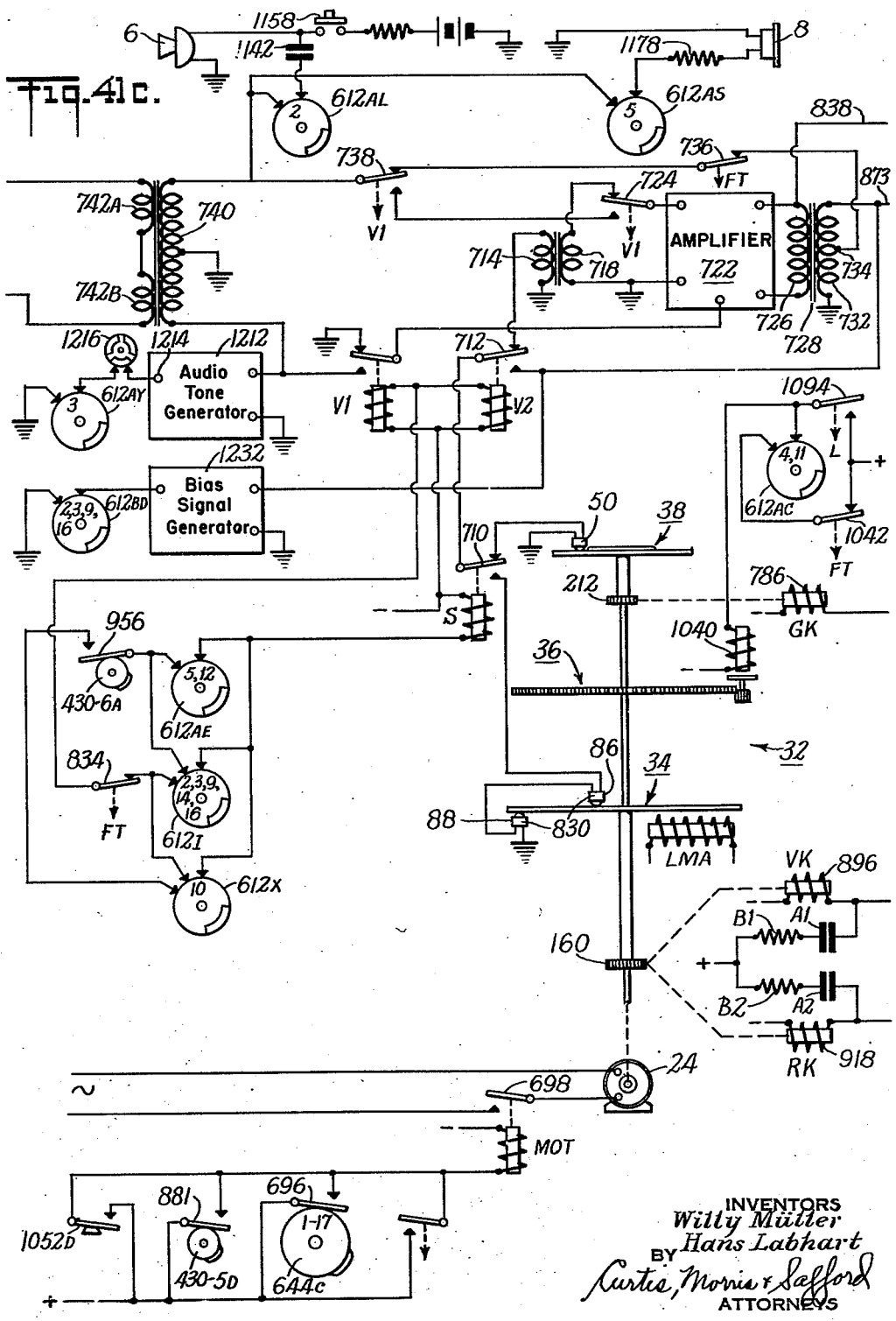

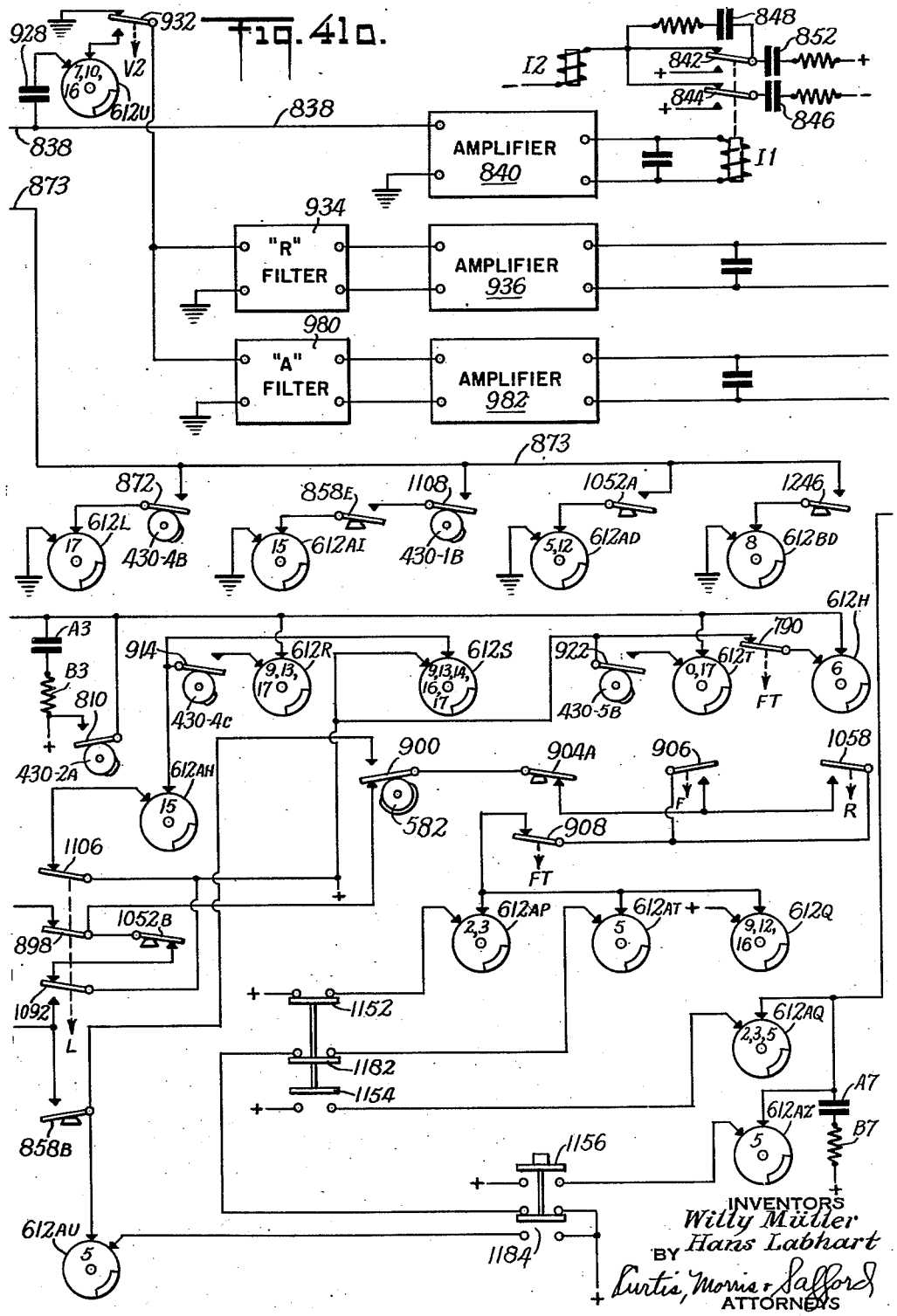

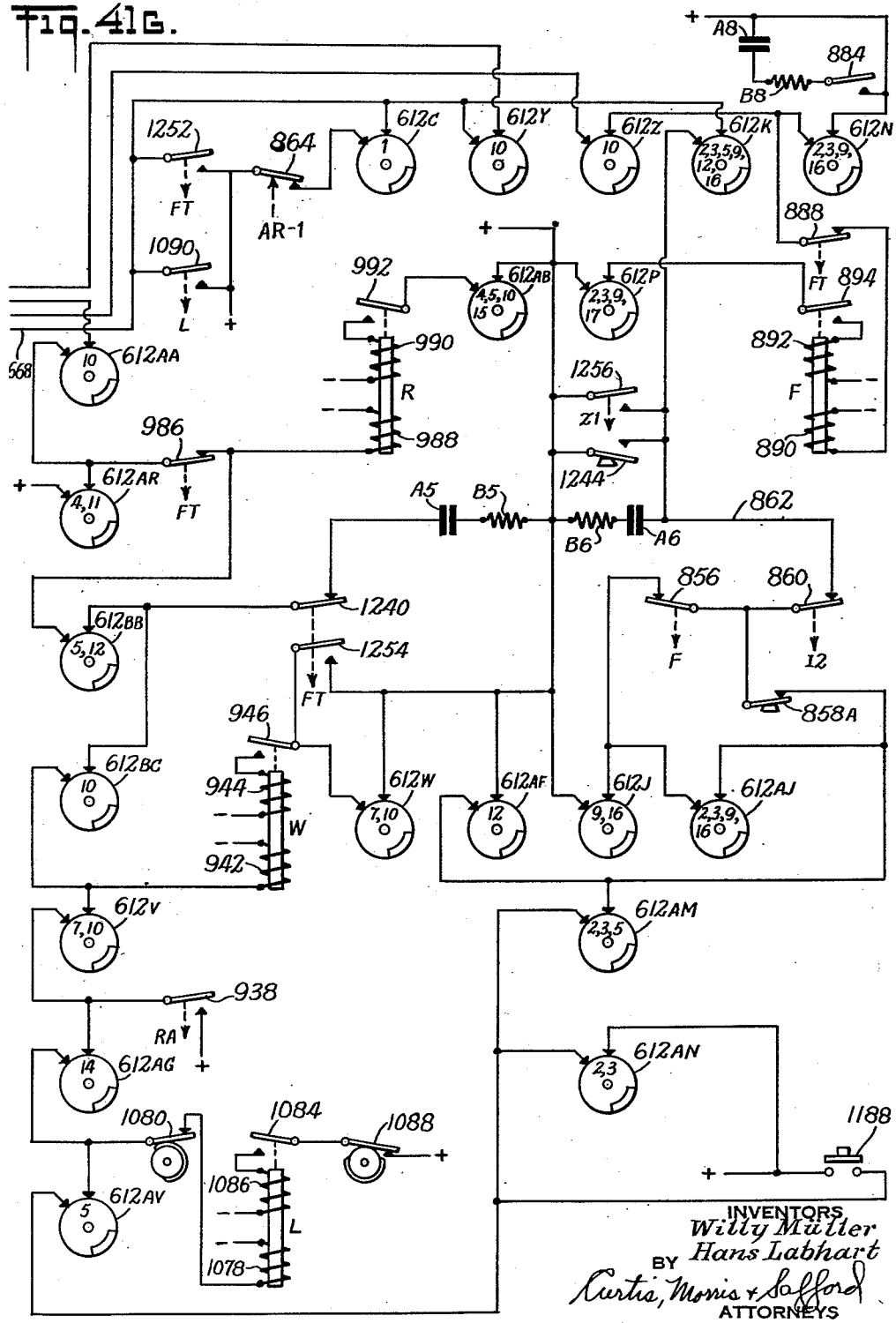

Dec. 10, 1957   W. MÜLLER ET AL   2,816,167
TELEPHONOGRAPH SYSTEM AND APPARATUS AND METHOD
Filed Aug. 22, 1951   26 Sheets-Sheet 26

United States Patent Office 2,816,167
Patented Dec. 10, 1957

2,816,167

TELEPHONOGRAPH SYSTEM AND APPARATUS AND METHOD

Willy Müller and Hans Labhart, Zurich, Switzerland, assignors to Daphne Investment Trust, Vaduz, Liechtenstein, a corporation of Liechtenstein Application August 22, 1951, Serial No. 243,012

3 Claims. (Cl. 179—6)

This invention relates to telephonographs and to automatic control; and, more in particular, to improvements in the construction and operation, and the control of devices and apparatus, such as may comprise part of or be connected to a telephone system to automatically record message received, and to reproduce the messages to the proprietor by remote or direct control.

An object of this invention is to provide thoroughly practical and versatile equipment of the character referred to above which avoids real and supposed difficulties such as might be encountered with other similar apparatus. A further object is to provide apparatus having characteristics of control and construction which permit functions and features of operation which have not been possible with prior apparatus. A further object is to provide for the above with apparatus which is adaptable to many conditions of use, and to meet the demands of those who desire or require special features and characteristics of operation.

Many different telephonograph systems have been proposed, and some have been constructed which have been practical in many respects, particularly for certain conditions of operation. However, the requirements for a universally acceptable system of this character are so precise and exact that there has been no substantial acceptance of the prior systems. It is not deemed necessary to compare the system herein disclosed with all of the prior systems which have been proposed, or even with the systems which have been constructed and put into limited use, but it should be noted that the illustrative embodiment of the present invention incorporates certain characteristics which are similar to those of some of the prior systems. However, with respect to many of these features it should be noted that some changes in the construction or mode of operation involved in the present invention have made it practical to incorporate the features into a system which is commercially acceptable in every respect. Thus, it is a further object of the present invention to avoid the difficulties and objections which have been encountered or may be encountered with similar systems. It is a further object to provide for such systems wherein certain of the features may be omitted or disregarded without affecting other features, and wherein certain of the features of construction and operation are adaptable to other systems and uses. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings:

Figure 2 is a front elevation with the casing broken away of the main unit of Figure 1;

Figure 3 is a horizontal section on the line 3—3 of Figure 2;

Figure 4 is a vertical section on the line 4—4 of Figure 3;

Figure 5 is an enlarged vertical section on the line 5—5 of Figure 4;

Figure 1B:
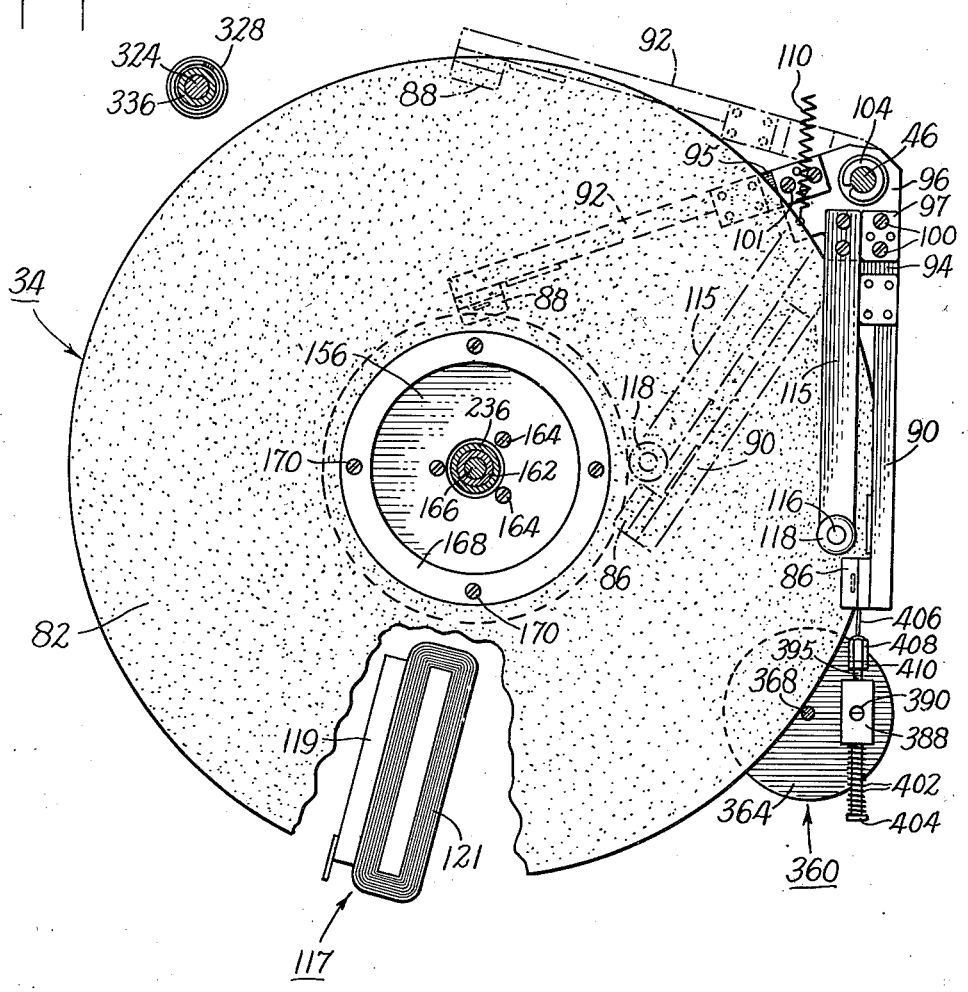
Figure 1 is a perspective view of the units which constitute one embodiment of the invention.
Figure 37A:
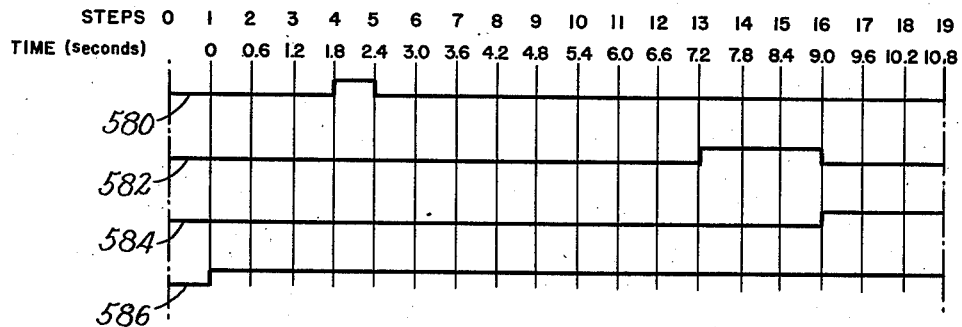
Figure 37B:
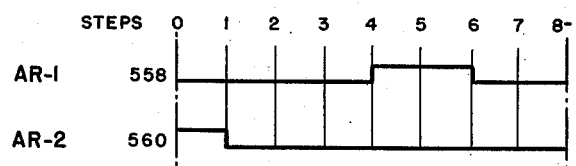
Figure 37C:
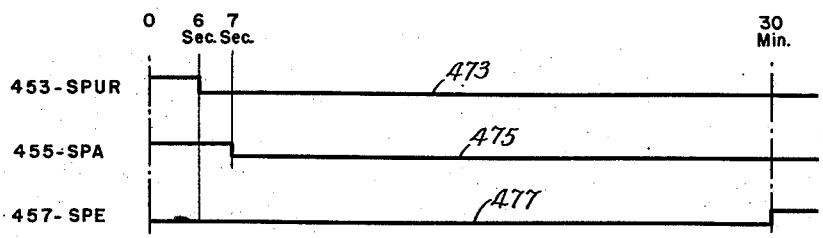
Figure 39:
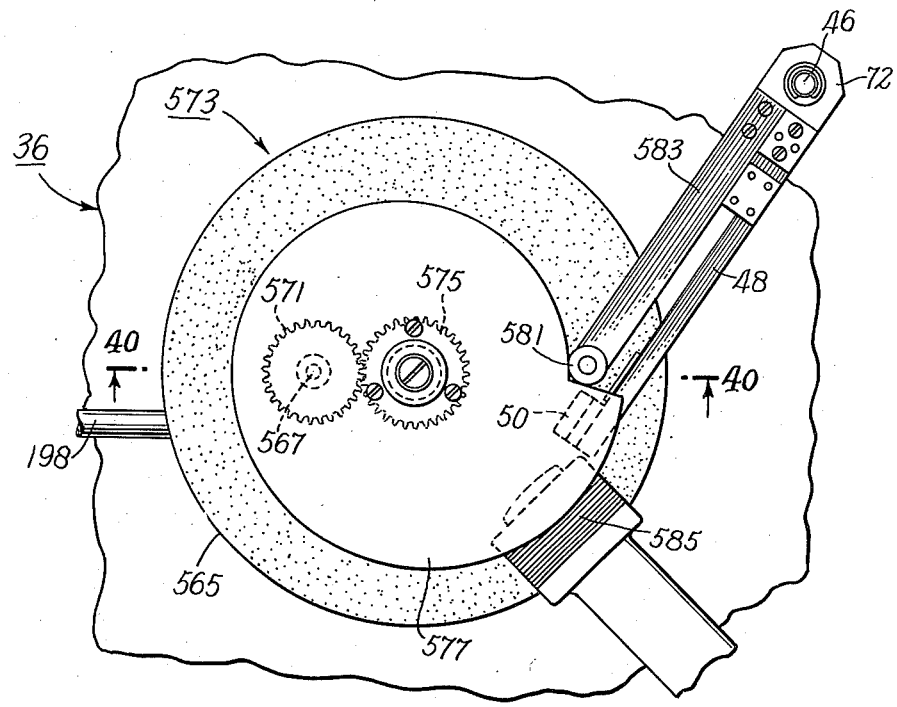
Figure 40:
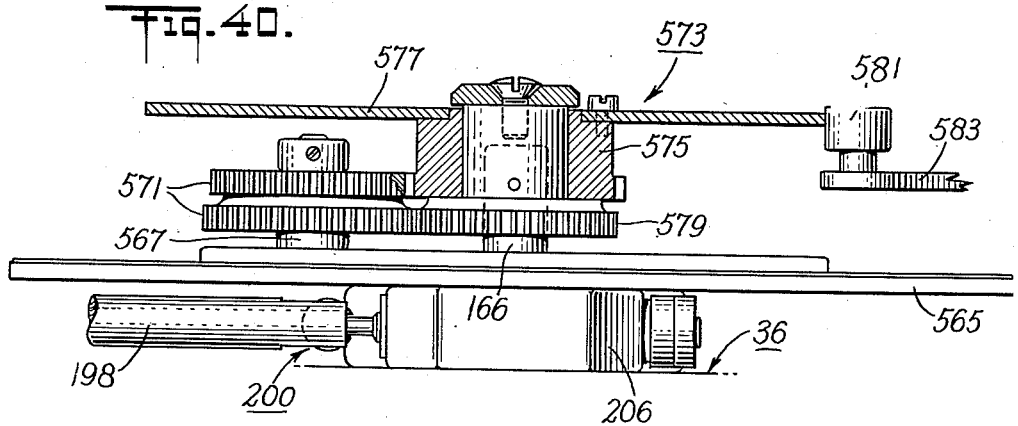
Figure 41E:
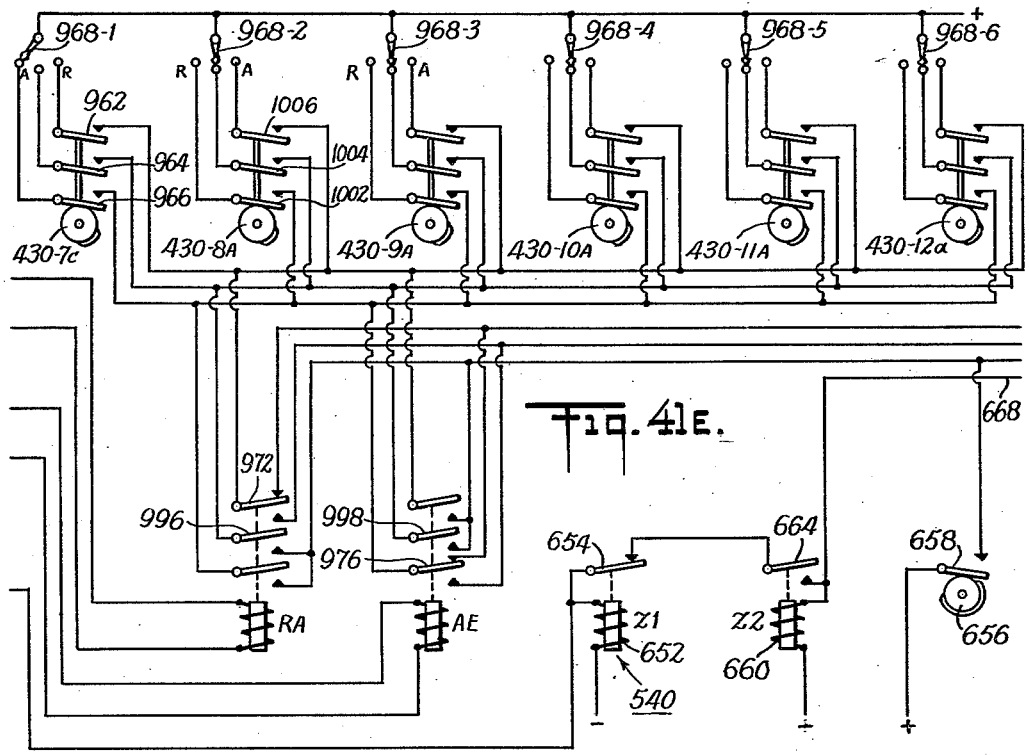

Figures 6 and 7 are vertical sections on the lines 6—6 and 7—7 of Figure 5;

Figure 8 is an enlarged vertical section on the line 8—8 of Figure 5;

Figure 9 is an enlarged vertical section on the line 9—9 of Figure 3;

Figure 10 is a fragmentary horizontal section on the line 10—10 of Figure 9;

Figure 11 is a fragmentary vertical section on the line 11—11 of Figure 10;

Figure 12 is a horizontal section on the line 12—12 of Figure 8;

Figure 13 is a fragmentary side plan view on the line 13—13 of Figure 12;

Figures 14, 15 and 16 are horizontal sections on the lines 14—14, 15—15 and 16—16 of Figure 9 with Figures 14 and 16 being on reduced scales;

Figures 17 and 18 are enlarged horizontal sections on the lines 17—17 and 18—18 of Figure 3;

Figure 19 is a vertical section on the line 19—19 of Figure 5;

Figure 20 is a vertical section on the line 20—20 of Figure 19;

Figure 21 is an enlarged sectional view on the line 21—21 of Figure 3;

Figure 22 is a sectional view on the line 22—22 of Figure 21;

Figure 23 is an end elevation as shown at the right of Figure 3;

Figure 24 is a top plan view of the unit of Figure 2 taken on the line 24—24;

Figures 25 and 26 are vertical sections, respectively, on the lines 25—25 and 26—26 of Figure 24;

Figure 27 is a schematic representation of the contours of the cams of the sequence switch;

Figure 28 is a vertical view on the lines 28—28 of Figure 24;

Figures 29 to 31 inclusive are vertical views respectively, on the correspondingly numbered lines of Figure 28;

Figure 32 is a vertical section of the control unit of Figure 1;

Figure 33 is a vertical section on the line 33—33 of Figure 32;

Figure 34 is a horizontal view on the line 34—34 of Figure 32;

Figure 35 is a sectional view on the line 35—35 of Figure 34;

Figure 36 is a fragmentary top plan view of the top panel of the control unit of Figure 32;

Figure 37 is a schematic representation of the contours of the cams of the announcement and control switch;

Figures 37A, 37B and 37C are similar and represent other functions of the operation;

Figure 38 is a chart showing the mode of operation of the system;

Figure 39 is a top plan view of a portion of another model of the invention and showing a changed construction;

Figure 40 is a sectional view on the line 40—40 of Figure 39; and,

Figure 41 is a schematic wiring diagram of the system with there being six sections of the various sheets of the figure designated individually as 41A to 41H.

The present embodiment of the invention will now be discussed to a sufficient extent to permit understanding of its operation, and following this discussion the details of construction and operation will be discussed in connection with the drawings.

In accordance with the present invention, a fully automatic telephonograph is provided which acts during the absence of the subscriber to automatically answer incoming telephone calls, and to give the calling party an opportunity to leave a message which is recorded. The subscriber may then receive the messages upon his return, or he may telephone from a remote point and receive the messages over the telephone system by giving predetermined and changeable vocal code signals. The illustrative embodiment of the invention has the additional characteristics that it can be used to record telephone conversations when the subscriber is talking from his telephone, and the subscriber may use the apparatus as a dictating machine.

While the fundamental characteristic of the apparatus is that it answers telephone calls during the absence of the subscriber, it should be noted that it is thoroughly practical at times for the subscriber also to rely upon the apparatus to answer the telephone and take messages at any time that he is too occupied with other duties to answer the telephone himself. Under such circumstances he could receive messages which he would otherwise miss, and it would not be necessary for the calling party to stay on the telephone for long ringing periods, or to attempt to call at a later time.

The illustrative embodiment of the invention is shown in Figure 1 and comprises: a control instrument 2 having a hand set 4, connected thereto and comprising a mouth piece 6 and an ear piece or receiver 8; a recording and control unit 10 to which the outside telephone line 11 and the subscriber's telephone is connected; and, a power unit 12, having a male plug 14 which is adapted to be plugged into an electric power outlet. Unit 10 has a base section 16 and an upper section 18 which are enclosed in suitable metal casings. Generally speaking, the base section comprises the mechanical equipment which is the recording and reproducing mechanism, and the announcement mechanism whereby the calling party is informed of the fact that the telephone call is being answered by the telephonograph and that the calling party may give a message which will be recorded. The upper section 18 includes most of the electrical mechanism which performs many control and switching functions including the major portion of the control characteristics.

As has been indicated, the telephonograph includes means to answer the telephone whenever the subscriber wishes. The illustrative embodiment operates in accordance with the diagram of Figure 38 wherein the main functions and the messages to the calling party appear. This embodiment is so constructed and arranged that it answers the telephone whenever the telephone has rung four times, and it is adjustable for answering after any of one to six rings. Thus, assuming that the subscriber is present, he will be given an opportunity to answer the phone, but if he does not the telephonograph goes into operation. The telephonograph then connects the telephone line to the announcement mechanism so that the calling party receives the following introductory message: "This is the ABC Corporation. Your message will be recorded automatically."

Assuming that the calling party is not the subscriber, the calling party receives the following instruction message: "Please proceed with message." If the calling party speaks, his message will be recorded, and the apparatus has a recording capacity of thirty minutes of messages. However, if at any time there is a period of time of seven seconds during which no voice sound occurs, then the recording equipment is disconnected automatically, and the following final message is given to the calling party: "Recorder disconnected, please hang up." Furthermore, if the calling party has no message, he is given this same final message after the seven-second interval. The arrangement is such that if the party hangs up immediately after receiving the introductory message, the apparatus resets itself automatically.

The recording of messages is performed magnetically with a pair of magnetic sound heads acting first to record on the opposite sides of a magnetic recording disc, and later to pick up the messages. While no one but the subscriber, who is herein considered as anyone who possesses and gives the predetermined vocal code signal, may receive the record messages, the arrangement is such that two or more messages are recorded on the recording disc without any substantial waiting period between the successive messages so that a total of thirty minutes of messages may be recorded. Later, the subscriber receives the messages one after the other without delay either from the hand set 4 or by telephoning his number and giving the proper vocal code signal.

Assume now that the subscriber is the calling party, and that he desires to receive the recorded messages. The arrangement is such that he initiates the message reproduction cycle by speaking the letter "R" immediately after the introductory message discussed above. This causes the mechanism to perform a code-receiving cycle whereby it counts from one to six with a short pause after each number and it is responsive to a predetermined code. The subscriber gives his code signal during these pauses in counting operation, and the code signal constitutes the act of speaking either "A" or "R," or remaining silent, during the pause after he hears each of the numbers. The mechanism is responsive to these two letter sounds, and if one of them is not spoken by the subscriber when the predetermined code requires it or if one is spoken when the code requires the other or silence, then the message-reproducing cycle is discontinued and the subscriber receives the final message discussed above.

However, if the subscriber knows and executes the proper vocal code signals to satisfy the predetermined code, then the mechanism will immediately start to reproduce the recorded messages in the order in which they have been recorded. When all of the recorded messages have been reproduced, the subscriber hears the following erase control message: "End, please erase." At this time, if the subscriber remains silent, the mechanism does not erase the recordings and gives the following message: "Messages have not been erased." If, however, the subscriber utters the letter "R" immediately after he hears the erase control message, then the recorded messages are erased, and the mechanism states: "Messages have been erased." Regardless of whether or not the messages have been erased, the subscriber may himself desire to record a message, for example, he may wish to record data or facts which he wishes to preserve or to leave a message for another person who possesses the code. Therefore, the subscriber hears the following instruction message: "Please proceed with message," after which he may record a message or he may remain silent. The arrangement is such that the mechanism will receive all of the messages which calling parties will want to leave during normal use, illustratively, a total of thirty minutes of recording. However, if the recording capacity of the machine becomes exhausted at any time, the machine breaks in with the above-mentioned final message: (i. e., "Recorder disconnected, please hang up" so that the calling party will not continue to talk, unaware of the fact that the recording has stopped and that he cannot rely upon the subscriber receiving any further message. The machine also gives this same final message to subsequent callers after the recording capacity has been exhausted and until the subscriber erases the messages.

The control mechanism by means of which the above-mentioned operation is carried on includes the following:

(1) A sequence switch adapted to produce a step-bystep operation whereby a versatile cycle of operation is carried on.

(2) An announcement and control switch which is operated under the general control of the main sequence switch, and which controls the announcement text production and operates certain of the circuit controls.

(3) A timer relay which performs certain timing operations including that referred to above wherein the message-recording function is discontinued after the calling party does not speak for a period such as seven seconds.

(4) A step-ring relay which performs the function referred to above, whereby a telephone call is answered by the telephonograph after a predetermined number of rings from one to six, e. g., after the fourth ring.

(5) A number of additional basic control units and elements which will be discussed below.

The sequence switch referred to above has a "home" or "zero" position to which it is returned at the end of each message-recording or reproducing operation, and seventeen other positions to which it is moved sequentially to obtain the operation referred to above. The arrangement is such that certain of the operating steps are always of the same duration whereas other steps vary in duration, and the steps may follow one another in a regular order; but, when the sequence switch is in certain positions it may advance immediately to either the next step or to one or more other subsequent steps, thus changing the cycle or omitting one or more of the steps of the full cycle without the corresponding functions being performed. In this way, the cycle is variable in length, and also in the specific sequence of steps. The sequence switch is of the disc type and it has a set of cam switches and a set of side wiper switches, so that a large number of varied and inter-related functions may thus be performed.

It has been indicated above that the sequence switch controls the announcement and control switch, which is moved through a definite timed cycle with a controlled step movement. In turn, the announcement and control switch opens and closes certain switches so as to complete and disrupt or break circuits for the reproduction and transmission of the announcement text to the calling party, and also to connect the calling party to the message-recording and code control circuits.

It has been indicated above that the telephonograph may be used for additional functions, namely, as a dictating machine, and to record telephone conversations under the control of the subscriber when he is at the location of the telephonograph instrument. The control instrument 2 in Figure 1 is provided with push buttons for effecting this control, and it is also provided with a hand-operated repeat switch whereby the operator may cause the instrument to repeat a portion of the message which is being reproduced. The telephonograph is also provided with a plug for earphones for the transcription of dictation and recorded messages.

Referring now to Figure 2 of the drawings, the recording and control unit 10 has a base plate 20 mounted on four rubber feet 22 and providing a mounting for the elements of the base section 16, and also for the upper section 18 which is supported upon four vertical frame members or posts (see also Figure 3) 21, 23, 25 and 27. As shown at the left in Figure 3 and at the right in Figure 2, there is an electric motor 24 which has an external rotor 26 with a shaft 28 and has an internal stator 29 rigidly mounted upon a motor base 30 which is clamped to the base plate 20. At the left of the motor (Figure 2) there is a recording disc and control assembly 32 which has a central spindle construction (to be described later) rigidly clamped to base plate 20, and upon which is rotatably mounted a message recording disc 34, a guide disc 36, and an announcement disc 38, all to be described in detail below. At the right hand edge of disc 38 there is a switch assembly 40 (see also Figure 3) which is mounted upon a vertical pivot sleeve which in turn is pivoted on a spindle clamped at its lower end on base plate 20 so that the switch assembly may be swung about a vertical axis.

As shown best at the right in Figure 3, there is a sound arm assembly 44 for the announcement disc which is pivoted on a shaft 46 (see also Figure 17) mounted on base plate 20. Assembly 44 comprises a sound arm 48 having a free end upon which is mounted a magnetic sound head 50 which is adapted to move along the recording surface or zone 53 of the announcement disc 38 to pick up magnetic recordings thereon. Rigidly fixed to arm 48 at the pivoted end thereof is a cam follower arm 52, the free end of which terminates over the central portion of the announcement disc. This central portion of the announcement disc is a metal hub 55 which has a long spiral groove 54 therein which extends spirally inwardly from its outer end 56 to its inner end 58 adjacent the center of the disc. The groove then has a somewhat tangential portion 60 which connects the outer and inner ends of the spiral, thus to form a continuous groove.

As shown best in Figure 2, projecting downwardly from the end of arm 52 is a cam follower shoe 62 which rides in the spiral groove 54 so that counter-clockwise rotation of the program disc causes the shoe to move arm 52 and the sound arm, first swinging them counter-clockwise from the position shown, and thereafter swinging them slowly inwardly until they are returned to the position shown. This rotation of the announcement disc causes the sound arm to move its sound head 50 slowly across the recording zone 53 of the announcement disc and when the sound head reaches the position shown in Figure 3, it is rapidly returned to the outer edge of the recording zone as the cam follower shoe 62 traverses the tangential portion 60 of the groove.

Cam follower shoe 62 is carried by a pin 64 (Figure 17) which is clamped to an arm extension 66 which is resiliently supported at its right-hand end by a leaf spring 68 riveted to it and clamped to the arm 52 by screws. The sound arm 48 is similarly mounted by a leaf spring 69 riveted to the arm and having anchor plates 71 riveted to it and clamped by a pair of screws 70 to a mounting plate 72. Positioned between these screws and in contact with the surface of plate 72 are rivet heads 74 which provide a fulcrum which holds the end of the anchor plate 71 of the sound arm slightly spaced from plate 72 with the result that the tightening of the right-hand screw 70 tends to lift the sound head and the tightening of the other screw tends to lower this head. This provides accurate adjustment for the head to and from the recording surface of the announcement disc. Plate 72 is rigidly mounted upon a sleeve 76 which is pivoted on shaft 46 and rests upon a collar 78 which is fixed to shaft 46 by a set screw. A coil spring 80 surrounds sleeve 76 and has its ends secured in recesses respectively in sleeve 76 and collar 78. This spring tends to urge the pickup arm assembly counter-clockwise in Figure 3 and this facilitates the operation and takes up any lost motion or "play" which may be present.

Shaft 46 also provides a pivot mounting for the sound arms of the recording disc 34 which has respectively on its top and bottom faces the magnetic recording coatings or surfaces 82 and 84. Positioned respectively adjacent surfaces 82 and 84 are magneitc sound heads 86 and 88 which are supported respectively on sound arms 90 and 92. Arms 90 and 92 are mounted in a manner similar to sound arm 48, respectively, with leaf springs 94 and 95 riveted to the arms and having anchor plates 97 and 99 clamped respectively to mounting plates 96 and 98 by screws 100 and 101. Rivets 103 and 105 provide fulcrums for adjustment of the sound heads to and from the recording surfaces. Mounting plates 96 and 98 are rigidly mounted on the ends of a sleeve 102 which is pivoted as indicated above on shaft 46. The position of the sleeve on the shaft is determined accurately by resilient split washers 104 and 106 which are resiliently held in grooves in the shaft at the top and bottom of the sleeve. Plate 98 has an upstanding post 108 rigidly mounted thereon, to which the end of a tension spring 110 is attached, and the other end of this spring is attached to the frame of the machine. Thus, the assembly is resiliently urged clockwise in Figure 3.

The upper arm 90 is positioned directly beneath the guide disc 36 and (see Fig. 14) the guide disc has a spiral groove 112 on its bottom face formed by a spiral rib 114. This spiral groove 112 controls the radial swinging movement of the sound heads 86 and 88 across their recording surfaces. Accordingly, mounted with arm 90 is a rigid roller arm 115 which carries a vertical pivot pin 116 upon which is rotatably mounted a follower 118. Roller 118 is positioned in groove 112 so that rotation of the guide disc causes the roller to move radially with respect to the axis of the guide disc and this movement is transmitted to the arms 90 and 92 so that these arms and their sound heads 86 and 88 are swung about the axis of shaft 46. It should be noted that spring 110 acts through the mounting base of arm 92, whereas the moving force exerted through roller 118 acts through arm 115 and, therefore, any lost motion or "play" which is present in the sound head assembly is taken up by the spring so that accurate recording and reproduction is obtained.

As shown in Figure 14, spiral groove 112 extends substantially three and one-half turns with the result that this number of rotations of the guide disc causes the sound heads 86 and 88 to traverse their recording surfaces. The recording disc turns at many times the rate of the guide disc, illustratively, eighty turns for each turn of the guide disc. In the illustrative embodiment, the recording disc will record for a total of thirty minutes, and, therefore, it takes this time for the guide disc to turn the three and one-half revolutions for moving the sound heads through their respective recording zones. During the recording and reproduction operations, the guide disc and the recording discs are started from predetermined relative positions and they are rotated and accurately controlled at their different rates of rotation but in synchronism. Thus, each sound head always starts each initial recording and reproduction operation from the same point on its recording zone, and then it follows an accurately controlled long spiral path across this zone. As shown in Figure 16, head 86 starts at the outer periphery of the recording zone and moves inwardly, while head 88 starts at the inner periphery and moves outwardly. This gives fidelity of recording and reproduction because the two heads always record the full vocal range for the entire recording period.

As will be described more fully below, the sound heads are returned at a very rapid rate to the initial or home position prior to each message-reproducing operation, and this is accomplished by rapidly reversing the guide disc. Thus, when the subscriber desires to reproduce the messages there is no appreciable waiting period. Immediately after this reversal of the guide disc the recording disc moves only a partial rotation to its starting position, and then the playback begins.

As shown at the lower portion of Figure 16, there is a de-magnetizing or erasing unit 117 which comprises a magnetic core 119 and a coil 121. During use, the messages are recorded upon the recording disc 34 and this produces a varying magnetized condition along the long spiral recording paths on the recording surfaces. The messages are erased by the erasing unit 117 by rotating the recording disc while the erasing unit is energized at which time it produces a strong de-magnetizing field. While this erasing unit is positioned beneath the disc and out of contact with it, the magnetic field is sufficient to demagnetize both of the recording surfaces.

It has been indicated above that the recording and announcement discs and the guide disc are all driven by motor 24 (see Figure 3). The rotor 26 of this motor is connected through a speed reduction assembly 120 to an external driving gear 122 which meshes with and drives a gear 124. Gear 124 in turn drives a gear 126 which is loosely mounted (see also Figure 5) on a shaft 128. Gear 126 is fixed to a gear 130 by a sleeve 132 extending between the gears and gear 130 has a magnetic clutch assembly 134 which is pinned to shaft 128. Thus, when the magnetic clutch is energized, the shaft is locked to gear 130 and is driven therewith, and this drives the announcement disc in a manner to be discussed below. Gear 130 meshes with a similar gear 136 which has a magnetic clutch 138 mounted on and pinned to a drive shaft 140, and when this clutch is energized shaft 140 is driven with gear 136. Shaft 140 is the drive shaft for the recording and guide discs 34 and 36 and when shaft 140 is rotated by the energization of clutch 138 these discs are driven in the forward direction.

Shaft 140 is also rotated in the opposite direction for reverse movement of the recording disc. For this purpose there is journalled on the right-hand end of shaft 140 a gear 135 which has a magnetic clutch 137 associated with it which is pinned to shaft 140. Referring to Figure 19, gear 135 meshes with gear 124 so that gear 135 is driven directly from the speed reduction assembly 120. Thus, the energization of clutch 137 (Figure 5) drives shaft 140 and the direction of rotation is in reverse, i. e. opposite from the forward drive which is effected when clutch 138 is energized, because with the forward drive there is an intermediate gear pair formed by gears 126 and 130 which act as a drive, whereas the direct drive from gear 124 to gear 135 is a reverse gear drive. The smaller gear 135 causes the reverse drive to be at a ratio of two and one-half times the rate of the forward drive.

Clutches 134, 137 and 138 are identical in construction and only clutch 138 is shown in detail, it being understood that the other clutches have corresponding and identical parts. Clutch 138 has a magnetic shell core 139 which encloses a winding 142 and the winding is energized through an electric circuit formed through a pair of contact rings 144 and 146 (see also Figure 6) and two annular sets of stationary contact assemblies 148 and 150 (see also Figure 7). The contact assemblies are mounted on a stationary mounting plate 147 which is fixed to the stationary shaft bearing and electrical terminals 149 provide electrical connections for the circuit. Shafts 128 and 140 are mounted in bearings in a pair of brackets 151 and 152 which are rigidly mounted on base plate 20 by stud bolts.

As indicated above, the discs 34, 36 and 38 are mounted on a spindle assembly, the construction of which is shown in Figure 9. At the bottom there is a plate 155 which is clamped to the base plate 20 by stud bolts, and mounted on plate 155 is the spindle 166 which has a base flange 157 which is clamped to the plate by screws. The lower end of the spindle is snugly received in an opening in plate 155 and the spindle projects upwardly and provides rigid support for the three discs and their associated parts. Directly above flange 157 is a bearing flange 159 upon which a hub assembly 154 rests. Hub assembly 154 is the hub for the recording disc 34 and is formed by a hub plate 156, a spacer washer 158, a driving gear 160, a mounting bearing 162, and stud bolts 164 which clamp the assembly together. Hub plate 156 is fixed to the main disc portion 168 of the recording disc by screws 170, and bearing 162 is journalled on the spindle and rests upon flange 159.

It has been indicated above in connection with Figures 2 and 5 that shaft 140 turns the recording disc. Thus, as shown in Figure 5, shaft 140 extends to the left of bracket 152 and carries at its end a worm gear 180 which is pinned to the shaft and which is connected at the left to the ball unit 178 of a coupling 174 which provides the mechanical connection with a disc drive shaft 176. Shaft 176 has a recessed and slotted end portion with there being a central recess in which the ball portion 178 is positioned, a diametric slot 182 and a cylindrical recess into which a spring 184 is nested. A split ring 186 surrounds the ball portion 178 and extends into slot 182. A diametric pin 188 (shown in broken lines) extends through the split ring and the ball portion and cooperates with the split ring to provide the torque drive to shaft 176. Shafts 176 and 140 are normally positioned as shown so that a driving relationship is provided with the universal coupling. However, resiliency is also provided with the spring 184 under slight compression and pressing on the split ring, and the coupling may be readily disconnected by moving shaft 176 to the left or shaft 140 to the right.

Referring now to Figures 9 and 15, the left-hand end of shaft 176 is connected to a shaft 190 through a universal coupling 192 identical with coupling 174, and this shaft 190 is mounted at its ends in a pair of bearings 194 (Figure 15) which are mounted in a bracket 193 clamped to plate 155. Shaft 190 has collars 191 fixed on its end and a worm gear 196 fixed to its central portion which meshes with gear 160 which, as pointed out above, is clamped to the recording disc 34. Thus, a reliable drive connection is provided for the recording disc and, as indicated above, resiliency and easy disassembly are also provided.

Referring now again to Figure 2, it has been pointed out above that shaft 128 drives the announcement disc 38; this drive is through a shaft 198 which is coupled to shaft 128 by a universal coupling identical with coupling 174. As shown best in Figure 10, the left-hand end of shaft 198 is also connected through an identical coupling 200 to a shaft 202 which is mounted at its ends in a pair of bearings 204 that are carried by a mounting bracket 206. The left-hand end of shaft 202 carries a pair of collars 208 and at the central portion of the shaft a worm gear 210 is fixed to the shaft. Gear 210 meshes with a gear 212 which, as shown at the top of Figure 9, has an integral hub bearing portion 214 which is journaled on the top of spindle 166 and is held in place by a cap ring 216 which is clamped by a screw 218. The announcement disc is clamped to gear 212 by three set screws 220. Mounting bracket 206 is a frame-like construction (Figure 10) and it is clamped by screws 222 (Figure 9) to a mounting plate 224 which has a central hub 226. Hub 226 is fixed to the stationary spindle 166 by a key 228 so that the plate and bracket are held stationary and are supported by a resilient split washer 230 which is resiliently held in a slot in the spindle.

Mounted on spindle 166 between the two recording discs is the guide disc 36 which is clamped at its center by three screws 232 to a hub 234. Hub 234 is mounted on and fixed to a sleeve bearing 236 which has a flange 238 upon which the hub rests, and the sleeve bearing is journalled on the outer bearing surface of the mounting bearing 162 of the recording disc, with the lower portion of bearing 236 resting against a ridge 237 on the mounting bearing 162 in an annular recess in the hub assembly 154 of the recording disc. Hub 234 has an enlarged top annular recess 239 within which is positioned a flat spiral spring 240, the inner end 242 of which extends radially inwardly into a slot 244 in a fixed sleeve 246 which is keyed to spindle 166 by key 228 so that the inner end of spring 240 is held stationary. The outer end 246 of spring 240 extends radially outwardly into a slot 248 in hub 234 so that this outer free end of the spring is anchored to the guide disc 36. An annular cover plate 250 is positioned over spring 240 and is held in place by resilient wire ring 252 which is nested in a half round slot in the hub 234 at the upper edge of plate 250.

The guide disc is driven from its periphery in synchronism with the recording disc 34, and the driving connection (see Figure 5) is provided by the worm gear 180 referred to above which is fixed to the end of shaft 140. Referring to Figure 8, gear 180 drives a gear 254 which is journaled upon a spindle 256 which is rigidly mounted at its lower end in a bracket 255 clamped by screws (not shown) to the base plate 20, and the gear rests upon a resilient split washer 258 which is positioned in a groove in spindle 256. Gear 254 has an integral bearing sleeve 257 upon which is mounted the sleeve 260 of a driving clutch member 262 of a clutch 264. Sleeve 260 is fixed to gear 254 by a pin 266, and member 262 has a toothed clutch ring 268 attached to its top flange by a plurality of rivets 270; these rivets also hold to member 262 a contact plate 272 to be discussed below.

Clutch ring 268 is of sheet metal and has at its periphery six equally spaced driving teeth 274 (see also Figures 12, 13 and 5) which are cam-like with flat sides and which mate with similar teeth 276 of a similar clutch ring 278. Clutch ring 278 is (see Figure 8) clamped by rivets 280 to the driven clutch member 282 of the clutch. Member 282 has a bearing sleeve 284 and is fixed by a pin 286 to a gear 288, which meshes with a gear rack 290 on the periphery of the guide disc 36. Member 282 and its gear 288 are rotatably mounted on the bearing hub 292 of a magnetic clutch armature 294 which is slidably mounted on spindle 256 so that it may slide upwardly from the position shown. Positioned beneath armature 294 is a split resilient washer 296 which is fixed in a slot in the spindle and limits the downward sliding movement of the armature. Clutch member 282 and its gear 288 are supported on hub 292 of the armature by a split resilient washer 298 so that the clutch member and the gear move up and down with the armature. Armature 294 has a main armature portion 302 integral with hub 292 and an annular magnetic armature plate 300 which are held together by screws 304, and there is a facing 306 on the top surface of plate 300. Rigidly mounted on the top of spindle 256 is a magnetic clutch operating assembly 308 which has a core 310 and a winding 312 which is energized through a pair of terminals 313 (see also Figure 3) on a terminal plate 314. Core 310 (Figure 8) is fixed to the spindle by a pin 316 so that the clutch operating assembly is rigidly supported. Armature 294 is recessed along the spindle and within the recess there is a compression spring 318 which rests at its ends respectively on the armature and the bottom of core 310 so that the spring urges the armature downwardly.

The energization of coil 312 lifts the armature 294 and this lifts clutch member 282 and disengages clutch 264 by moving teeth 276 upwardly away from teeth 274 of clutch member 262. Gear 288 is also lifted, but the teeth of gear 288 are of sufficient length to remain in engagement with the teeth of gear rack 290 throughout the extent of this movement. When coil 312 is deenergized, spring 318 with the aid of gravity moves the armature downwardly so that the clutch is rapidly re-engaged. The teeth 274 and 276 have only six relative driving positions and as will be discussed below, this insures that the guide disc and the recording disc will always be driven in a predetermined relationship.

As shown in Figure 14, the guide disc has a second cam follower assembly 320 formed by an arm 322 which is pivoted at the left on a spindle 324 and carries at its free end a cam follower roller 326. Referring to Figure 18, spindle 324 is rigidly mounted in a bracket 325 which is clamped to base plate 20, and the spindle has adjacent its ends two collars 328 and 330 fixed to the spindle respectively by set screws 332 and 334. Rotatably mounted between these collars is a sleeve 336 upon which is mounted a sleeve 338 which is held in place by a set screw 340. Sleeve 338 has an integral cylindrical projection 342 upon which is rigidly mounted the arm 322 referred to above. Arm 322 encloses at its right-hand end a resilient stop assembly or shock absorber, shown partially in broken line, and indicated at 344. Assembly 344 is formed by a central shaft 345 having a collar 346 fixed by a screw 343 to its left-hand end and freely slidable in the arm 322. The right-hand end of the shaft 345 projects through a similar collar 348 which is clamped in the end of the arm by a set screw 350. A compression spring 352 rests at its ends against the two collars and thus urges the shaft to the left. The end of screw 343 projects through slots 354 in the sides of arm 322 so as to limit the sliding movement of the shaft 345.

The right-hand end of shaft 345 carries an angle bracket 356, upon which roller 326 is rotatably mounted by a mounting bolt. Roller 326 is positioned in groove 112 and during rotation of the guide disc it rides in the groove the same as does roller 118. However, adjacent the periphery of the guide disc the groove terminates and a stop abutment 358 (see Figure 14) is provided against which roller 326 rests when the guide disc is in the "home" position. During normal operation, the guide disc is returned to this position rapidly and when the abutment 358 engages roller 326, the assembly 344 acts as a shock absorber to cushion the impact. Referring also to Figure 18, it will be seen that an impact such as would occur when the guide disc returns to the position of Figure 14 would tend to urge the roller to the right, and withdraw the shaft 345 from the end of arm 322 against the compression of spring 352.

As shown at the lower right-hand corner of Figure 3, a brake assembly 360 is provided which also acts to avoid difficulties due to rapid return movement of the guide disc. The construction of this bracket is shown in Figures 21 and 22, there being a shell formed by a base 362 and a cylindrical shell 364 including side and top walls and held in place by bolts 366, and the shell is rigidly mounted on the base plate 20 of the machine by screws (not shown). A vertical shaft 368 is rotatably mounted in a pair of ball bearing units 370 and 372 and has fixed to its upper end a gear 374 which meshes with the gear rack 290 on the guide disc. Keyed to the lower end of shaft 368 is a rotor 376 which has on its upper surface an annular recess 378. Recess 378 has vertical side walls and a sloping bottom wall so that it becomes shallow in an outward radial direction.

Positioned within the recess 378 are a large number of steel balls 380 which are held from contact with each other by an equal number of radial pins 382 which are mounted in the rotor adjacent the top of the recess. Pins 382 do not interfere with the turning movement of balls 380 and the balls may move to the outer periphery of the recess, but the pins prevent the balls from bunching together or from touching one another. Positioned over rotor 378 is a braking plate 384 which has two holes therethrough into which a pair of upstanding pins 386 extend. Pins 386 are rigidly mounted in rotor 376 and they extend loosely into the holes in the plate 384 so that the plate may move vertically but it must turn with the rotor. Plate 384 is normally positioned as shown and when so positioned balls 380 will tend to roll radially inwardly; but, when the rotor is turned at a rapid rate, the balls tend to move outwardly up the slanting surface. This raises the balls so that they engage the under surface of the plate 384 and therefore tend to lift it.

The top of shell 364 has an opening within which a bracket 388 is clamped by a set screw 390 (see also Figure 22). Bracket 388 has a vertical bore 390 and a bore transverse thereto formed by a reduced diameter bore 392 at the right and the larger bore 394 at the left. Snugly positioned within this transverse bore is a rod 395 which has a smaller diameter portion 396 at the right in bore 392 and a larger diameter portion 398 at the left in bore 394. These two portions are joined by a short tapered portion which is normally positioned at the left of the vertical bore 390, and beneath rod 395 in bore 390 are three balls 400 which rest one upon another with the lower one resting upon plate 384 and with the top one being engaged by the small diameter rod portion 396. Rod 395 projects to the left from bore 394 and is surrounded by a compression spring 402 which is compressed between bracket 388 at the right and a pin 404 in the left-hand end of the rod.

The right-hand end of rod 395 is connected to a small wire cable 406 by a screw cap 408 on the threaded end of rod 395 and held by a lock nut 410. Referring to Figure 3, cable 406 extends horizontally and (see Figure 23) is coiled around the sleeve 102 and has its end fixed thereto. During operation of the machine, the guide disc swings the recording arms (clockwise in Figure 3) as messages are recorded and this swings sleeve 102 and partially unwinds the cable from the sleeve, and it also winds up the coil spring 240 (Figure 9). Thereafter, when it is desirable to return the guide disc to home position, for example, for reproducing the recording messages, clutch 264 (Figure 8) is disengaged by energizing coil 312 and lifting clutch member 282 out of engagement with clutch member 262. This disengagement of the clutch releases the guide disc so that spring 240 rotates the disc in the reverse direction at a very rapid rate toward the home position of Figure 14.

Referring now to Figure 21, the turning of the guide disc at the rapid rate is effective through gear 374 to spin rotor 376 and this tends to cause balls 380 to move radially outwardly and they lift plate 384 so that it presses upwardly on the vertical row of balls 400. However, at this time, cable 406 is loose and spring 402 (Figure 22) has moved rod 395 to the left so that balls 400 may rise without interference. As the guide disc approaches the home position, the recording arms are swung sufficiently to turn sleeve 102 and wind up the tension cable 406 and (see Figure 23) this pulls rod 395 to the right. Referring to Figure 22, the enlarged portion of the rod is pulled over onto the top of the upper ball 400 and this pushes the row of balls downwardly and transmits substantial force onto the top of plate 384. Plate 384 is therefore pushed downwardly onto balls 380 so as to tend to cause a very substantial braking action. This braking action rapidly reduces the rate of rotation of the rotor and is effective through gear 374 to slow down and stop the turning movement of the guide disc.

As indicated above, a final shock absorber or resilient stopping action is exerted by the engagement of abutment 358 (see Figure 14) with roller 326, which roller is resiliently mounted as explained above. Thus, the guide disc is returned to its home position at a rapid rate, but as it approaches this home position, it is rapidly decelerated. During the recording operations, no braking effect is produced by rotor 376, because the guide disc moves very slowly and rotor 376 does not turn with sufficient speed to move balls 380 outwardly from the position shown. Thus, balls 400 may be pushed down without materially interfering with the turning of the rotor.

The announcement and control switch referred to above is shown at the lower left-hand corner of Figure 3, and is indicated at 412. This switch is operated synchronously with the announcement disc so that this switch always is in a position corresponding to the position of the sound arm 48 and the sound head 50. It has been indicated above that the announcement disc is driven through a shaft 128 and the driving relationship is established by the energization and engagement of magnetic clutch 134. Referring now to Figure 5, shaft 128 extends to the right through a bearing in frame bracket 151 and the shaft carries and has pinned to it a worm gear 416. Gear 416 drives a gear 418 which is mounted upon and pinned to a shaft 420 (see also Figure 19). Shaft 420 is journaled in a sleeve bearing 422 in a frame bracket 424 mounted upon the base plate 20. At its right-hand end, shaft 422 carries a gear 426 which is pinned to the shaft and meshes with and drives a gear 425.

Gear 425 is mounted on the main shaft 427 of the announcement and control switch, and is rotatably mounted at its ends in ball bearings in an upstanding mounting bracket 429 which is clamped to the base plate 20 of the machine (see also Figure 23). Shaft 427 is hexagonal in cross-section, except for its ends where it is journalled in the bearings, and rigidly mounted on the shaft are twelve cam discs (see Figure 19) which are designated by the numeral 430 with suffixes from –1 to –12 to identify the discs individually. Discs 430 are evenly spaced from each other by spacer collars 432 and the assembly is clamped at the ends so as to provide a rigid construction with the cam discs being positively driven by the hexagonal shape of the shaft and the disc openings.

The cam discs are all of generally circular configuration and each has one or more rises or cam portions projecting radially outwardly; for example, in Figure 20 cam 430–1 is shown with cam portions 434, 436 and 438. Bracket 429 also carries a horizontal shaft 439 upon which is swingably mounted a set of guide bars 440 which are also individually identified by suffixes –1 to –12. Each of bars 440 carries a cam follower 442 which are adapted to move upwardly and operate switches 444; each of the cam followers and switches is identified by a suffix from –1 to –12 corresponding to its cam disc and bracket. The lower end of each cam follower rests upon the surface of its disc so that it is raised to the position shown in Figure 20 when a cam portion engages the cam follower at the top of the path of travel, and the cam follower moves downwardly for the remainder of the time.

The cam portions of the various cam discs 430–1 to 430–12 are shown in Figure 37; it is thus seen that the cam portions of cam 430–1 appear in Figure 37 with corresponding numbers, and the other cam discs have cam portions as follows: cam disc 430–2 has cam portion 446; cam disc 430–3 has cam portions 448, 450, 452 and 453'; cam disc 430–4 has cam portion 454; cam disc 430–5 has cam portion 456; cam disc 430–6 has cam portions 458, 460, 462, 464, 466, 468 and 470; cam disc 430–7 has cam portions 471 and 472; and each of cam discs 430–8 to 430–12 has one cam portion identified, respectively, as 474, 476, 478, 480 and 482. During operation of the apparatus, the announcement and control switch moves through a predetermined cycle which involves the rotation of shaft 427 and the cams through a complete revolution; and, the switch associated with each of the discs is operated by the cam portion or portions on that disc. The time in the cycle and the duration of each switch operation may be determined by reference to the angular degree and time scales at the top and bottom respectively of Figure 37. Assume, for example, that the rotor is in the home position so that the cam discs are engaged by their cam followers at the "0" degree indication on Figure 37, then during the cycle each cam portion reaches its cam follower after the angular movement indicated by its relative position.

Referring now to the lower right-hand portion of Figure 8 and to Figure 12, there are a pair of terminal plates 484 which are mounted on bracket 255, and these terminal plates carry a pair of contactors 486 which are connected to terminals 488 and which have upwardly spring-urged contacts 490 which press against the bottom of the contact plate 272. Contact plate 272 has three annular contact strips 492 which rotate into and out of engagement with the two contacts 490 and thus provide an electrical connection therebetween. These contact strips 492 are equally spaced and are identical and the arrangement is such that they provide an electrical connection between contacts 490 for a period of two seconds at the end of each fifteen seconds interval. This circuit connection is in series with the recording-signal circuit to be discussed below, and it impresses that signal onto the telephone lines when the recording disc is turning to record a two-way telephone conversation.

It has been pointed out above that the switch assembly 40 (Figure 3) is swung about the vertical pivot sleeve, and (see Figure 18) this is sleeve 336 upon which arm 322 is mounted. Switch assembly 40 comprises a mounting plate 451 fixed to sleeve 336 (Figure 18) and three "SP" syitches (Figure 3) 453, 455 and 457, which are rigidly mounted on the mounting plate and are referred to as switches "SPUR," "SPE" and "SPA," respectively. Mounted upon the top of guide disc 36 are two cam brackets 459 and 461 which are mounted as shown in Figure 10. As shown best in Figure 10, cam brackets 459 and 461 are identical; thus, (see Figure 18), cam bracket 461 has a base plate 463 along one edge of which there is a cam portion 465 formed by a central flat and end slanting walls.

Each of the "SP" switches 453, 455 and 457 has a downwardly projecting cam engaging member 467 (Figure 18) which is spring-supported and has its lower end positioned slightly above the upper surface of the guide disc so as to be engaged by the cam brackets 459 and 461. As will be explained more fully below, these "SP" switches control the recording disc at the beginning of the initial recording and the reproducing operations, and also when the recording disc has had its recording capacity exhausted. These relationships are shown in Figure 37C with the elevated portions of the lines 473, 475 and 477 indicating the engagement of the respective switches 453, 455 and 457 by the cam brackets. Thus, when the guide disc is returned by spring 240 (Figure 9) under the control of the bracket assembly 360 to the "home" position so that the abutment 358 (Figure 14) engages roller 326, the "SPUR" switch 453 is engaged by cam bracket 461 and the "SPA" switch 457 is engaged by cam bracket 459. The circuit arrangements are such that the engagement of the "SPUR" switch 453 by its cam portion causes the recording disc and the guide disc to be driven forwardly.

This forward driving movement continues for approximately six seconds until cam bracket 461 is moved from the switch operating engagement with the "SPUR" switch 453. The recording and guide disc are therefore in their true "home" position with the sound heads at their predetermined initial positions and with the guide disc in its predetermined relationship with the recording disc as discussed above in connection with Figures 8, 12 and 13. When in this initial or true "home" position (Figure 37c) the "SPA" switch 455 is still engaged by its cam bracket 459 and this engagement continues for approximately a second after the recording and guide discs have moved from the true "home" position at the beginning of an initial recording or a reproducing operation. At the end of approximately thirty minutes of recordings, the recording capacity of the recording disc has become exhausted, the "SPE" switch 457 is engaged by cam bracket 459 and this stops the recording operations. This engagement of switch 457 by cam bracket 459 results from the swinging of the arm 322 toward the center of the guide disc (Figure 14) to its extreme position. At this time (Figure 3) switches 453 and 457 are swung clockwise so that they are out of the paths of the cam brackets, whereas switch 455 is in substantially the initial position of switch 457 (of Figure 3).

Referring again to Figure 2, it has been pointed out above that the upper section 18 is supported upon four frame members or posts which extend upwardly from base plate 20. Upper portion 18 is provided with a base plate 500 which rests on the frame members or posts and is clamped thereto by four screws (not shown). As shown at the upper right-hand portion of Figure 2 and at the left in Figure 24, the sequence switch 502 is mounted on base plate 500 and has its frame 501 clamped in place by screws not shown. Switch 502 is of the multiple disc type with a rotor 503 formed by twenty-five discs 644 (only nineteen of which are used), which are individually identified with suffixes –A, –B, etc. These discs are rigidly mounted on a shaft 507 which is rotatably mounted in the frame 501 and there is a step-by-step ratchet drive assembly 509 (see also Figure 26)

by means of which the rotor is turned. The drive assembly comprises a solenoid 511 and a swinging armature 513 which carries a driving dog 515 which is spring-urged into engagement with a ratchet wheel 517. Armature 513 is spring-biased to the position shown, and when the solenoid is energized the dog swings to the left thereby advancing the ratchet wheel and the rotor counter-clockwise in Figure 26. Armature 513 also operates a circuit-breaking switch for solenoid 511 so that the unit is self-operating whenever electric power is supplied to its circuit.

Cam discs 644 are of the type shown in Figure 25 which shows, from the mechanical viewpoint, a typical cam disc 525 with a raised cam portion 519, as an illustration of the general configuration of one of the discs 644. During rotation of the disc, cam portion 519 moves into engagement with a typical cam follower 521 and operates a typical switch 523, and when this cam portion is not engaging the cam follower the switch is in its inoperative position as shown. Cam disc 525 also has on each side face a set of switch wiper strips or rotary switch members 612–A, –B, etc., which are segmental and move into engagement with the contacts of illustratively numbered switches 527 and 529 mounted at the sides of the disc and having contacts adapted to be engaged by the wiper strips 612. The sizes and shapes of the wiper strips are such as to provide electrical connections between the respective contacts of switches 527 and 529, thus to complete electrical circuits to be discussed below. Rotor 503 has a home position to which it is returned at the end of each sequence of operations. In addition to this, there are seventeen intermediate positions which are represented schematically in Figure 27 where the cam contours 525–0 through 18 of the respective cams are shown, starting with 0 degrees as the home position. The switch rotor has eighteen normal positions to which it is moved step-by-step and which are discussed elsewhere.

As shown in Figure 2, at the left of the sequence switch there is a filter unit 504 and an amplifier 506, each clamped in place by a removable bolt 508 and each having on its bottom wall a set of male plugs which mate with female plugs mounted on plate 500 and provide electrical connections to and from the two units. Thus, by removing a bolt 508 either of these units may be lifted up, for example, for repair or replacement, and the unit is automatically disconnected by the separation of the plugs. Referring to the lower left-hand portion of Figure 24, there is a similar male plug 510 which (see Figure 3) mates with a female plug 512 on the base portion 16, thus to provide electrical connections between the base portion and the upper portion of the unit. These plugs are automatically mated when the upper portion is lowered into place and the plugs are separated by the lifting of the upper portion.

As shown in Figure 2 and at the left of Figure 24, the base portion has a female plug 514, and the upper portion has a male plug 516 which is carried by a cable 518 and is inserted into plug 514 and provides the electrical connections to motor 24. At the left of Figure 2 there is a single terminal plug 520 which is carried by a cable 522 and is inserted into a jack 524 on the base portion to provide an electrical connection with a relay 526 which is mounted on frame member 21 and has its other terminal grounded. Thus, in addition to the electrical connections provided by plugs 510 and 512 there are additional connections provided by plugs 514, 516, 520 and 524. At the left-hand wall of the upper portion 18 there is a terminal panel 528 which includes (see Figure 24) two separate female plugs or receptacles 530 and 532 which receive male plugs 534 and 536 and provide the connections to the control instrument 2 and the power supply unit 12. Terminal panel 528 also has openings for the reception of telephone lines 11 which extend into the upper portion 18 and are connected to terminals. In addition to the elements discussed above, the upper portion 18 includes various elements which are discussed below, i. e., a bank of relays which are not individually numbered but which are mounted on a frame construction 538.

At the upper left-hand portion of Figure 2 there is a timer relay 540 and a ring relay 542, which have been referred to above and the details of which are shown in Figures 28 to 31. Referring particularly to Figure 28, the ring relay 542 comprises a step relay 544 (see also Figure 31), which is operated by a solenoid 545, the energization of which draws the armature 546 in. This lifts the right-hand end of the armature arm so as to raise a dog 548 and move a ratchet wheel 550 one step. Subsequently, when the solenoid is de-energized, the dog moves down again and the ratchet wheel remains in its advanced position by a spring detent. As explained below, solenoid 545 is connected in the telephone bell-ringing circuit when the apparatus is connected to the telephone line and therefore the ratchet wheel is turned one step upon each ringing signal to the telephone bell.

Referring again to the left-hand portion of Figure 28, ratchet wheel 550 has eight teeth and is mounted on and fixed to a shaft 552 which also has rigidly fixed to it two cam discs 554 and 556. Cam discs 554 and 556 have two "AR" switches 558 or AR–1 and 560 or AR–2, respectively, associated with them; and, illustratively, when the shaft is turned to predetermined positons, these cam discs engage and operate their switches in accordance with the lines 479 and 481 of Figure 37B. Thus, cam 556 is a "homing" cam so that it closes its switch 560 only in the "home" position, and at the end of the operations a circuit is completed through this switch and a self-opening switch 562 (Figure 31) associated with armature 546 so that solenoid 545 is successively energized and de-energized to advance the ratchet wheel 550 until shaft 552 reaches its home position, at which time switch 560 (Figure 28) is opened. Cam 554 and its switch 558 control the initiation of the telephone-answering cycle, and for this purpose the ring relay counts the ringing signals until there has been a selected number. This number is determined by the position of the rise on cam disc 554 which is here positioned to operate switch 558 upon the fourth ringing signal; this is represented in Figure 37B by the rise in the line at the step "4." The cam disc may be turned and fixed in another position to make the relay responsive to another number of ringing signals, for example, from one to six.

The timing relay 540 has two solenoid relay units 564 and 566, the elements of which are also referred to as relays $Z_1$ and $Z_2$, respectively; relay unit 566 is energized to permit a timing operation to start, and relay unit 564 performs the timing functions as illustrated in Figure 37A. Relay unit 564 (Figure 28) is a self-interrupting relay having a predetermined time function, namely: when connected continuously to an electrical circuit the relay unit is energized and de-energized once every six-tenths second. As shown in Figure 29, relay unit 564 carries a stepping dog 568 which is adapted to engage and advance a ratchet wheel 570 one step upon each energization of the unit.

A spring holding dog 572 is normally held from engagement with the ratchet wheel by a swinging bracket 574. However, referring to Figure 30, when relay unit 566 is energized its armature swings a holding bar 576 so that its left-hand end moves downwardly and (see Figure 29) the holding dog 572 moves into engagement with the ratchet wheel. Thus, when relay unit 566 is energized, the ratchet wheel may be advanced by dog 568 and dog 572 holds it in its advanced position. Assuming, therefore, that both of the relay units 564 and 566 are energized, the self-interrupting characteristics of the relay unit 564 causes it to step the ratchet wheel counter-clockwise in Figure 29 at the rate of one step each six-tenths of a second and this gives the timing function.

The rotor 569 has its ratchet wheel 570 mounted on and fixed to a shaft 578 which is rotatably mounted at its ends and carries four cam wheels 580, 582, 584 and 586 which are rotated by the step-by-step movement of the ratchet wheel. Each of these cam wheels has a switch operatively associated with it in the manner shown in Figure 30, so that the switch is moved from the position shown when the rise on the cam moves past the cam follower of the switch. The rises on the cam wheels (see Figure 37A) extend arcuately so as to operate their respective switches for the following periods of time during the rotary movement of the ratchet wheel which, as indicated, steps forward from the home position, one step each six-tenths of a second. Cam wheel 580 operates its switch starting at the end of one and eight-tenths seconds and for the remainder of the timing period, and continues in this position to the end of the timing period which totals ten and eight-tenths seconds; cam wheel 582 operates its switch starting at the end of seven and two-tenths seconds and ending at nine seconds; cam wheel 584 operates its switch starting at nine seconds and for the remainder of the timing period; and, cam wheel 586 operates its switch immediately upon the first movement of the rotor from the home position, and this switch remains operated during the entire timing period.

Referring again to Figure 28, there is positioned at the left of the ratchet wheel 570 a coil spring 588 which is anchored at one end to the stationary frame and at the other end to the ratchet wheel; and, this spring is wound up by the turning of the rotor, and it automatically returns the rotor to the home position whenever the holding dog 572 is released. Thus, the rotor is immediately returned to the home position whenever relay unit 566 is de-energized. It will be seen, therefore, that when the two relay units are energized continuously for a period of six-tenths of a second or more, the relay unit 566 acts to engage the holding dog with the ratchet and the relay unit 564 starts its timing operation with the step-by-step movement of the rotor.

The arrangement is such that these relay units are de-energized to control the functioning of the apparatus and to limit operation to the actual periods of use. Accordingly, the relay units have their energizing circuits so connected that they are de-energized during the message-recording and reproducing operations at all times that there is voice current being produced; that is, whenever a calling party proceeds to give a message to be recorded, or during the reproducing operation, whenever a message is being reproduced from the recording disc. However, at any time that there is no voice current, these relay units are energized immediately and they start the timing operation. In this embodiment the switch associated with cam wheel 584 is operated at the end of seven and two-tenths seconds and this disconnects the reproducing or recording operation, whichever is then taking place. The additional functioning of the timing relay 540 will be discussed further below.

Figures 32 to 36 show the construction of the control unit 2 by means of which the subscriber or another person may exert direct control upon the system. This control unit has a sheet metal casing 531 which rests upon feet 533 and has a top panel 535. The top panel provides a mounting for five push button switches which are as follows: a "Connection" switch 537 by which a person answering the telephone, to which the system is connected, may connect the telephone line to the recording unit to permit the calling party to record a message; an "Erase" switch 539 by which the subscriber may initiate the message-erasing operation which removes the recorded messages from the recording disc; a "Reproducing" switch 541 by which the subscriber may listen to the recorded messages; a "Record" switch 543 by which a person may record a two-way conversation on the telephone line to which the system is connected; and, a "Dictate" switch 547 by means of which a person may operate the system as a dictating machine. At the side of each of these switches there is a light (see also Figure 33) which is turned on whenever its switch is pressed and the corresponding function has started. There is also a stop-repeat switch 549 which is shown in its neutral position and which is swung up to stop the recording or reproducing functions of the machine, and is swung down during the reproducing function to cause the disc to be reversed so that a portion of the recorded message is repeated.

The construction of the switches is shown in Figure 32 and need not be discussed in detail. Each switch has a casing which encloses a plunger which is spring-urged upwardly and which engages and closes a switch when it is pushed downwardly. At the left of the group of switches there is a master control switch 549 which is adapted to be operated by the turning of a lock 551 which has a key 553. Switch 549' is operated when lock 551 is locked so as to render the push button "Erase" and "Reproducing" switches 539 and 541 inoperative so that when the subscriber is absent and the control instrument panel is thus locked, an unauthorized person who does not have a key is prevented from reproducing or erasing the recorded messages. Under some circumstances the locking of this switch 549 may also prevent the use of the unit for dictation or for recording two-way telephone conversations, in which case, switches 543 and 547 are also rendered inoperative.

Lock 551 is carried by a hinged door 555 which may be swung upwardly about a pivot 557 when the lock is unlocked, and this exposes a code-setting panel 559. The code-setting panel includes six slide button-switch assemblies which are designated 968 with suffixes from −1 to −6. These switches are of the type shown in Figure 35, each with a slide button 561–1 the shank of which projects through a slot in the panel and is connected to the slide 565 of a three-position sliding switch. As will be explained more fully below, these switches are positioned selectively by the subscriber so as to set up a predetermined code made up by selecting one of the three positions of each of the six switches. The control instrument 2 also provides a cradle for the handpiece 4, which cradle is in the form of a pair of brackets 563 mounted on the top wall of casing 531.

Figures 39 and 40 show an alternative arrangement for controlling the sound head for the announcement disc. Referring to Figure 40, an announcement disc 565 is rotatably mounted on the top of spindle 166 and is driven in a manner identical with the drive for announcement disc 38. Disc 565 carries on its top surface a gear pinion 567 upon which a double-racked gear 571 is pivoted. Fixed to the top of spindle 166 and journalled thereon is a cam disc assembly 573 which includes a gear hub 575 and a cam disc 577 which are held together by screws. The gear hub has teeth which mesh with the upper row of teeth on gear 571, and the lower row of teeth on gear 571 mesh with the teeth of a stationary gear 579 which is rigidly clamped to the spindle 166.

The outer periphery of cam disc 577 is formed by a straight-forward spiral curve of one complete turn connected by a radial portion. Riding on this spiral curve is a cam follower roller 581 which is carried by a rigid arm 583 and is mounted identically with the mounting of arm 52 shown in Figure 3. Arm 583 has a sound arm 48 mounted with it which carries a sound head 50. During operation the cam disc 577 is rotated very slowly with the result that the sound head 50 is moved outwardly across the recording surface of the announcement disc at a very slow rate. The rotation of the cam disc is accomplished by the gear assembly discussed above. The upper row of teeth on gear 571 are lesser in number than the lower row of teeth, and, therefore, when gear 571 is swung around gear 579 by the rotation of the announcement disc, gear 571 turns gear 575 and the cam disc very slowly in the reverse direction. In this way a slow but accurately controlled movement is provided for the sound head and the construction is rigid and sturdy. In this embodiment an erasing head 585 is mounted over the announcement disc so that the announcement text may be erased and a new text recorded.

The electrical circuit diagram of the system and additional details as to the manner of operation will now be discussed, with particular reference to the figures numbered 41A to 41H, and constituting a schematic wiring diagram for the system. In this diagram and in the discussion, the parts are generally designated by the same reference characters as in the previous discussion. However, it can well be understood that the electrical components of a switch may best be designated by separate numerals and for convenience and clarity the components of a single switch assembly may be located in different portions of the circuit diagram. An attempt has been made to include sufficient diagrams, all properly marked, to make the description of the operation clear. Thus, for example, in Figure 37 the cam contours 525–0 to 525–18 have been designated at the right with the letters corresponding to the suffixes identifying the individual sequence cams 644.

Figure 41F:
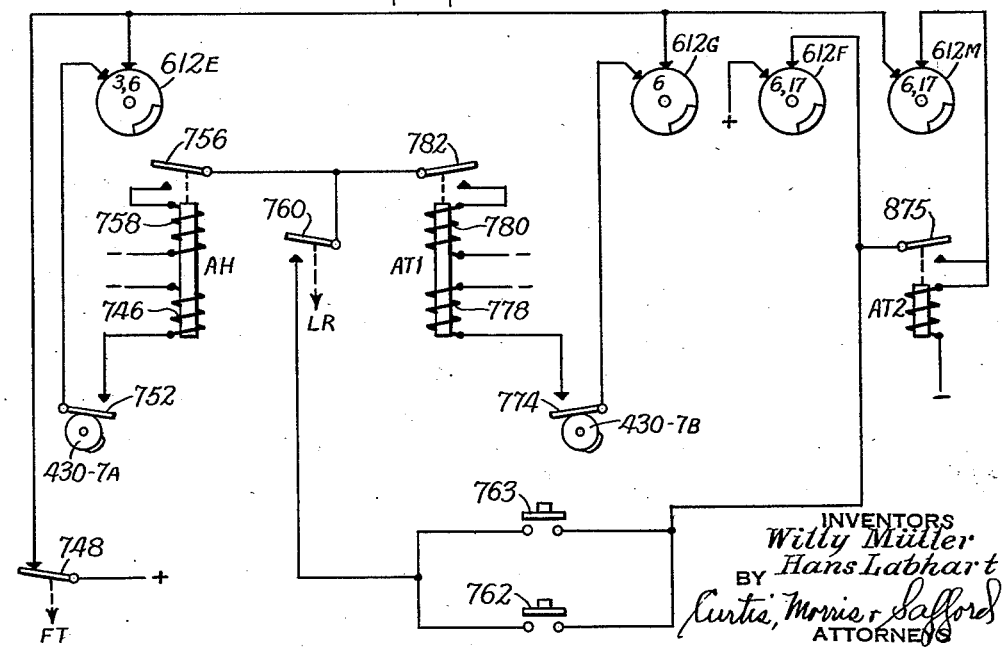

In the circuit diagram, the relay contacts are shown in the position which they occupy when the actuating coil of the relay is not energized, and in general and unless otherwise specified, the cam operated switches and contacts are shown in the positions which they occupy when the cam members are not in operative relationship therewith. The circuit diagram can be best understood by considering several possible operating sequences of the instrument as indicated in connection with Figure 1, the outside telephone lines 11 extend to the unit, which (see Figure 41A) are connected to telephone lines 600 and 602, and which are in turn connected to a conventional telephone set 604, through relay contacts 606 and 608 of a relay AT1, the details of which are shown in Figure 41F.

Figure 41H:
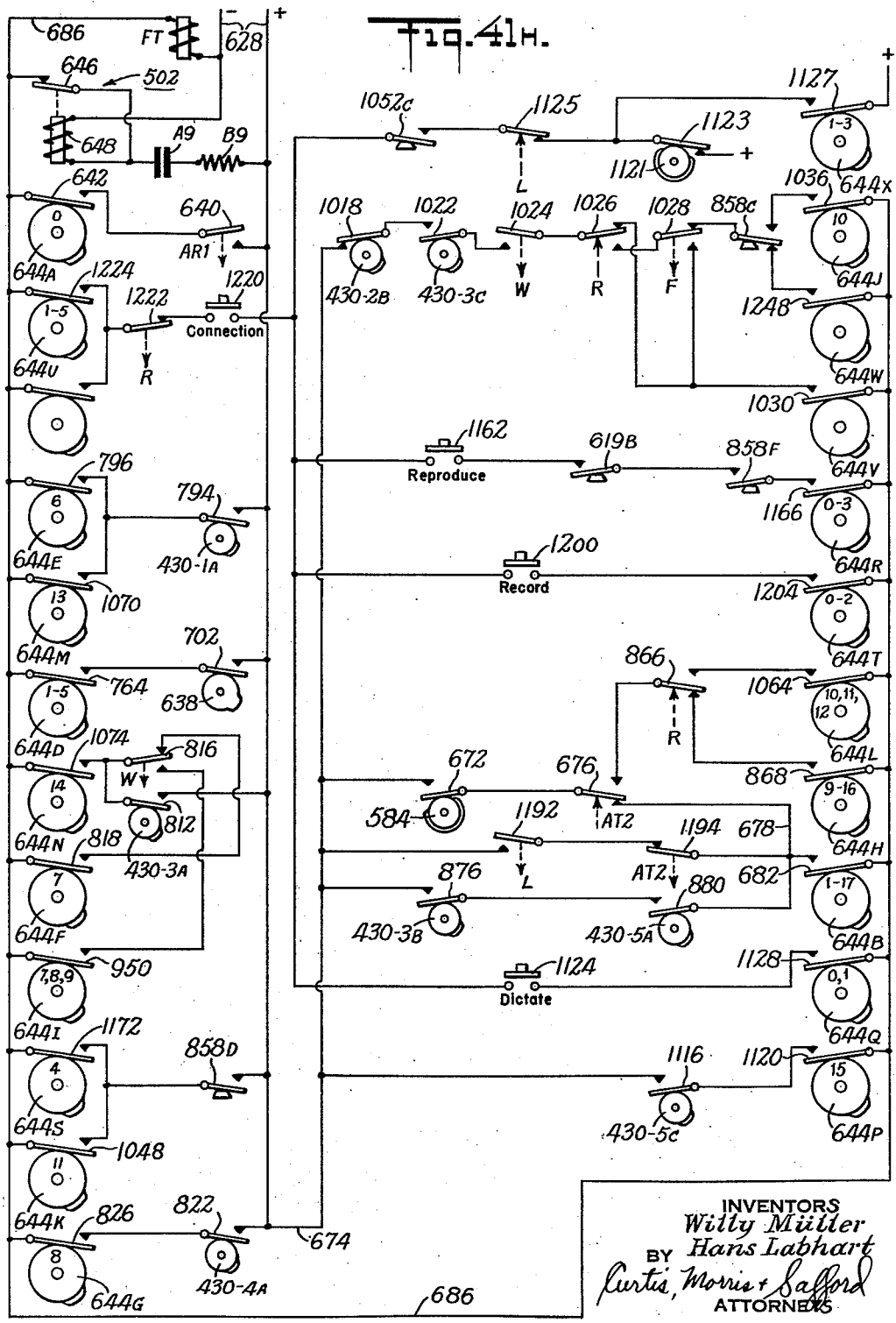

Assume that a ringing signal for the telephone 604 is received over the lines 600 and 602, the ringing signal conditions the telephonograph for response, but no response occurs until the telephone has rung four times (or any other predetermined number of rings for which the apparatus is adjusted). As will be explained below, if the telephone is answered manually before the fourth ring, the apparatus is returned to its initial condition by the action of timing relays $Z_1$ and $Z_2$ which are schematic representations of the relays 564 and 566 discussed above. The telephone line 600 is connected through contacts 610 of a relay AH (shown in Figure 41F) to a contact 611 of switch 612A. This rotary contact member is arranged to complete the circuit between its contact points 611 and 616 whenever the sequence switch, generally indicated at 502 in Figure 41H, is in either its "0" or "1" position, as described above.

The contact 616 of the rotary switch 612A is connected through a key-controlled switch contact 619 of switch 549' (described heretofore in connection with the lock 551 and control instrument of Figure 32), and thence through the actuating winding of a relay coil AR–1, and an isolating condenser 620 to a rotary switch 612B, which provides a continuous circuit when the sequence switch is in its "0" or "1" position, through relay contacts 624 of the relay AH to the other telephone line 602. Thus, with the sequence switch 502 in its home or "0" position, the ringing signal on the telephone lines 600 and 602 energizes the relay AR–1, and direct current is provided for this relay winding by means of a dry rectifier 626 connected in shunt therewith. When the first ringing signal energizes the relay AR–1, a positive or "plus" terminal of a power supply or source 628, shown in the lower portion of Figure 41A, is connected through contacts 632 of relay AR–1, a lead 634, and the energizing winding of a relay AR–2 to the negative terminal of the power source 628.

In order to further simplify the drawings, the leads connecting the power source 628 to this relay energizing circuit have been omitted. Such connections have also been omitted from the other portions of the circuit, it being understood that lines designated with a "plus" sign are connected to the positive terminal of the power source 628, and that those leads designated by a "minus" sign are connected to the negative terminal of the power source 628.

The relay AR–2 is of the mechanical stepping type and includes the arrangement which was shown and described in connection with Figures 28 and 31, comprising two switch-operating cams 554 and 556 (Figure 28) indicated diagrammatically at 636 (Figure 41A) and 638 (Figure 41H) respectively, which are moved one step each time the relay winding AR–2 is energized. Shading lines have been added to these cams to clearly distinguish them from the cam members operated by the sequence switch and by the announcement disk. This relay AR–2 counts the number of rings on the telephone lines; thus, when relay AR–1 is energized by the first telephone ringing signal, relay AR–2 is energized and steps to its first position, and it moves on for subsequent consecutive ringing signals.

The relay AR–1 also is provided with contacts 640 (see Figure 41H) which are connected in series between the positive terminal of the power source 628 and sequence cam contacts 642 of sequence cam 644–A, contacts 642 being closed whenever the sequence switch is in its "0" position. The contact members 642 are connected through sequence-switch interrupting contacts 646 to the energizing winding 648 of the sequence switch 502, and thence to the negative terminal of the power source 628. Thus, when relay AR–1 closes the contacts 640, a circuit is completed to energize the sequence-switch energizing winding 648 and cause the sequence switch to step to its next position, position "1." The sequence switch stops in this position because the cam operated contact members 642 are open except when the sequence switch is in its "0" position.

This movement of the sequence switch to its position "1" starts the operation of the timing arrangement, described above in connection with Figures 28 through 31. This timing arrangement includes a stepping relay Z–1, the mechanical aspects of which are illustratively shown as timer relay 540 (Figures 28–30), and here shown diagrammatically by Figure 41E, an energizing winding 652, a self-interrupter contact 654, and a rotary cam member 656 which operates normally-open contact members 658 to the closed position when the relay Z–1 has stepped to its fourth position (see Figure 37A) wherein it is seen that cam 580 then operates its switch. The action of the contacts of relay Z–1 is dependent upon the position assumed by the stepping relay Z–1 and these positions must not be confused with the positions of the sequence switch 502. Other rotary cam members are driven by relay Z–1 to operate other switch contacts and will be described in connection with the particular portions of the circuit in which they function.

In addition to the stepping relay Z–1, the control relay Z–2 (which is show in Figure 30 and is referred to as relay unit 566), having an energizing winding 660, is arranged to interlock mechanically with the relay Z–1 in such manner that when winding 660 is energized, the timing mechanism of stepping relay Z–1 is permitted to operate, but when the winding 660 of the control relay Z–2 is not energized the relay Z–1 returns to and remains in its "0" position. The winding 660 of relay Z–2 is energized by a circuit extending from the negative terminal of the power source through the winding 660, a lead 668, a rotary switch 612C of the sequence switch when the sequence switch is in position "1," and contacts 864 of relay AR-1 when the relay is not energized, to the positive terminal of the power source.

When the winding 660 is energized, its contacts 664 are closed, thus setting up the circuit from the positive voltage source through contacts 864 of relay AR-1, the rotary switch 612-C, a lead 668, the Z-2 relay contact members 664, the Z-1 relay interrupter contacts 654 and the Z-1 relay winding 652, to the negative terminal of the power source. It will be apparent that as soon as the winding 652 of the stepping relay Z-1 is energized by this circuit, the contact 654 will interrupt the energizing circuit, but that these contacts will immediately re-close to provide successive energization and deenergization of the relay Z-1, thus stepping the cam members operated by this relay to their successive positions. The mechanical characteristics of this stepping relay are such as to provide the desired time delay between the adjacent positions of this relay (this time delay is .6 second, as described above in connection with the cams of Figure 28).

If the telephone is answered manually, the counting relay Z-1 continues to operate, for example, for a period of eight seconds, and in this particular example, until a rotary cam member 584 (see Figure 37A), operated by the relay Z-1 and shown in Figure 41H, has left its sixteenth position thereby closing its contacts 672 to complete a timing circuit. This circuit is from the positive side of the voltage source through a lead 674, timing relay contacts 672, contacts 676, of a relay AT-2 (the operation of which is shown in Figure 41F), a lead 678, contacts 682 of sequence cam 644B, providing a closed circuit whenever the sequence switch 502 is not in its "0" or home position, a lead 686, interrupter contacts 646, and thence through the energizing winding 648 of the sequence switch 502 to the negative side of the power source. Thus, the sequence switch 502 continues to move through its various positions until it reaches its "0" or home position, at which time the sequence cam contacts 682 are opened by the cam 644B and the entire apparatus is returned to its initial or home condition.

The relay AR-2 (Figure 41A) is also energized to return to its "0" position by a circuit extending from the negative terminal of the power source through the energizing winding of relay AR-2, its self-interrupter contacts 688, contacts 692 which are operated by the AR-2 relay cam member 560 and which are open only when the relay AR-2 is in its "0" position, and rotary switch 612D, to the positive power source. Thus, when the sequence switch 502 has returned to its "0" position, energizing voltage is connected to the relay AR-2 through the rotary switch 612D so that the relay AR-2 continues to step through its various positions until it reaches its "0" or home position, at which time the contacts 692 are opened by the cam member 560 and the relay AR-2 remains in its "0" position until again energized.

In order to prepare the apparatus for answering the telephone, a circuit is provided that responds to the first telephone ringing signal which energizes the motor that drives the recording and reproducing mechanisms and connects the desired voltages, to other positions of the circuit. Thus, it is not necessary that power be continuously applied to the mechanism except that voltage must be available from the power supply 628 in order to operate the relays, such as the relay AR-2. A sequence cam 644C (Figure 41C) closes its contacts 696 whenever the sequence switch is moved from its "0" position, thus completing the energizing circuit for a relay MOT having contacts 698 arranged to energize a recording and reproducing drive motor 24. Other relay contacts may be provided as desired for energizing other portions of the circuit.

If the telephone is not answered manually, the relay AR-2 (Figure 37B) continues to advance one step each time a ringing signal is received. At the fourth consecutive ringing signal, the rotary cam 558 engages contact member 638 (Figure 41H) of relay AR-2 closes its contacts 702 to complete a circuit from the positive voltage supply line 674 through the contacts 702, contacts 704, which are operated by a sequence cam 644D and which are closed whenever the sequence switch is between its positions "1" and "5," through the interrupter contacts 646 and the energizing winding 648 of the sequence switch 502, thus causing the sequence switch to continue stepping until it reaches its position "6," at which time the contacts 704 are opened by the cam 644D, thus causing the sequence switch 502 to stop in this position.

The stepping relay AR-2 now returns to its initial position through the same re-set circuit described above, including the rotary switch 612D and contact points 692 which are operated by cam member 560 of the stepping relay AR-2.

At this time, circuits are initiated which start reproduction of the message such as "This is ABC Corporation. Your message will be recorded automatically," and the transmission of this message over the telephone lines 600 and 602. The circuits for accomplishing this function are as follows: One terminal (Figure 41C) of the magnetic reproducing head of the announcement disc 38, here represented by the head 50 is connected to ground and the other terminal is connected through the contacts 710 of a relay S, and contacts 712 of a relay V-2 to a primary winding 714 of an input transformer 716, the secondary winding 718 of which is connected directly to one input terminal of a conventional audio amplifier 722, which is one of the sections of amplifier assembly 508, and through relay contacts 724 operated by a relay V-1 to the other input terminal of the amplifier 722. Thus, the signal picked up by the reproducer head 50 is applied through the input transformer 716 to the amplifier 722.

The output terminals of the amplifier 722 are connected across the primary winding 726 of an output transformer 728, which has one end of its secondary winding 732 connected to the common ground circuit. A tap 734 on this secondary winding is connected through relay contacts 736 of the relay FT and contacts 738 of the relay V-1 to one end of a line transformer winding 740, an intermediate point of which is connected to the common ground circuit. Another winding of this transformer, having two portions 742A and 742B connected in series to the incoming telephone lines 600 and 602 through the relay contacts 610 and 624, respectively, of the relay AH which is now energized by means of a circuit described below. Thus, the signals picked up from the announcement recording disc are amplified and applied to the telephone lines.

The energizing winding 746 of the relay AH (shown in Figure 41F) is energized by a circuit extending from the positive voltage source through contacts 748 of the relay FT through a rotary switch 612E, which provides a continuous circuit when the sequence switch is in position 6, through the contacts 752 operated by an announcement cam 430-7A that is operated in synchronism with the announcement reproducing apparatus, and thence through the energizing winding 746 to the negative terminal of the power source.

The relay AH is provided with a set of holding contacts 756 which are connected into a circuit that maintains energization of the relay AH so long as a direct current voltage is present on the incoming telephone lines 600 and 602, and the sequence switch is between positions 6 and 17. This circuit extends from the negative terminal of the voltage source through a holding winding 758 of the relay AH through the holding contacts 756, contacts 760 of the relay LR (shown in Figure 41A) through manually operated "stop" switch contacts 762 which are connected in parallel with key-controlled switch contacts 763, and through the contacts of a rotary switch 612F, which provides a continuous circuit when the sequence switch is between position 6 and 17, to the positive terminal of the power source.

Energization of the relay AH switches the telephone lines 600 and 602 (Figure 41A) from the ringing-signal responsive circuits (including the relay AR–1) to the recording and reproducing circuits through the line transformer 741. This relay AH also actuates contacts 766 to disconnect a terminating resistor 768 which is otherwise connected in parallel with the transformer winding 742. At the time the telephone lines are connected to the recording and reproducing circuits, the manually operated telephone set 604 is disconnected from the telephone lines 600 and 602 by the relay AT–1, shown in Figure 41F. The relay AT–1 is energized by a circuit extending from the positive terminal of the power source through the FT relay contacts 748, a lead 770, a rotary switch 612G, contact members 774 operated by an announcement cam 430–7B, and through an energizing winding 778 of the relay AT–1. A holding circuit for this relay includes a holding winding 780 connected through holding contacts 782 to the same holding circuit that maintains the relay AH in energized condition.

When the relay AT–1 is energized, the contact members 606 and 608 (Figure 41A) disconnect the telephone 604 from the lines 600 and 602 and replace it with the winding 744 of a relay LR having a resistance value substantially equal to that of the telephone set so that the load on the telephone lines 600 and 602 remains unchanged. The relay contacts 606 and 608 are arranged so that when the relay AT–1 is de-energized, the telephone set 604 is connected to the lines 600 and 602 before the connections to relay LR are broken, thereby preventing annoying key clicks or transients in the telephone system.

In order to drive the annuouncement disc 38 (Figure 41C) from which the announcements are reproduced, the magnetic clutch 134 (Figure 3) is provided which is controlled by an electromagnet having a winding 786. One end of this winding is connected to the negative terminal of the power source and the other end of the winding is connected through the contacts of a rotary switch 612H, providing a continuous circuit when the sequence switch is in position "6," and relay contacts 790 of the relay FT to the positive terminal of the power source. The message "This is ABC Corporation, your message will be recorded automatically" is then reproduced and transmitted over the telephone lines.

After this announcement, the sequence switch 502 is moved to position "7" by an announcement cam 430–1A (Figure 41H) which completes a circuit through its contacts 794. This circuit is from the positive terminal of the power source through the contacts 794, and contacts 796 which are operated by a sequence cam 644E and are closed when the sequence switch is in position "6," to the sequence switch energizing coil 648. The sequence switch moves to position "7," at which time the contacts 796 are opened due to the contour of the cam 644E. During the time of the transmission of the above announcement, the energization of the announcement clutch control magnet 786 is maintained by an annouecement cam 430–2A through its contacts 810, even though the circuit through the rotary switch 612H is opened at the time the sequence switch moves from position "6" to position "7."

If the calling party does not speak after approximately one second, the sequence switch is then moved to its position "8" by a circuit which may be traced from the positive side of the power supply through lead 674 (Figure 41H), contacts 812 of an announcement cam 430–3A, and relay contacts 816 of relay W (not energized at this time), and thence through contacts 818 of a sequence cam 644F, which provides a continuous circuit when the sequence switch is in position "7," to the energizing coil 648 of the sequence switch 502. When the sequence switch has moved to position "8," the sequence cam contacts 818 are opened by the cam 644F, causing the sequence switch to stop in this position. The announcement "Please proceed with message" is then reproduced and transmitted over the telephone lines. At the completion of this announcement, the sequence switch is moved to position "9" by a circuit which may be traced from positive supply lead 674 through contacts 822 of an announcement cam 430–4A, contacts 826 of a sequence cam 644G, which provides a continuous circuit when the sequence switch is in position "8" to the energizing coil 648 of the sequence switch 502.

At this time, the telephone line is disconnected from the output of the amplifier 722 (Figure 41C) and connected to its input circuit, and the recording disc sound head coils 830 of heads 86 and 88 are connected to the output circuit of the amplifier. In order to accomplish this change-over, the relays S, V–1, and V–2 are energized, and their energizing circuits may be traced as follows: The negative terminal of the power source is connected by a lead 832 to one terminal of each of the energizing windings of relays V–1, V–2 and S. The other terminals of these windings of relays V–1 and V–2 are connected together and through contacts 834 of relay FT and a rotary switch 612I to the positive terminal of the power source. The other terminal of the energizing winding of relay S is connected directly through the rotary switch 612I to the positive terminal of the power supply, the rotary contact 612I which provides a continuous circuit whenever the sequence switch is in any of positions 2, 3, 7, 9, 14 or 16. The calling party may now record whatever message he wishes to leave.

If, at this time, the calling party does not speak within seven or eight seconds, or if at the completion of the recording the calling party is silent for a period of seven or eight seconds, the timing circuit previously described causes the sequence switch to move to position "17." This circuit operates in the following manner: The audio signals delivered by the amplifier 722 are connected by a lead 838 (Figure 41D) to an amplifier 840, the output of which energizes a relay I–1. Thus, the relay I–1 is energized each time the calling party speaks, actuating its contacts 842 and 844, thus charging a condenser 846. At the pauses between sounds, the relay I–1 is deenergized and permits the condenser 846 to discharge through the relay contacts 844 and the energizing winding of relay I–2. During the instant when the armature of the contacts 844 is moving from the contact connected to the winding of relay I–2 to the contact connected to the positive side of the power source, energization of the relay I–2 is maintained by condensers 848 and 852, connected as shown to the relay contacts 842. The relay contacts 842 and 844 are arranged so that the contact indicated by a single asterisk magnetizes before the contact indicated by the double asterisk is opened.

Thus, with normal speech input the relay I–2 remains closed, whereas the relay I–1 tends to follow the pattern of the speech modulation. When the speaker pauses for a sufficient length of time to permit the deenergization of the relay I–2, the timing control relay Z–2 (Figure 41E) is energized by a circuit that can be traced in Figure 41G from the positive terminal of the power source through a lead 859 and a rotary switch 612–J to a rotary switch 612AJ, contacts 858A of guide disc 457, contacts 860 of relay I–2, a lead 862, contacts of rotary switch 612K, relay contacts 864 of relay FT, the lead 668 and the energizing winding 660 of the relay Z–2 to the negative terminal of the power source.

In addition to a pause by the speaker for, illustratively, approximately seven seconds, the relay I–2 may be deenergized by the application of a constant noise of the same duration to the amplifier 722. A constant noise, such as a line noise, with no other sounds passing to amplifier 722 will, through the circuit described above, constantly energize relay I–1 permitting relay I–2 to become deenergized after a time delay following the charging of condenser 848; this in turn energizes relay Z–2 as just described. Thus, if the constant noise or sound continues for the period of seven seconds and there are no other sounds on the circuit, the recording circuit will be disconnected. In this way, the telephonograph will not be held connected to the telephone lines after the calling party hangs up by a constant line hum or other disturbance.

As pointed out before, the energizing of the relay Z-2 permits the stepping relay Z-1 to advance through its various steps. Assuming that the calling party is silent for seven or eight seconds so that the relay I-2 remains deenergized for this time, the sequence switch is moved to position "17" by the timing relay Z-1. The contacts 672 (Figure 41H) operated by the Z-1 relay cam member 670 close to complete a circuit which may be traced from the positive supply lead 674 through the Z-1 relay contacts 672, contacts 676 of the relay AT-2 (energized at this time, as explained below), contacts 866 of relay R (deenergized at this time), contacts 868 operated by a sequence cam 644H, which provides a closed circuit whenever the sequence switch is on or between positions "9" and "16," and through the lead 686 to the energizing winding 648 of the sequence switch 502. The sequence switch then continues to step until it reaches position "17," at which time the contacts 868 are opened, causing the sequence switch to stop.

An announcement cam 430–4B (Figure 41D) closes its contacts 872 at the completion of the message inviting the caller to proceed with the recording, and when the sequence switch reaches position 17, a circuit is completed through a lead 873, the cam announcement contacts 872, and the contacts of a rotary switch 612L to the common ground circuit, short-circuiting the output of the amplifier 722. The contacts of the announcement cam 430–4B remain closed until that portion of the announcement disc is reached containing the message "Recorder disconnected. Please hang up."; at which time these contacts are opened and the above message is reproduced and transmitted over the telephone lines, thereby advising the caller that the message has been recorded and that the apparatus is now switched off.

During this time, the relay AT-2 (Figure 41F) is energized by a circuit from the negative terminal of the power source through the winding of relay AT-2, rotary switch 612M, lead 770, and contacts 748 of relay FT to the positive terminal of the power source, the relay AT-2 being held energized after the sequence switch 502 leaves position "6" by a circuit extending from the negative terminal of the power source through the winding of relay AT-2, its holding contacts 875 and rotary switch 612F, providing a continuous circuit in positions "6" through "17," to the positive voltage source.

At the completion of the announcement mentioned above, the sequence switch 502 is moved from position "17" to the next position, which is its "0" or home position, by a circuit which may be traced in Figure 41H from the positive terminal of the power source through contacts 876 operated by an announcement cam 430–3B, the contacts 880 operated by an announcement cam 430–5A, and the contacts 682 of sequence cam 644B to the energizing winding 648 of the sequence switch 502. The announcement cam 430–5A closes its contacts 880 just prior to the beginning of the announcement, "Recorder disconnected. Please hang up," and remains closed for a short period of time after the completion of this announcement. The announcement cam 430–3B closes its contacts 876 for a short period of time just at the completion of this announcement. Accordingly, there is a short period of time following the announcement when the contacts 880 and 876 are closed so that the sequence switch is switched from position "17" to its "0" position, thus completing the cycle of operation. Energization of the relay MOT (Figure 41C) is continued at this time by the contacts 881 of an announcement cam 430–5D.

If, at the time referred to above when the sequence switch is in position "9" and the announcement "Please proceed with Message" has been completed, the calling party wishes to record a message, he speaks a message and it is recorded by means of the circuits now to be described (in addition to those already described). As mentioned above, the relay I-1 is energized by the incoming voice signals and closes its contacts 884 (Figure 41G), at least momentarily, to complete a circuit from the positive power source through contacts 884, the contacts of a rotary switch 612N, contacts 888 of the relay FT (not then energized), and an energizing coil 890 of the relay F to the negative terminal of the power source. The relay F is provided with a holding circuit extending from the negative terminal of the power source through a holding winding 892, holding contacts 894 of the relay F, a rotary switch 612P to the positive terminal of the power source. Thus, the relay F is maintained in the energized condition once the caller has spoken until the sequence switch is moved to its "0" position.

The forward drive mechanism of the recording disc 34 is actuated by a magnetic clutch having an electromagnet winding 896, the energizing circuit for which extends from the negative terminal of the power source through the winding 896, through contacts 898 of the relay L, to contacts 900 operated by a cam member 582 which forms a part of the relay Z-1, the contacts 900 remaining in the positions shown except when the relay Z-1 is in its 13th, 14th or 15th position. From the relay contacts 900 the circuit extends through the guide disc contacts 904A, described below, the contacts 906 of the relay F (which is now energized), the contacts 908 of the relay FT, and a rotary switch 612Z to the positive terminal of the power source.

During the time this recording operation is taking place, the electromagnet 786 is energized to operate the announcement disc in the forward direction up to the position where the message "Recorder disconnected please hang up" is reproduced. This energization takes place through a circuit which can be traced from the negative terminal of the power supply through the winding of the electromagnet 786, a rotary switch 612R, contacts 914 operated by an announcement cam member 430–4C, and the contacts of a rotary switch 612S, to the poistive terminal of the power source.

If, at any time, the calling party stops speaking for a period of seven or eight seconds, the timing relay Z-1, as described above, causes the sequence switch to move to position "17"; and there is a reversing of the message recording disc for approximately two and one-half seconds, which since the reverse drive is at a rate twice that of the forward drive, is equivalent to approximately five seconds driving in the forward direction of the recording disc. This reversing substantially compensates for the forward movement of the recording disc during the approximately seven seconds of silence (or constant noise) necessary to disconnect the recorder. Accordingly, at this time the relay Z-1 is utilized to perform a "backspacing" or reversing operation of the recording disc 34.

Thus, at the instant that the Z-1 relay reaches its 13th position, the cam member 902 (Figure 41D) actuates contacts 900 to de-energize the forward clutch control magnet 896 (Figure 41C) of the message recording disc 34, and to complete a circuit that energizes a magnet 918 which drives the recording disc 34 in reverse direction. This circuit may be traced from the negative terminal of the power source through the winding of electromagnet 918, guide disc contacts 858 (now closed) (Figure 41D), contacts 900 of relay Z-1, guide disc contacts 904A, contacts 906 of relay F, contacts 908 of relay FT, and the rotary switch 612Q to the positive terminal of the power source.

The recording disc, therefore, starts to move in reverse. After approximately two and one-half seconds, during which the timing relay Z-1 steps from its 13th to its 16th position, the sequence switch 502 is moved to position "17." During the stepping of relay Z-1 from its 13th to its 15th position, lead 862 is connected to the positive power terminal through contacts 1258 (Figure 41G) of relay Z–1. The contacts 672 (Figure 41H) operated by cam 670 of the Z–1 relay are closed to complete the circuit through the contacts 868 of sequence cam 644H to move the sequence switch to position "17."

The movement of the sequence switch to position "17" opens the circuit through rotary switch 612Q (Figure 41D) and stops the reverse rotation of the message disc. As pointed out above, the relays V–1, V–2, and S are now deenergized because the contacts of rotary switch 612I are now open, and the input of the amplifier 722 is connected to the reproducing head 50 of the announcement disc 38 and the output of the amplifier is connected to the telephone lines 600 and 602, the announcement disc control magnet 786 being energized by a circuit extending from the positive terminal of the power supply through contacts 922, operated by an announcement cam 430–5B, a rotary switch 612T and the energizing winding of the electromagnet 786, so that the message "Recorder disconnected please hang up" is fed into the telephone lines.

At the completion of this message, the announcement cams 430–3B (Figure 41H) and 430–5A cooperate, as described above, to move the sequence switch to its "0" position. At this time, the sequence cam 644C de-energizes the relay MOT, thus stopping the motor 24 and removing the voltage from these circuits.

As described above, the apparatus permits a calling party knowing the particular code adjustment of the machine to control the apparatus remotely so that he can listen to previously recorded messages and, if desired, erase these messages. If at the time the apparatus relays the announcement "Your message will be recorded automatically," the calling party utters the vowel sound "r," the apparatus will announce a series of numbers, at which time the calling party will identify himself by a previously determined code and the apparatus will reproduce the recorded messages.

When the calling party utters the vowel sound "r," within approximately one-half second after he hears the word "automatically," the filter relay RA (Figure 41E) is energized. The sequence switch, it will be recalled, is in position 7 so that the output of the amplifier 722 is connected through a condenser 928 (Figure 41D), a rotary switch 612U, contacts 932 of relay V–2 (now energized), to an "R" filter indicated in block form at 934. The filter 934 is arranged to pass frequencies contained in the vowel sound "r." The output from the "R" filter 934 is amplified by a conventional amplifier, indicated in block form at 936, the output circuit of which is connected to the energizing winding of the relay RA.

When the calling party speaks the sound "r" before the sequence switch leaves the position "7," relay W (Figure 41G) is energized by a circuit from the positive terminal of the power source through the relay contacts 938 of the relay RA, a rotary switch 612V, and an energizing winding 942 of the relay W to the negative terminal of the power source. Relay W is provided with its own holding circuit extending from the negative terminal of the power source through a holding winding 944, its relay holding contacts 946, a rotary switch 612W to the positive terminal of the power source. After approximately one-half second, the sequence switch is moved to position "10" by the closing of the contacts 812 of the announcement cam 430–3A to complete a circuit from the positive terminal of the power source through contacts 674, contacts 812, the contacts 816 of relay W (now energized), and the contacts 950 of a sequence switch cam 644I, providing a continuous circuit when the sequence switch is in position "7," "8" and "9," to the energizing winding 648 of the sequence switch, thus moving the sequence switch to position "10."

In order that the announcement "Please proceed with message" will not be transmitted over the telephone line, the telephone line is connected to the amplifier input for the length of this text by the energization of relays V–1, V–2 and S (Figure 41C). The relays V–1 and V–2 are energized through a circuit extending from the negative terminal of the power source through the energizing winding of the relays V–1 and V–2, in parallel, contacts 834 of the relay FT and through a rotary switch 612X, providing a continuous circuit when the sequence switch is in position "10," and through contacts 956, operated by an announcement cam 430–6A, to the positive terminal of the power source. One terminal of the relay S is connected directly to the negative power source and the other terminal is connected to the positive terminal power source through the rotary switch 612X and the announcement cam contacts 956. Speech impulses received during this period are ineffective.

After the announcement disc has moved beyond the area where the last stated announcement is recorded, the contacts 956 of rotary switch 430–6A are open circuited by the announcement contacts 956 so that the reproducing head 50 of the announcement disc 38 is connected to the amplifier input and the output of the amplifier 722 is connected to the telephone lines.

The announcement disc then reproduces the numeral "1" which is heard by the calling party. After announcement of this numeral, an announcement cam 430–7C (Figure 41E) closes its contacts 962, 964 and 966 which are connected to the code-adjustment switch 968–1 that is positioned in the control instrument and is preadjusted to either the "R" or "A" position, as described above, in accordance with the predetermined code setting.

If the code switch 968–1 is in either the "R" or "A" position, operation of the timing relay Z–1 is initiated by a circuit which may be traced from a positive terminal of the power source through a lead 970, code switch 968–1, contacts 962 of announcement cam 430–7C, contacts 972 of the relay RA, rotary switch 612Y (Figure 41G), contacts 864 of relay FT (Figure 41E), and energizing winding 660 of relay Z–2 to the negative supply terminal. Z–2 initiates the operation of relay Z–1 in the manner heretofore described.

If the code switch 968–1 is positioned in the "A" position, the energizing circuit for the relay Z–2 may be traced from the positive lead 970 through the code switch 968–1, contacts 966 of the announcement cam 430–7C, contacts 976 of a relay AE, and thence through the rotary switch 612Y and relay contacts 864 to the winding 660 of relay Z–2.

If the code switch 968–1 is in the "R" or "A" position, the calling party must pronounce the corresponding vowel within a predetermined time of approximately one and one-half seconds in order to de-energize the timing circuit which otherwise will energize the relay F by means of cam member 656 which will complete a circuit from the positive terminal of the power supply through the contacts 658 of the cam member 656 (closed from fourth position on), a rotary switch 612Z, contacts 888 of relay FT through the energizing winding 890 of relay F, to the negative terminal of the power supply.

When relay F is energized, it remains energized because of its holding circuit extending from the negative terminal of the power source through the holding winding 892, its holding contacts 894 and rotary switch 612P to the positive terminal of the power source. The relay F, as will be described subsequently, prevents the reproduction of the recorded messages to the calling party.

In order to prevent the above action by the timing circuit, the calling party must pronounce the proper vowel, either "r" or "a" within the time limit. Assume for example, that code switch 968–1 is in the "A" position, as shown in the drawings. The calling party then pronounces the vowel sound "a," after he has heard the numeral "1," this vowel sound "a" is applied from the output of the amplifier 722 through the condenser 928, the rotary switch 612U, and the relay contacts 932 of the relay V-2 (now energized), to the "A" filter 980 which is selectively responsive to frequencies contained in the vowel sound "a." The output of the "A" filter 980 is amplified by a conventional amplifier indicated in block form at 982, and applied to the energizing winding of relay AE.

When this relay AE is energized, it moves the contacts 976 to the opposite position from that shown in the drawings, thus interrupting the circuit by which the relay Z-2 is energized and causing the stepping relay Z-1 to return to its initial position.

This change in the position of the contacts 976 completes a circuit from the positive supply lead 970 through the code switch 968-1, which contacts 966 of the announcement cam 430-7C, the contacts 976 of the relay AE (now energized), a rotary switch 612AA (Figure 41G), contacts 986 of relay FT, and the energizing winding 988 of a relay R to the negative terminal of the power supply.

Thus, the utterance of the correct vowel sound by the calling party at the proper time will energize the relay R, which is maintained in an energized condition by a holding circuit extending from the negative terminal of the power source through a holding winding 990 of the relay R, its holding contacts 992, and a rotary switch 612 AB, to a positive terminal of the power source.

If the code switch 968-1 were positioned in the "R" position, it would be necessary for the calling party to pronounce the vowel sound "r" in order to energize the relay RA, as described above, in order to deenergize the timing circuit of stepping relay Z-1 and energize the relay R.

Thus, the actuation of the contacts 972 of the relay RA would deenergize the timing circuit and at the same time would complete a circuit extending from the positive supply lead 970 through the code switch 968-1, contacts 962 of the announcement cam 430-7C, contacts 972 of the relay RA, the rotary switch 612 AA, and contacts 986 of relay FT to the energizing winding 988 of the relay R.

If the code switch 968-1 is in the neutral position, that is, neither in the "R" nor in the "A" position, the calling party must remain silent during the period following the announcement of the numeral "1." Thus, if the code switch 968-1 is in the neutral position, the timing circuit does not start when the contacts of announcement cam 960 are energized, because the positive lead 970 is not connected to the timing circuit because the contacts 996 and 998 of relays RA and RE are open. If the calling party should, for example, utter the vowel sound "r," relay RA would be energized and would, in turn, energize the rejection relay F by a circuit which can be traced from the positive supply lead 970 through the code switch 968-1, contacts 964 of announcement cam 430-7C, contacts 996 of relay RA, through the rotary switch 612Z, and contacts 888 of relay FT to the energizing winding 890 of relay F. If the calling party utters the vowel sound "a" during this period, the relay AE is thereby energized, completing a circuit extending from the positive supply lead 970 through the code switch 968-1, contacts 964 of the announcement cam 430-7C, contacts 998 of relay AE, rotary switch 612Z, contacts 888 of relay FT to the energizing winding of relay F.

If the calling party has given the correct code following the announcement of the numeral "1," relay R will be energized and relay F will be deenergized. If, however, the calling party has not given the correct code, relay F will be energized.

After a one to one and one-half second interval, the announcement cam 430-6A (Figure 41C) again deenergizes the relays V1, V2 and S to connect the output of the amplifier to the telephone line and the caller hears the numeral "2." At this time, an announcement cam 430-8A actuates its contacts 1002, 1004, and 1006 to their closed positions and the announcement cam 430-6A connects the telephone lines to the amplifier input and the amplifier output through condenser 928 to the RA or AE circuit, as described above. Again the response given by the caller must correspond to the previously made setting of the code switch 968-2 in order to prevent actuation of the rejection relay F and to prevent the timing circuit of relay Z-1 from switching off the apparatus, the operating circuits being substantially the same as described above inasmuch as the output leads of the contacts operated by the cam 430-8A are connected to the respective output leads of the contacts operated by the cam 430-7C.

This process is repeated by the announcement cam 430-6A, in cooperation with announcement cams 430-9A, 430-10A, 430-11A and 430-12A, for each of the code switches 968-3, 968-4, 968-5 and 968-6. The numerals "3," "4," "5" and "6," are relayed to the caller as the corresponding code switches are actuated. Following each code numeral, the caller gives the correct vowel sound or remains silent in accordance with the preselected adjustment of the code switches 968-1 to 968-6.

At the completion of the code numeral announcements, relay F will be energized if the correct response has not been made to each code signal. If relay F is energized, it moves the sequence switch directly to position "17" without reproducing the recorded message by an announcement cam 430-3C (Figure 41H) which completes a circuit to energize the sequence switch 502. This circuit can be traced from the positive voltage supply lead 674 through contacts 1018 of an announcement cam 430-2B, contacts 1022 of the announcement cam 430-3C, contacts 1024 of relay W, (now energized), contacts 1026 of relay R, contacts 1028 of relay F, and contacts 1030 of a sequence cam 644 V to the energizing winding 648 of the sequence switch 502. In the event that relay R has not been energized by the code signals, this same circuit is energized through contacts 1026 of relay R irrespective of the energization of relay F. The sequence switch is moved by this circuit to position "17" and the calling party hears the announcement: "Recorder disconnected. Please hang up," and the cycle is completed as heretofore set forth.

If the calling party gave the correct code, then, at the completion of the code series, relay R will be energized and relay F will be deenergized and the rejection circuit detailed above will remain inactive.

If one or more messages were recorded, the sequence switch will now be moved to position "11" by a circuit that can be traced from the positive supply lead 674 through the contacts 1018 of announcement cam 430-2B, contacts 1022 of announcement cam 430-3C, contacts 1024 of relay W, contacts 1026 of relay R (now energized), contacts 1028 of relay F (now deenergized), the guide disc switch 858C and contacts 1036, operated by sequence cam 644J, which provides a continuous circuit whenever the sequence switch is in position 10, to the energizing winding 648 of the sequence switch. The contacts 1036 then open and the sequence switch stops in position 11.

In this position, the clutch 264 (Figure 8) for the guide disc 36 is released by energization of an electromagnet 1040 (Figure 41C), the mechanical arrangement of which is shown as 308 in Figure 8, through a circuit that can be traced from the positive terminal of the power source through contacts 1042 of relay FT, a rotary switch 612AC, providing a continuous circuit when the sequence switch is in positions "4" and "11," and the winding of electromagnet 1040 to the negative terminal of the power source. The guide disc then reverses to its completely deenergized position actuating switches 453 and 457 (Figure 3) which cause the guide disc to move to its initial position and guide the magnetic head to the starting point of the recording disc.

When the guide disc reaches its initial position, the sequence switch is moved to position "12" by a circuit that can be traced from the positive supply lead 674 (Figure 41H), through the guide disc switch 858D and contacts 1048, operated by a sequence cam 644K, providing a continuous circuit when the sequence switch is in position "11," to the energizing winding 648 of the sequence switch. When the sequence switch is thus moved to position "12," the release clutch magnet 1040 (Figure 41C) is deenergized by the corresponding movement of the rotary switch 612AC.

The guide disc in reversing and actuating switch 453 closes contacts 1052A which short-circuit the output of the amplifier 722 so that the signals from the amplifier are inaudible until the magnetic head has arrived at the start of the sound track. This circuit can be traced from the ungrounded end of winding 732 of the amplifier output transformer through the guide disc switch 1052A (Figure 41D), and a rotary swtich 612AD, which provides a continuous circuit whenever the sequence switch is in position "5" or "12," to the common ground circuit.

Relay S (Figure 41C) is now energized to connect the recording-reproducing heads 830 of the message disc to the input of the amplifier 722. The energizing circuit for relay S extends from the negative terminal of the power source through the winding of relay S and a rotary switch 612AE, providing a continuous circuit when the sequence switch is in positions "5" or "12," to the positive terminal of the power source.

The output circuit of the amplifier 722 is connected through contacts 736 of relay FT and contacts 738 of relay V-1 to the telephone lines.

The message recording disc 34 is now driven in its forward direction, the forward clutch-control magnet 896 (Figure 41C) being energized by a circuit that can be traced from the negative terminal of the power source through the winding of magnet 896, contacts 898 of relay L, contacts 900 of relay Z1, contacts 904A of the guide disc switch assembly 455, contacts 1058 of the relay R, still energized by the holding circuit described above, contacts 908 of the relay FT, and the rotary switch 612Q to the positive terminal of the power source.

The timing circuit is now placed under control of the voice-operated relay I-2 through the actuation of the guide disc switch 457 (Figure 41G) by the forward rotation of the guide disc. This circuit can be traced from the negative terminal of the power source through the energizing winding 660 of the relay Z-2 (Figure 41E), lead 668, the contacts 864 of relay FT, rotary switch 612K, contacts 860 of relay I-2, contacts 858A of the guide disc switch assembly 457, a rotary switch 612AF to the positive terminal of the power source.

When the guide disc reaches the initial position, the switch contacts 1052A are opened removing the short circuit from the output of the amplifier 722. The calling party now hears the messages which are reproduced from the message-recording disc 34.

So long as the relay I-2 is energized during each interval of 7 seconds, the timing circuit is ineffective. However at the end of the recorded messages the relay I-2 is de-energized and after approximately 7 seconds the cam member 902 (Figure 41D) of the relay Z-1 actuates the contacts 900 to de-energize the forward clutch-control magnet 896 and energize the reverse clutch-control magnet 918 as previously described in connection with the recording of incoming messages. This circuit can be traced from the negative supply terminal through the reverse clutch-control magnet 918, guide disk switch 858B, contacts 900 of relay Z-1, guide disk switch 904A, contacts 908 of relay FT and through the rotary switch 612Q to the positive terminal of the power source.

After approximately 2 seconds the cam member 670 (Figure 41H) of the stepping relay Z-1 closes its contacts 672 to energize the sequence switch 502 through a circuit that can be traced from the positive power supply lead 674, contacts 672 of cam 670, contacts 676 of relay At-2 (energized by its holding circuit), contacts 866 of relay R (still energized by its holding circuit) and contacts 1064, operated by a sequence cam 644L, to the energizing coil 648 of the sequence switch. This circuit causes the sequence switch to step to position 13 at which time the contacts 1064 are open circuited by the cam 644L causing the sequence switch to remain in the position 13. At the same time the rotary switch 612Q interrupts the energization of the reverse magnet 918 stopping the rotation of the message recording disk 34.

Relay S (Figure 41C) is now de-energized by movement of the rotary switch 612AE thereby connecting the announcement disk to the input of the amplifier 722, the output circuit of the amplifier remaining connected to the telephone line.

The announcement disk is now driven by energization of the forward clutch-control magnet 786 through a circuit which may be traced from the negative terminal of the power source through the winding of magnet 786, rotary switch 612R (Figure 41D), contacts 914 operated by the announcement cam 430–4C and rotary switch 612S to the positive terminal of the power source. The calling party now hears an announcement "End, please erase."

At the completion of this announcement, the sequence switch is moved to position 14. The announcement cam 430–1A (Figure 41H) closes its contacts 794 to complete a circuit from the positive supply line 674 through the announcement cam contacts 794 and contacts 1070, operated by a sequence cam 644M to the energizing winding 648 of the sequence switch 502, the contacts 1070 being opened by the cam 644M when the sequence switch moves to position 14.

The relays V-1 and V-2 (Figure 41C) are now energized to connect the telephone lines to the input of the amplifier 722 by a circuit which can be traced from the negative terminal of the power source through the energizing winding of relays V-1 and V-2 in parallel, contacts 834 of relay FT and rotary switch 612I to the positive terminal of the power source. The relay S is energized also through the rotary switch 612I to connect the recording-reproducing heads 830 of the message recording disk 34 to the output circuit of the amplifier 722.

During this time the announcement disk-control magnet 786 is energized by the circuit through rotary switch 612R, contacts 914, operated by announcement cam member 430–4C, and rotary switch 612S. If the calling party does not speak within approximately 1½ seconds the sequence switch is moved to position 15 by the closing of the contacts 812 by the announcement cam 430–3A. This energizing circuit can be traced from the positive supply lead 674 through the announcement cam contacts 812 and contacts 1074, operated by a sequence cam 644N to the energizing coil 648. This causes the sequence switch to move to position 15 at which time the contacts 1074 are opened causing the sequence switch to remain in this position.

The relays V-1, V-2 and S (Figure 41C) are then de-energized, by movement of the rotary switch 612I, to connect the reproducing head 708 of the announcement disk to the input of the amplifier 722 and the output of this amplifier to the telephone lines. The announcement disk continues to be rotated and the calling party hears the announcement "Messages have not been erased, please proceed with message."

If, however, at the end of the previous announcement "End, please erase" when the sequence is moved from position 13 to position 14, the calling party utters the vowel sound "r," the relay RA (Figure 41E) connected to the output of the "R" filter 934 is energized, the contacts 938 (Figure 41G) of this relay RA energize the relay L through a circuit which can be traced from the negative terminal of the power source through an energizing winding 1078 of the relay L, contacts 1080 of the stepping relay Z-1 (closed only when relay Z-1 is in its "0" position), the contacts of a rotary switch 612AG, providing a continuous circuit only when the sequence switch is in position 14, and the contacts 938 of the relay RA, which has now been energized by the incoming "r" sound.

The energization of relay L closes its holding contacts 1084 to complete the circuit from the negative terminal of the power source through a holding winding 1086 of the relay L, its holding contacts 1084 and the relay contacts 1088 of the relay Z–1 (closed by relay Z–1 except when the relay Z–1 has stepped to its 13th, 14th or 15th position) to the positive terminal of the power source.

Energization of the relay L energizes the timing circuit of relays Z–1 and Z–2 by a circuit extending from the positive terminal of the power source through contacts 1090 of relay L, lead 668 (Figure 41E) and the energizing winding 660 of relay Z–2 to the negative terminal of the power source. Energization of relay L also energizes the reverse clutch-control magnet 918 (Figure 41C) of the message recording disk 34 through the contacts 1092 (Figure 41D) and energizes the release clutch for the guide disk 36 by energization of the electromagnet 1040 (Figure 41C) through the contacts 1094 of the relay L. The erasure magnet 1096 (Figure 41B) is energized also by relay L. In order to erase the recorded signals 60-volt alternating supply lines 1098 are connected through the winding of magnet 1096 and contacts 1100 of the relay L. The erasure magnet remains energized for approximately 7 seconds during which time the message recording disk 34 makes approximately two complete revolutions. After the 7 second interval the relay Z–1 will have stepped to its 13th position at which time its contacts 1088 (Figure 41G) are open circuited thus de-energizing the holding circuit of relay L, switching off the timing relay circuit, de-energizing the reverse clutch-control magnet 918, de-energizing the release clutch-guide disk magnet 1040, and de-energizing the erasure magnet 1096. The guide disk 36 is reversed to its initial position during the period required for the erasure.

The message disk is now driven in a forward direction by energization of the clutch-control magnet 896 through a circuit which can be traced from the negative terminal of the power source through the winding of magnet 896, contacts 898 of relay L, guide disk switch 1052B and contacts 1092 of relay L to the positive terminal of the power source. The message disk thus rotates in its forward direction until the guide disk 36 opens the switch 1052B.

During the time the erasure is taking place the sequence switch is moved to position 15 by the announcement cam 430–3A (Figure 41H) which closes its contacts 812 to energize the winding 648 through the contacts 1074 of the sequence cam 644N. The announcement clutch-control magnet 786 (Figure 41C) is de-energized so long as the relay L is energized. However, when the relay L is deenergized after completion of the erasure the announcement clutch-control magnet winding 786 is energized by a circuit which may be traced from the negative terminal of the power source through winding 786, the rotary switch 612R (Figure 41D), contacts 914 of the announcement cam 430–4C, a rotary switch 612AH, providing a continuous circuit when the sequence switch is in position 15, contacts 1106 of relay L to the positive terminal of the power source.

At this time the calling party hears the announcement "Messages have been erased, please proceed with message." During the time of the play-back of the word "not," which is recorded on the announcement disk between the words "Messages have" and "been erased," the output circuit of the amplifier 722 is short circuited by a circuit extending from the ungrounded end of transformer winding 732 through contacts 1108, operated by an announcement cam 430–1B, the guide disk switch 858E and a rotary switch 612AI to the common ground circuit.

At the completion of this announcement, the sequence switch is moved to position 16 by means of a circuit which may be traced from the positive supply lead 674 (Figure 41H) through contacts 1116 operated by an announcement cam 430–5C and contacts 1120 operated by a sequence cam 644 P to the energizing coil 648 of the sequence switch 502.

The relays V–1, V–2 and S are now energized through the rotary switch 612I (Figure 41C) to connect the recording-reproducing heads 830 of the message disk to the output of the amplifier 722 and to connect the telephone lines to the input of the amplifier.

The holding circuit of relay R (Figure 41G) is broken by the rotary switch 612AB when the sequence switch moves to position 16, thus de-energizing the relay R.

The timing circuit is now energized under the control of the voice-operated relay I–2 through a circuit including the energizing winding 660 of relay Z–2, rotary switch 612K, contacts 860 of relay I–2, guide disc switch 858A, rotary switch 612AJ and rotary switch 612–A.

When the calling party begins to speak, the relay F is energized by a circuit which may be traced from the positive terminal of the power source through contacts 884 of relay I–1, rotary switch 612N, contacts 888 of relay FT, and the energizing winding 890 of relay F to the negative terminal of the power source, the relay F being maintained in energized condition by the holding circuit including its holding contacts 894 and the rotary switch 612P.

The operation of the circuits following the completion of the recording of this message are the same as those described in connection with the recording process above.

The manual operation of the telephonograph is as follows:

The telephonograph may be utilized also for dictation purposes by manually closing a switch 1124 (Figure 41H) which completes a circuit from the positive supply line through contacts 1123 which are operated by a relay Z–1 cam 1121, contacts 1125 of relay L, contacts 1052C, switch 1124, and the contacts 1128 operated by a sequence cam 644Q to the energizing winding 648 of the sequence switch. The contacts 1128 are closed when the system is not in operation, and when the sequence switch is started a sequence cam 644X closes contacts 1127 to the positive supply line which are held closed between positions "1" and "3"; thus contacts 1127 maintain the circuit when contacts 1123 open provided that the sequence cam 644Q when the sequence switch is in position 0 or 1 so that this control remains ineffective if the telephonograph is occupied by an outside call. Whenever the telephonograph is not so occupied, the sequence switch is moved to position 2 by the above-mentioned circuit.

It is necessary to hold the dictation switch 1124 closed for a sufficient length of time to allow the sequence switch to move to its second position and accordingly an indicating lamp 1132 (Figure 41B) is provided which is energized when the sequence switch is in its second position by a circuit extending from one of the alternating-current supply lines 1098 through the lamp 1132, a rotary switch 612AK, providing a continuous circuit only when the sequence switch is in its position 2, and contacts 1136 of the relay FT to the other alternating-current supply line 1098.

Thus when the dictation switch is closed the relay FT is energized opening the contacts 1136 so that the lamp 1132 is not energized until the sequence switch has moved to its second position and the contacts of the sequence cam 644Q have been opened to de-energize the relay FT and complete the circuit to the indicating lamp 1132, and denoting that the switch may now be released to its normally open position.

The telephonograph is provided with a hand-set 4, described above in connection with Figure 1 and shown diagrammatically in Figure 41C as a microphone 6 and an earphone 8. The microphone 6 is connected through a condenser 1142, a rotary switch 612AL, providing a continuous circuit only when the sequence switch is in position 2, and contacts 738 and 724 of relay V–1 to the input of the amplifier 722.

The relays V–1, V–2 and S are energized this time through the rotary switch 612I so that the recorder-reproducing heads 830 of the message disc are connected to the output of the amplifier 722.

The timing circuit is switched on by the circuit including energizing winding 660 of relay Z–2 (Figure 41E), rotary switch 612K, contacts 860 of relay I–2, guide switch 858A, a rotary switch 612AM and a rotary switch 613AN to the positive terminal of the power source.

The relay I–1 is energized by the first speech impulse and energizes relay F by means of a circuit including contacts 884 of relay I–1, rotary switch 612N, relay contacts 888 of relay FT and winding 890 of relay F, relay F being maintained in energized position by the holding circuit including its holding contacts 894 and the rotary switch 612P. Relay F then energizes the forward clutch-control magnet 896 of the message recording disc 34 by a circuit including contacts 898 (Figure 41D) of relay L, contacts 900 of relay Z–1, contacts 904A of guide disc switch 455, contacts 906 of relay F, contacts 908 of relay FT, a rotary switch 612AP, providing a continuous circuit when the sequence switch is in positions 2 and 3, and normally closed "stop" switch contacts 1152.

Should the speaker desire to interrupt his dictation he presses the "stop-repeat" button 549 in the control instrument panel to the "stop" position as described in relation with Figure 32, thus opening the contacts 1152, to stop the movement of the recording disc, and also closing contacts 1154 (Figure 41E) to provide continuous energization of the winding 652 of relay Z–1, through a rotary switch 612AQ, providing a continuous circuit when the sequence switch is in positions 2, 3 or 5, to stop thereby the timing action of relay Z–1. If the speaker wishes to continue his dictation he moves the "stop-repeat" switch back to its neutral position thereby starting the rotation of the message disc and initiating the timing circuit. The "stop" switch also closes contacts 1157 (Figure 41B) to energize an indicator lamp 1159.

During the dictation the speaker maintains a thumb-operated switch 1158 (Figure 41C) in a closed position. When the dictation is completed the microphone 1138 is disconnected by releasing the thumb-operated switch 1158.

When the speaker stops talking, or the switch 1158 is opened for more than about 7 seconds, the relay I–2 becomes deenergized, as described above, providing a circuit for energizing relay Z–1 which may be traced from the negative power supply through winding 660 of relay Z–2, lead 668, contacts 864 of relay FT, rotary switch 612K, lead 862, contact 860 of relay I–2, contacts 858A of the guide disc switch 457, rotary switch 612AM, rotary switch 612AN, to the positive terminal of the power supply.

The timing relay thus starts to move until the contacts 900 (Figure 41D) of the relay Z–1 are actuated by relay cam 902 causing the message disc to be reversed for a short period of time after which contacts 672 of relay Z–1 (Figure 41H) are closed causing the sequence switch to step to its zero position all as heretofore described.

In order to reproduce the recorded material, the key lock 551 must be turned to the correct position as mentioned above in connection with Figure 32, this lock serving to close a switch indicated at 619B. The "Reproduce" button 541 is then depressed to close switch contacts 1162 thereby completing a circuit from the positive supply lead through contacts 1123, contacts 1125, contacts 1152C, contacts 1162, contacts 619B, contacts 858F, contacts 1166 which are operated by a sequence cam 644R when the sequence switch is in positions "0" to "3," to the energizing winding of the sequence switch 502; after the sequence switch is started the circuit is maintained by contacts 1127 which are operated by cam 644X.

If the telephonograph is occupied by an outside call or if the recorded material has been erased, the play-back button will remain ineffective. Play-back can be started, however, during dictation or during recording of a two way conversation. Completion of the play-back circuit moves the sequence switch to position 4 where the sequence switch stops because the contacts 1166 are then opened.

The relay R (Figure 41G) is now energized through a circuit which may be traced from the negative terminal of the power source through the energizing winding 988 of the relay R, contacts 986 of the relay FT, and rotary switch 612AR to he positive terminal of the power source.

The control magnet 1040 for the guide disk release clutch is also energized by a circuit extending from the negative terminal of the power source through the energizing winding of electromagnet 1040, rotary switch 612AC, and contacts 1042 of the relay FT to the positive terminal of the power supply, thus returning the guide disc to its initial position.

When the guide disk returns to its initial position, the sequence switch is moved to position 5 by the closing of guide disk switch 858D. This completes a circuit from the positive supply lead 674 through the guide disk switch 858D, contacts 1172 of sequence cam 644S to the energizing winding 648 of the sequence switch, moving the sequence switch from position 4 to position 5.

Relay S (Figure 41C) is now energized through the rotary switch 612AE to connect the recording-reproducing heads 830 of the message disk to the input of the amplifier 722. The output circuit of the amplifier 722 is connected to the earphone 8 by means of a circuit extending from the tap 734 on the secondary winding 732 of the transformer 728 through contacts 736 of the relay FT, the contacts 738 of relay V–1, a rotary switch 612AS, and a series resistance 1178.

The forward clutch control magnet 896 of the message recording disk 34 is energized by a circuit which can be traced from the negative terminal of the power source through the energizing winding of the clutch magnet 896, contacts 898 of relay L (Figure 41D), contacts 900 of relay Z–1, the guide disk switch contacts 904A, contacts 1058 of the relay R (which has remained energized by its holding circuit), contacts 908 of relay FT, rotary switch 612AT, contacts 1182 of the "stop-repeat" switch, and contacts 1184 of the "stop-repeat" switch to the positive terminal of the power source.

During this period of time, the output of the amplifier 722 is short-circuited through the guide disk 1052A and rotary switch 612AD. When the magnetic head reaches the position to start reproduction, the guide disk 1052A opens to permit the signals to be applied to the earphone 1140.

The guide disk also closes the guide disk switch 858A (Figure 41G) to initiate the timing circuit and place it under the control of the voice operated relay I–2. Thus, whenever the messages have been completely reproduced as evidenced by a silent period of approximately seven seconds, the timing circuit will actuate the contacts 900 (Figure 41D) of the relay Z–1, causing the short reverse of the message disk followed by the stepping of the sequence switch to its home position by the closing of contacts 672 (Figure 41H of the timing relay Z–1.

During play-back, the reproduction may be stopped by moving the "stop-repeat" switch 549 of the control instrument upwardly to its stop position. Movement of this switch opens the contacts 1182 (Figure 41D) in the energizing circuit for the forward clutch control magnet 896, thereby stopping the message disk, and closes the contacts 1154 (Figure 41E) to provide continuous energization of the winding 652 of the relay Z–1 to thereby render the timing circuit inactive.

In order to back-space the reproducing mechanism, the "stop-repeat" switch 549 is moved downwardly to the repeat position, actuating the repeat contacts 1184 (Figure 41D) to de-energize the forward clutch control magnet 896 and energize the reverse clutch control magnet 918 through a circuit that may be traced from the negative terminal of the power source through the winding of reverse magnet 918, guide disk switch contacts 858B, a rotary switch 612AV and "stop-repeat" switch contacts 1184 to the positive terminal of the power source.

Movement of the "stop-repeat" switch to the repeat position also closes contacts 1156 (Figure 41E) to constantly energize relay Z-1 through rotary switch 612AZ, to thereby render the timing circuit inactive.

When the switch is released, the message disk again operates in the forward direction to continue the reproduction.

If, during play-back, the erase button 539 is depressed to close switch contacts 1188 (Figure 41G), the erase magnet 1096 is energized through the contacts 1100 of relay L which is energized by the circuit which may be traced from the negative terminal of the power source through the energizing winding 1078 of relay L, contacts 1080 of relay Z-1, a rotary switch 612AV, and the erase switch contacts 1188 to the positive terminal of the power source. The erasure then takes place as described above in connection with the erasure by remote control. At this time, however, the relay AT-2 is not energized so that the energization of relay L causes the sequence switch to stop to its "0" position by a circuit which may be traced from the positive terminal of the power source through contacts 1192 of the relay L (Figure 41H), contacts 1194 of the relay AT-2 and contacts 682 of the sequence cam 644B to the energizing coil 648 of the sequence switch 502. Relay MOT (Figure 41) which controls the motor 700 and the power circuits is not de-energized in this instance, because it is first held by contacts 1196 of the relay L and subsequently by contacts 1052D of the guide disk 36.

Energization of the relay L closes contacts 1199 (Figure 41B) to complete a circuit from one of the alternating supply lines 1098 through an indicator lamp 1201 and contacts 1199 to the other supply line 1098. The "erase" indicator lamp 1201 is energized also when the sequence switch is in zero position and the guide disk 36 has not been returned to its home position. This circuit includes guide disk switch contacts 1052E and a rotary switch 612AW connected in series with each other and in shunt with contacts 1199 of relay L.

In order to record a two-way telephone conversation, the recording switch 543 is operated to move the sequence switch to position 3. The recording switch completes a circuit from the positive voltage supply line 674 (Figure 41H) through the circuit outlined above and formed by contacts 1123, contacts 1125, contacts 1052, contacts 1200, operated by a sequence cam 644T, to the energizing winding 648 of the sequence switch 502.

The recording switch is held in closed position for a sufficient length of time to permit the sequence switch to step to position 3 so that contacts 1127 are closed. An indicating lamp 1208 is provided to indicate that the sequence switch has been properly positioned. This indicating lamp 1208 is connected in a circuit extending from one of the alternating voltage supply lines 1098 through the lamp 1208, a rotary switch 612AX, providing a closed circuit when the sequence switch is in position 3, and contacts 1136 of relay FT to the other supply line 1098.

Relay AH (Figure 41F) is now energized by a circuit extending from the negative terminal of the power supply through the energizing winding 746 of the relay AH through contacts 752 operated by the announcement cam 439-7A, the rotary switch 612E and contacts 748 of relay FT to the positive supply voltage. Energization of relay AH connects the telephone lines to the input circuit of the amplifier 722. The relays V-1, V-2 and S are energized through the rotary switch 612I, thereby to connect the recording-reproducing heads 830 of the message disk to the output circuit of the amplifier 722.

In order to notify the calling party that the telephone conversation is being recorded, a warning signal is generated, for example at 15 second intervals, and connected to the line transformer 741. For this purpose, an audio tone generator 1212 is provided having a control terminal 1214 so connected in the circuit that a warning signal is generated each time the terminal 1214 is connected to the common ground circuit. This circuit is completed through a continuously operating circuit breaker shown diagrammatically at 1216 and described above as contact plates 492 and contacts 490 in connection with Figures 8–12, which momentarily closes its contacts once each 15 seconds, and a rotary switch 612AY, which provides a continuous circuit when the sequence switch is in position 3. One output terminal of the audio tone generator 1212 is connected directly to the common ground circuit and the other terminal is connected directly to one end of the secondary winding of transformer 741.

The relay I-1 is energized by the first speech impulse which, as described above, then energizes the relay F, which, in turn, energizes the forward magnetic control clutch 786 to record the conversation. These circuits have been described above.

As in the case of dictation, the forward clutch-control magnet 896 is energized through the rotary switch 612AP (Figure 41D) and the "stop" contacts 1152 of "stop-repeat" switch 549, so that by operating the "stop" switch to open the contacts 1152, the recording can be interrupted. The recording is resumed when the switch contacts 1152 are returned to their closed position.

In the event that a calling party desires to leave a message of a confidential nature by recording it on the telephonograph and his call is answered by an employee or representative of the owner, or subscriber, the caller can be connected with the telephonograph by pushing the "connection" button 537 to close switch contacts 1220 (Figure 41H) thereby completing a circuit from the positive supply line 674 through the contacts 1220, contacts 1222 of the relay R, and contacts 1224 of a sequence cam 644U to the energizing winding 648 of the sequence switch 502. The contacts 1224 remain closed until the sequence switch reaches position 6, at which time these contacts are open and the apparatus is now connected for recording on the telephonograph. When the sequence switch reaches position 6, the relay AT-1 is energized, as described above, closing its contacts 1226 to energize a "connection" indicator lamp 1228 (Figure 41B).

It will be noted that an operator can answer the telephone even though the telephonograph has already answered the call. Such interruption is not possible, however, unless the key controlled switch contacts 763 (Figure 41F) have been placed in the open position. In order to transfer the call to the telephone set the "stop" switch is actuated to open the contacts 762, thus de-energizing the relay AT-1 and releasing contacts 606 and 608 (Figure 41A) to connect the telephone lines 600 and 602 to the telephone 604. This arrangement insures also that in case of power failure the telephone lines will be connected automatically to the telephone set.

We claim:

1. In a telephone answering system adapted to record signals received over a telephone circuit, the combination of, sound recording means, a resettable counting network responsive selectively to successive ringing electrical signals on said telephone circuits, a sound reproducer, switch means under the control of said counting network and including signal responsive means to render said sound reproducer operative to transmit a message to said telephone circuits upon the reception of a predetermined number of ringing electrical signals, automatic means for resetting said counting network upon reception of the said predetermined number of ringing electrical signals, and means to record messages on said sound recording means and including means responsive to the completion of an operation of said sound reproducer.

2. In a telephone answering system adapted to be connected to conventional telephone lines, control apparatus comprising, a control circuit responsive selectively to telephone ringing electrical signals, timing means connected to be initiated by said control circuit, cycle control means having home and operating positions, said cycle control means being under the control of said control circuit and moving from its home to its first operating position upon reception of the first telephone ringing electrical signal, telephone answering circuit means under the control of said cycle control means, said control circuit including means connected to render said telephone answering circuits operative upon receipt of a predetermined number of telephone ringing electrical signals, and means under the control of the timing means for returning said cycle control means to its home position and including time-delay means preventing operation of said telephone answering circuits a predetermined interval after the cessation of telephone ringing electrical signals prior to the reception of said predetermined number of ringing electrical signals.

3. In a telephone answering system adapted to be connected to telephone circuits, apparatus comprising, a sound recording head, a record medium, forward driving means connected to move said head in a forward direction along a predetermined path relative to said record medium, control means including timing means and means responsive to the absence of incoming modulated electrical sound signals for stopping said relative movement a predetermined period of time after the termination of incoming modulated sound signals, reverse driving means for moving said recording head in reverse direction along said path relative to said record medium a distance not exceeding the distance of said forward relative movement during said predetermined period of time, sound transmitting apparatus connected to transmit a recorded message over said telephone circuits, and means responsive to deenergization of said reverse driving means for initiating operation of said sound transmitting apparatus.

References Cited in the file of this patent

UNITED STATES PATENTS

| | | |
|---|---|---|
| 893,277 | Stuart | July 14, 1908 |
| 2,147,820 | Milde | Feb. 21, 1939 |
| 2,261,420 | Shively et al. | Nov. 4, 1941 |
| 2,376,272 | Peterson et al. | May 15, 1945 |
| 2,438,222 | Lear | Mar. 23, 1948 |
| 2,519,567 | Handschin | Aug. 22, 1950 |
| 2,519,568 | Handschin | Aug. 22, 1950 |
| 2,523,803 | Faus | Dec. 5, 1950 |
| 2,553,410 | Handschin | May 15, 1951 |
| 2,665,337 | Handschin | Jan. 5, 1954 |
| 2,673,242 | Van Deventer | Mar. 23, 1954 |
| 2,698,877 | Abbott | Jan. 4, 1955 |
| 2,709,202 | Handschin | May 24, 1955 |
| 2,724,016 | Van Deventer | Nov. 15, 1955 |
| 2,784,254 | Lane | Mar. 5, 1957 |